May 3, 1932. C. F. PYM 1,856,292
MACHINE FOR SHAPING UPPERS OVER LASTS
Original Filed March 31, 1927 23 Sheets-Sheet 1

INVENTOR
Charles F. Pym
By his Attorney,
Nelson W. Howard

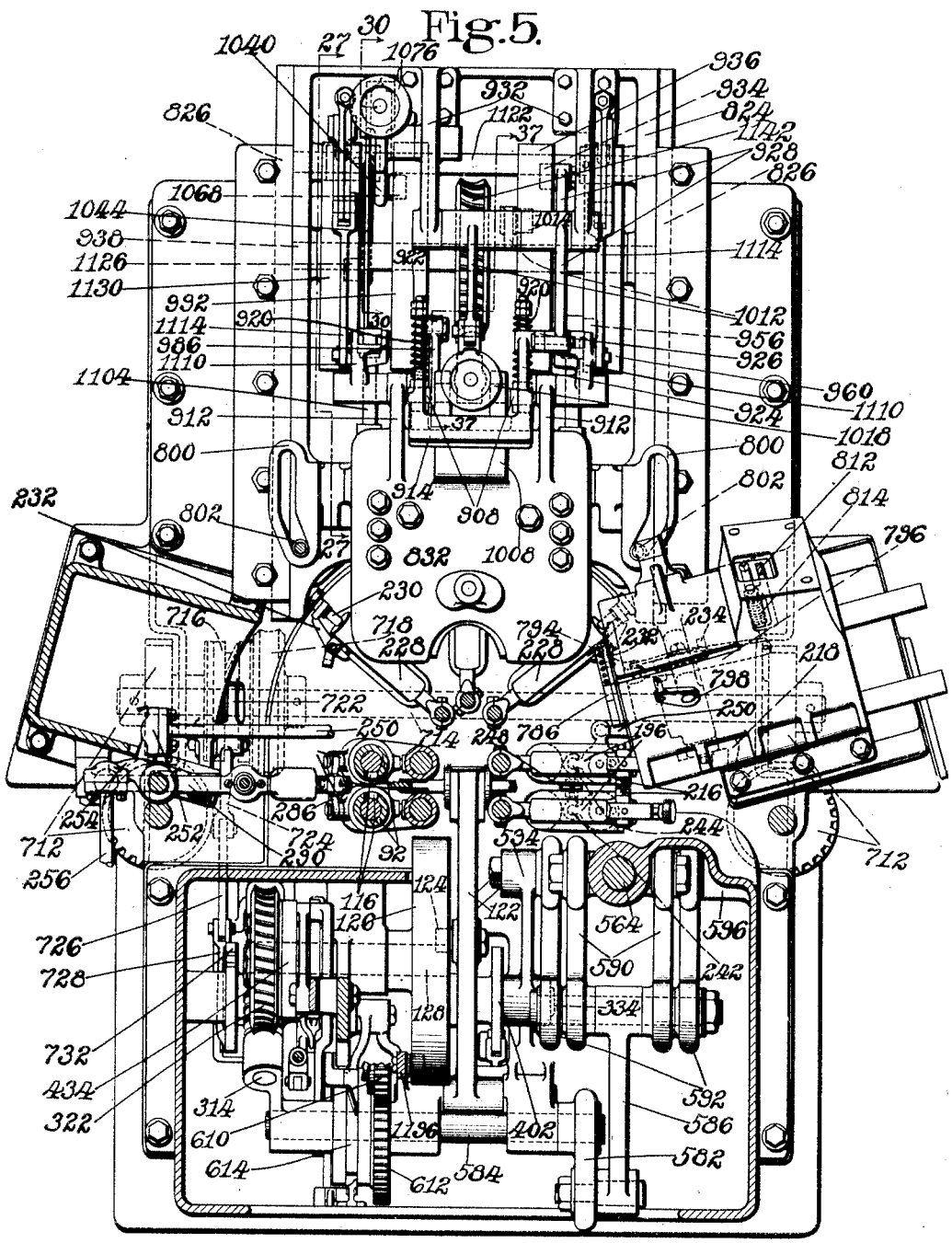

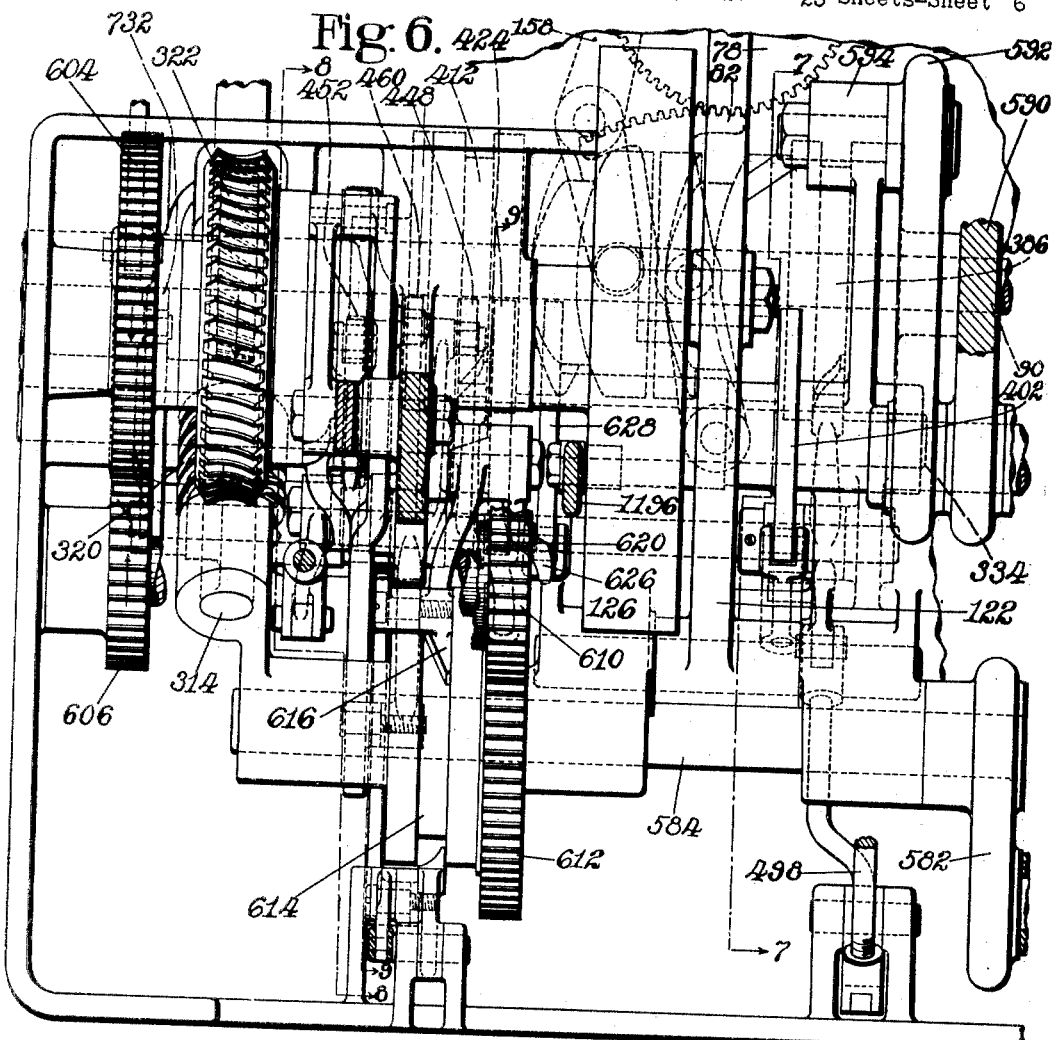
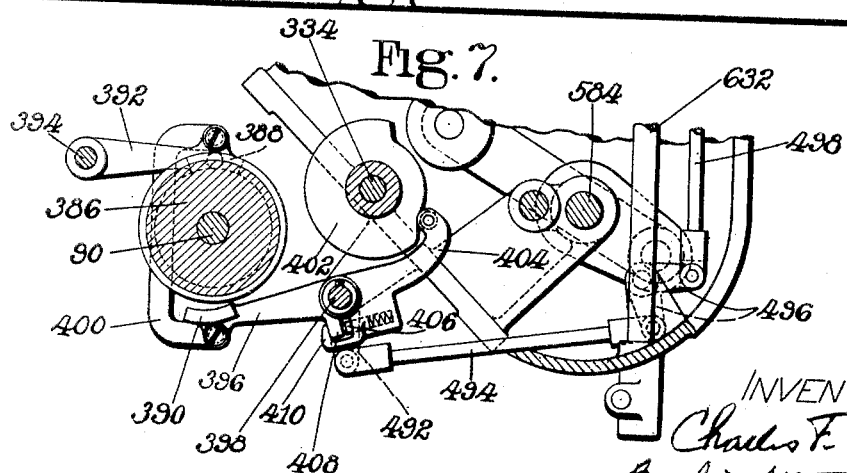

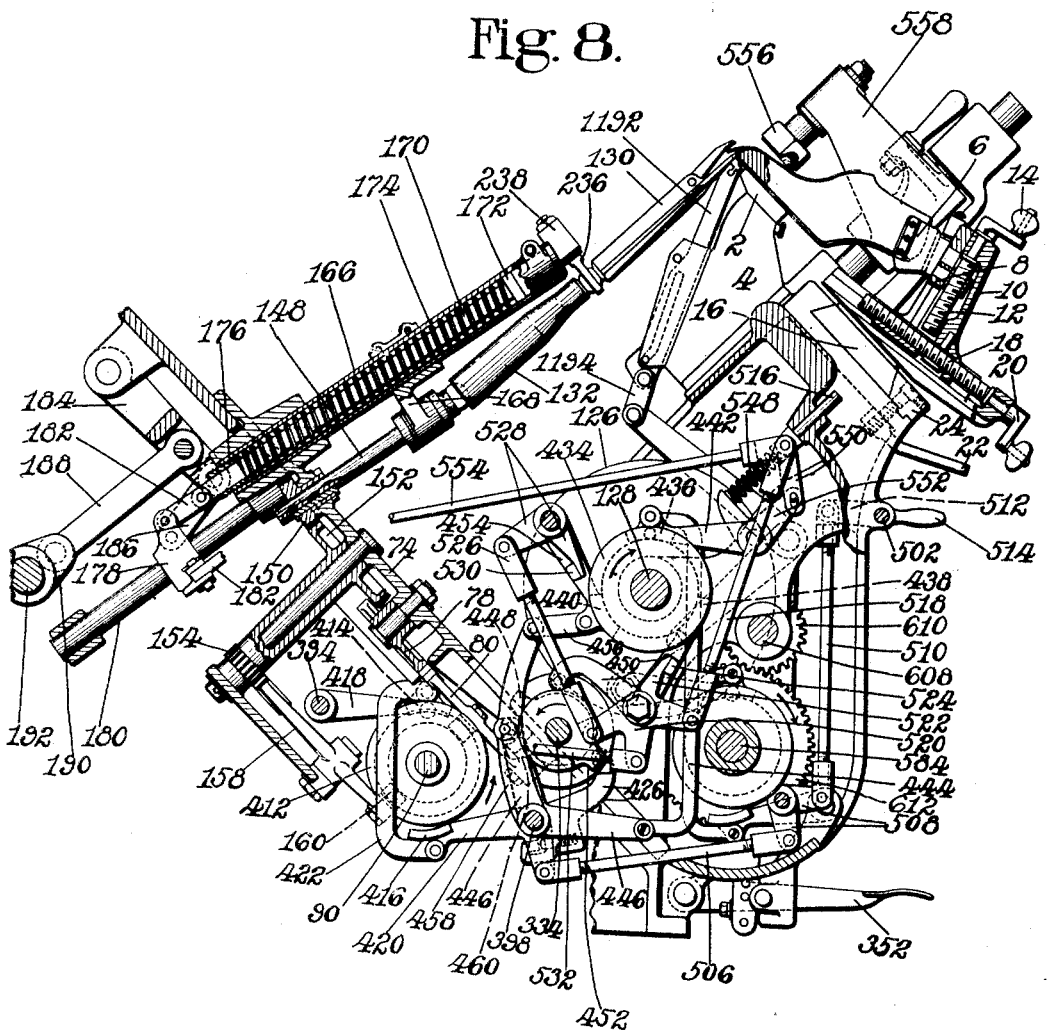

May 3, 1932.  C. F. PYM  1,856,292
MACHINE FOR SHAPING UPPERS OVER LASTS
Original Filed March 31, 1927  23 Sheets-Sheet 10

INVENTOR
Charles F. Pym

May 3, 1932. C. F. PYM 1,856,292
MACHINE FOR SHAPING UPPERS OVER LASTS
Original Filed March 31, 1927 23 Sheets-Sheet 12

INVENTOR
Charles F. Pym
By his attorney,
Nelson H. Howard

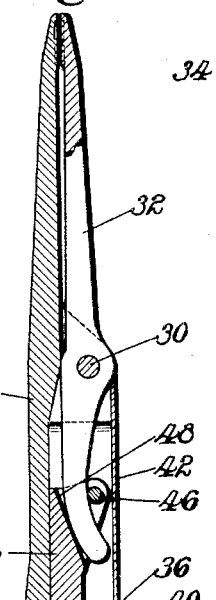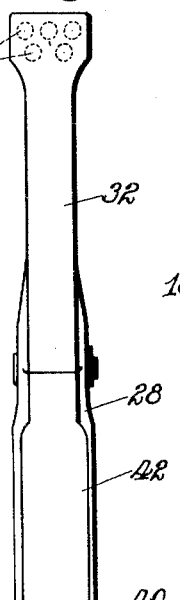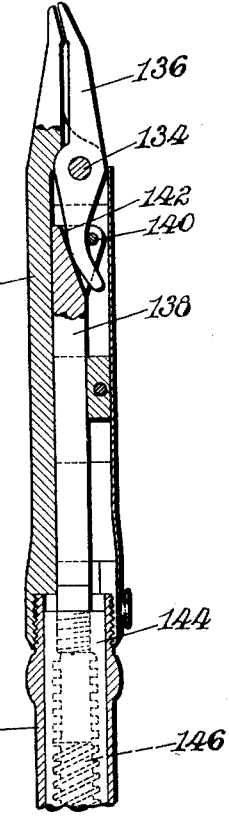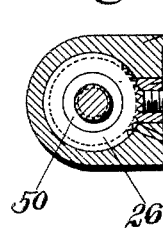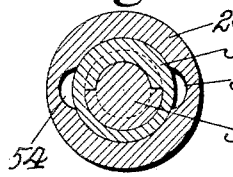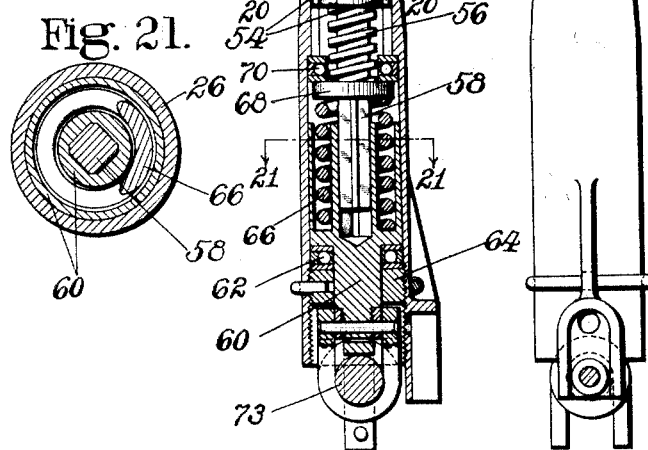

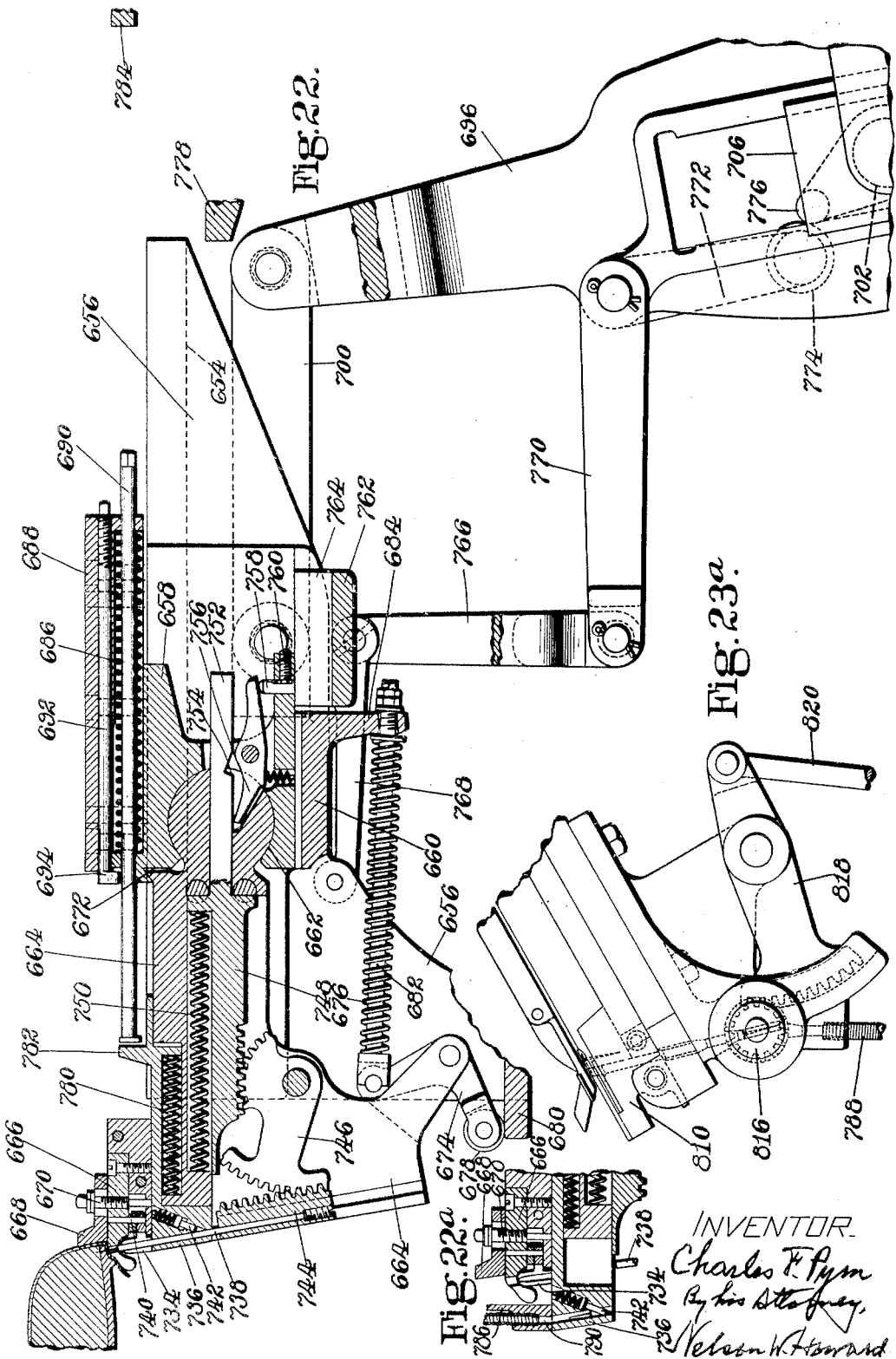

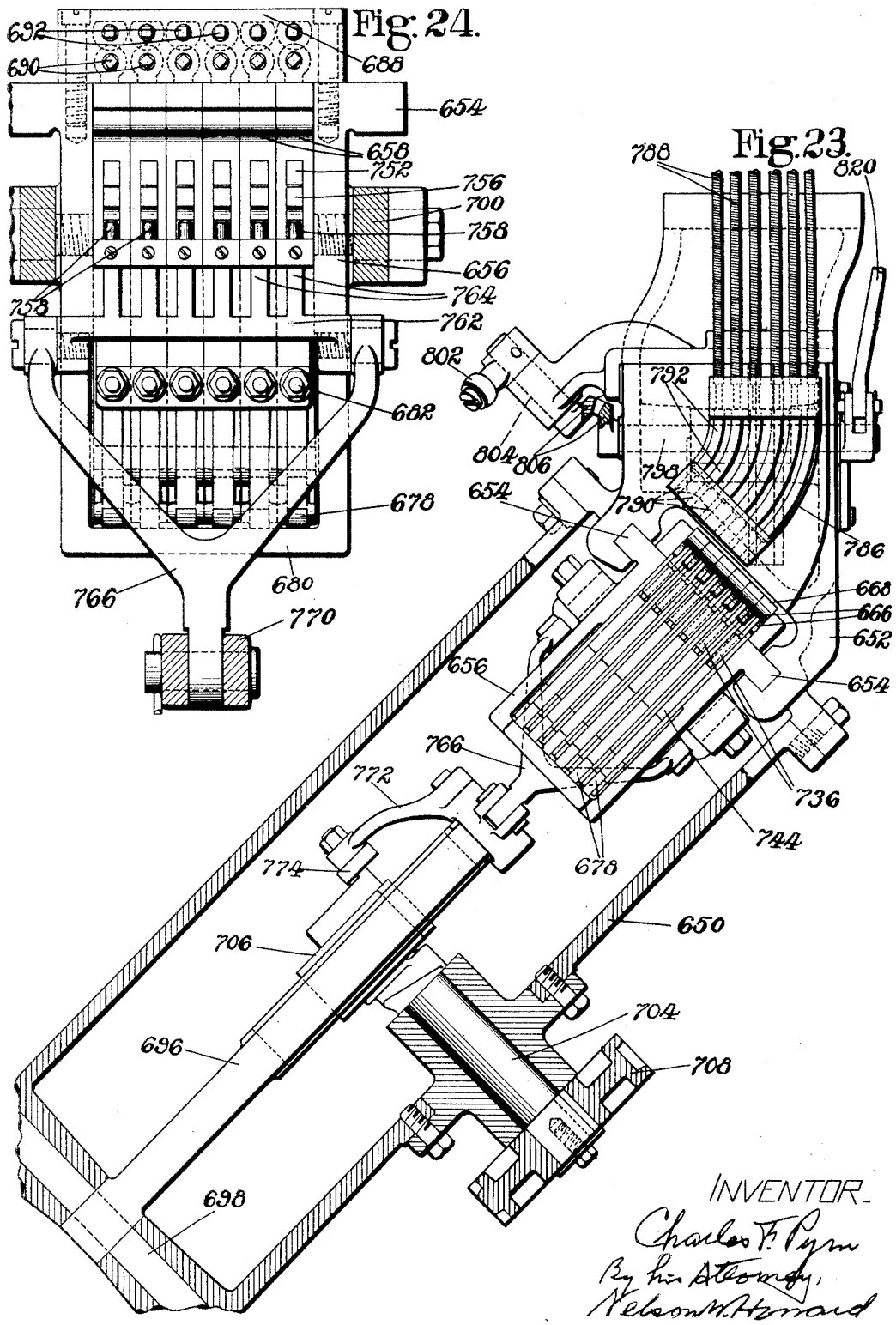

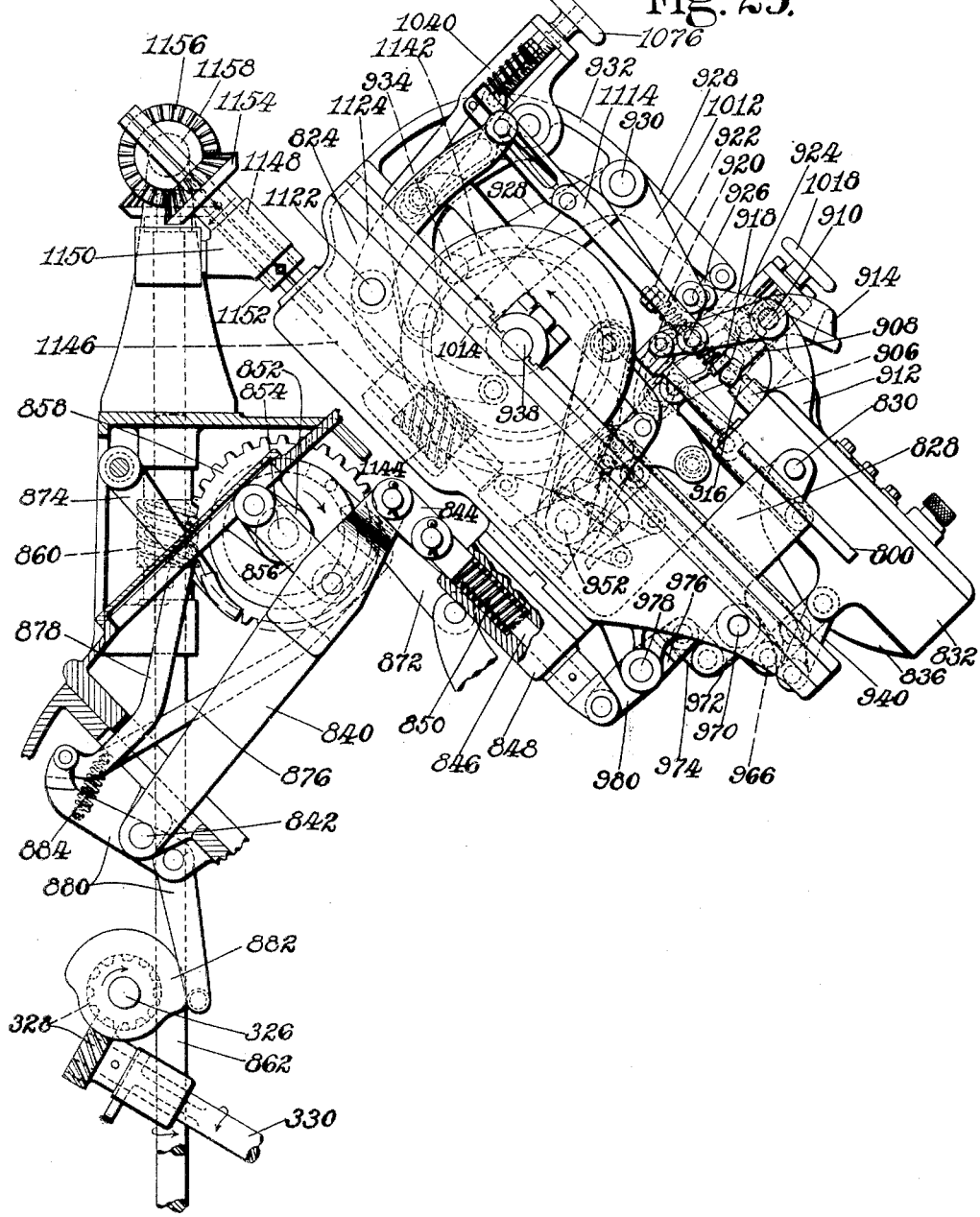

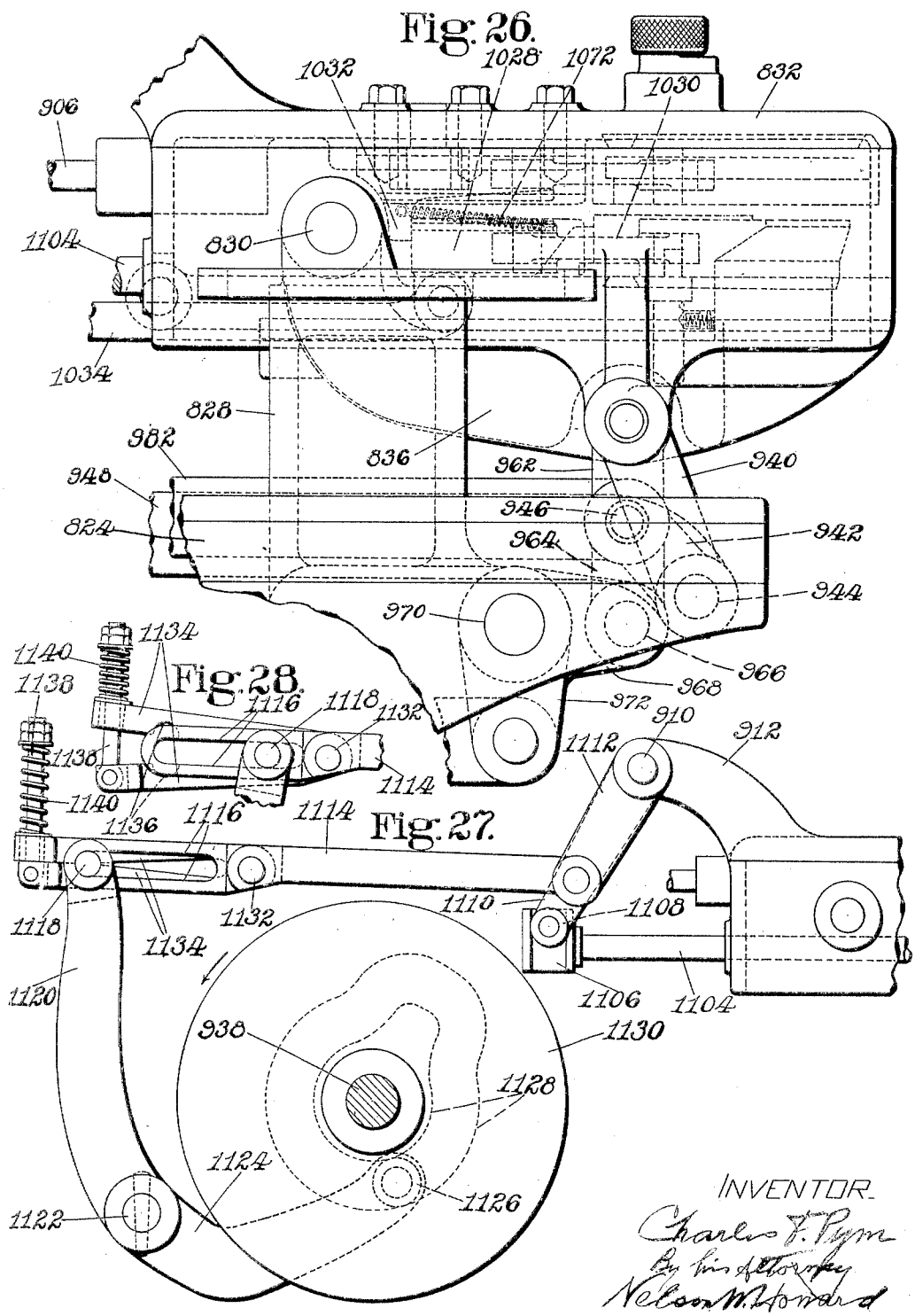

May 3, 1932.  C. F. PYM  1,856,292
MACHINE FOR SHAPING UPPERS OVER LASTS
Original Filed March 31, 1927  23 Sheets-Sheet 18

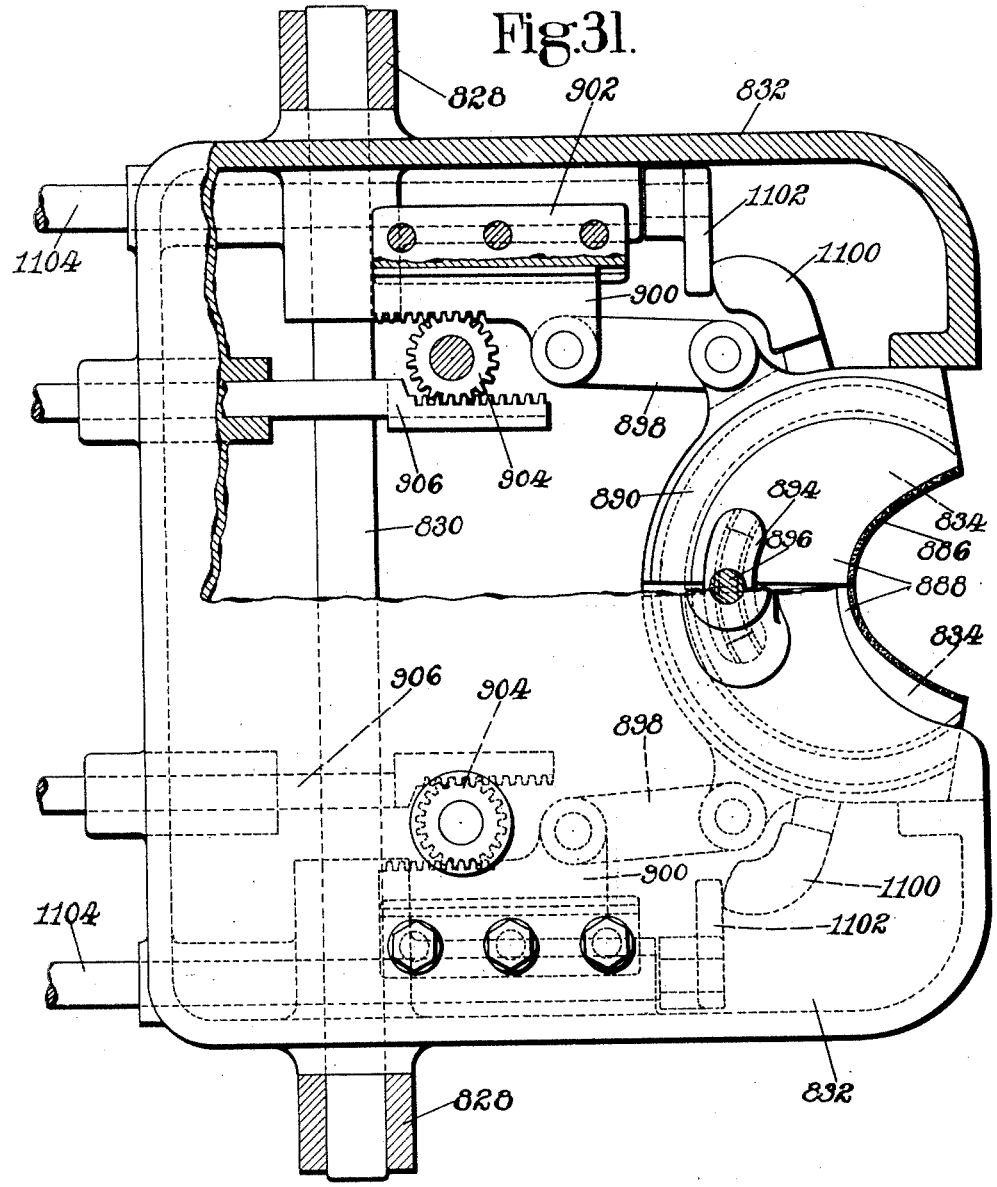

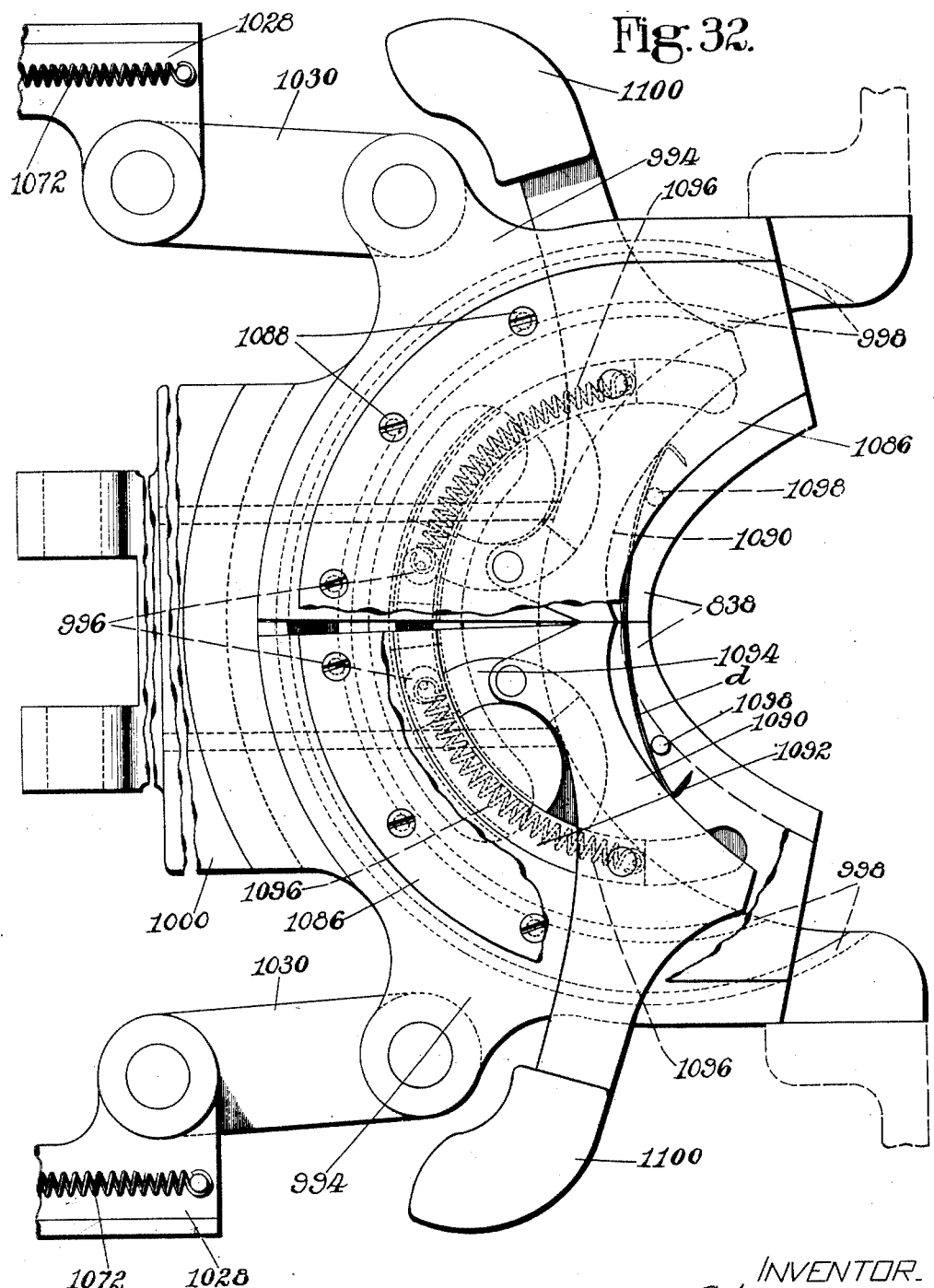

May 3, 1932.  C. F. PYM  1,856,292

MACHINE FOR SHAPING UPPERS OVER LASTS

Original Filed March 31, 1927   23 Sheets-Sheet 21

INVENTOR.
Charles F. Pym
By his Attorney,

May 3, 1932. C. F. PYM 1,856,292
MACHINE FOR SHAPING UPPERS OVER LASTS
Original Filed March 31, 1927 23 Sheets-Sheet 22

INVENTOR.
Charles F. Pym
By his Attorney,
Nelson W. Howard

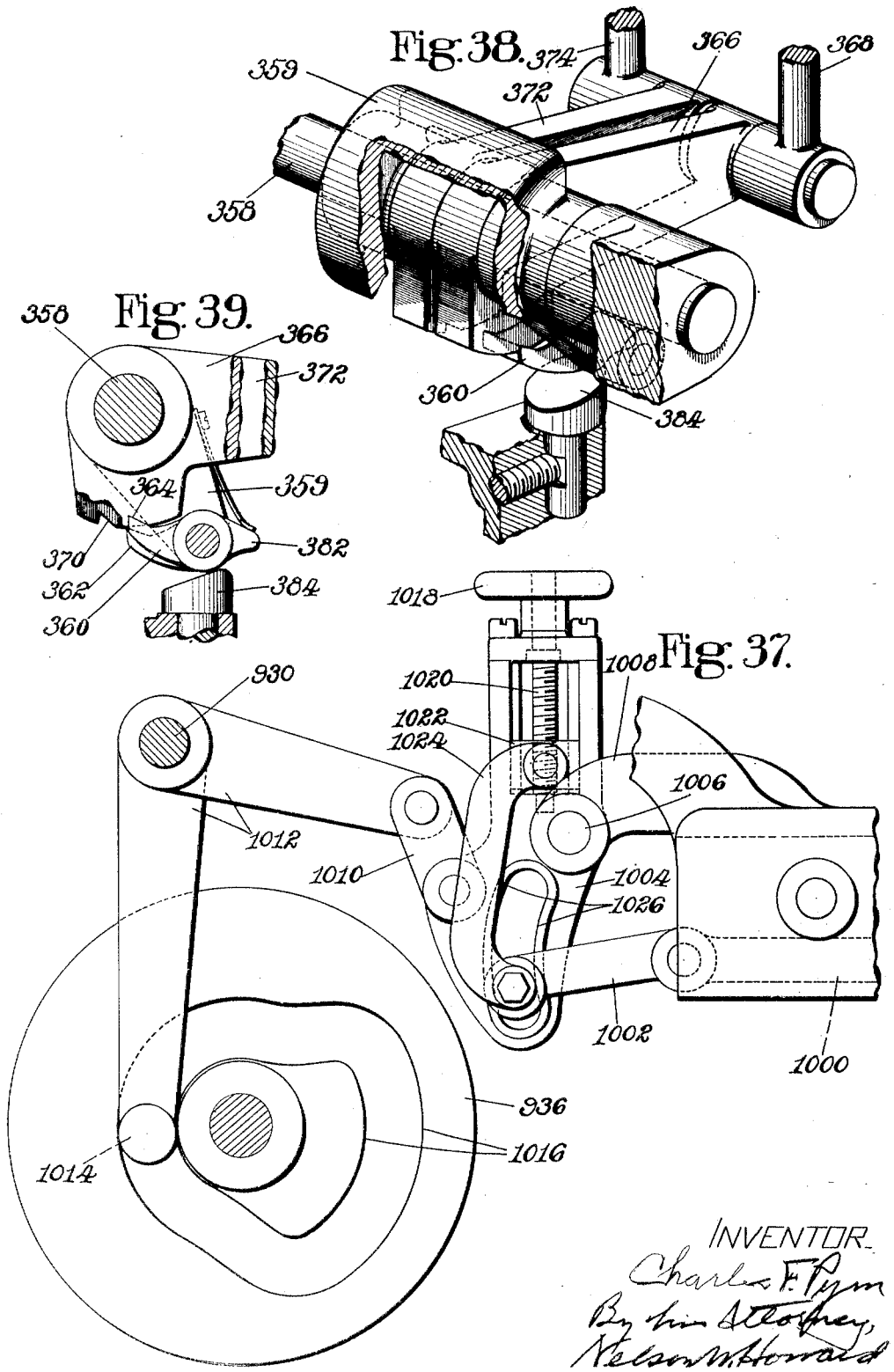

Patented May 3, 1932

1,856,292

UNITED STATES PATENT OFFICE

CHARLES F. PYM, OF BEVERLY, MASSACHUSETTS, ASSIGNOR TO UNITED SHOE MACHINERY CORPORATION, OF PATERSON, NEW JERSEY, A CORPORATION OF NEW JERSEY

MACHINE FOR SHAPING UPPERS OVER LASTS

Application filed March 31, 1927, Serial No. 179,969. Renewed June 24, 1930.

This invention relates to machines for shaping uppers over lasts in the manufacture of boots and shoes, and is herein illustrated in its application to a machine for pulling over the upper and for lasting the forepart of a welt shoe. It will be recognized, however, that in many of its novel and useful aspects the invention is not limited to welt shoe work nor to machines for performing both pulling-over and lasting operations.

It is a general object of the invention to provide a machine which will operate in accordance with the requirements of high-class work with as little need as possible for manual operations or for the exercise of a high degree of care and skill on the part of the workman, and also to facilitate such attention as the workman is required to give to the work in the course of the operation of the machine. For the purposes in view the invention, in one important aspect, provides a novel organization of pulling-over means and lasting means, the construction shown comprising means for pulling-over and for lasting the shoe at the toe and at the sides of the forepart substantially as far rearwardly as the ball line. Co-operating with the pulling-over means in shaping the upper about the toe, in the machine illustrated, are separate means for wiping the upper heightwise of the toe and for wiping it inwardly over the bottom of the last (i. e., for "upwiping" and for "overwiping" the upper) and also means for fastening the upper in lasted position by applying a binder about the toe, the upwiping means and the overwiping means being movable together toward the toe into operative position and the overwiping means being movable also relatively to the upwiping means heightwise of the toe to apply compacting pressure to the upper prior to the application of the binder. To enable the operator to view the work in the most advantageous manner, especially in the pulling-over portion of the cycle of the machine, the organization as a whole is so designed that the shoe is positioned bottom downward with its toe end pointing upwardly and rearwardly away from the operator's working position, although in many of its aspects the invention is not limited to an organization of that type.

The organization herein shown further comprises novel means operating and controlling the various instrumentalities which act on the shoe. As illustrated, the various instrumentalities including the pulling-over grippers, the toe-lasting mechanism and side-overlaying and fastening mechanisms are operated through separate clutches which are actuated automatically at the proper times in the cycle of the machine to start and to stop the operations of the different instrumentalities. It is a further characteristic of the machine herein shown that the toe grippers and the side grippers are operated respectively through different clutches, thus permitting the side grippers to be conveniently operated for releasing the upper prior to the toe grippers; and there are also provided separate clutches for imparting respectively to the toe-lasting mechanism bodily positioning movement toward the shoe and operative lasting movements. The various clutches are controlled by mechanism which is operated through a main treadle-controlled clutch, and automatic means is provided for controlling this clutch to stop the machine at an intermediate point in the cycle between the upper-pulling and the lasting operations to permit inspection and any necessary adjustment of the upper relatively to the last.

Further important novel features of the invention are to be recognized in the illustrated means for lasting the toe of the shoe. In addition to various novel features in the construction and arrangement of the wipers and their operating mechanisms, the invention provides novel means for determining the position of the overwiping means or wipers heightwise of the shoe in accordance with the character of the shoe. More particularly, the construction shown comprises mechanism controlled by engagement with the shoe for determining the position of the overwiping wipers relatively to the bottom face of the shoe in accordance with the thickness of the upper materials preparatory to the overwiping operation, so that the wipers in operating on different shoes will be in the best position for wiping the margin of the upper inwardly over the insole with effective pressure while at the same time insuring against damage to the shoe materials. As herein illustrated, the upwiping wipers are utilized through engagement with the upper at the end of the toe to control mechanism which imparts to the overwiping wipers positioning movement heightwise of the toe. It is a further novel and advantageous characteristic of the construction shown that the upwiping wipers also receive a positioning movement heightwise of the shoe under control of the same mechanism which positions the overwiping wipers, so that the position of the upwiping wipers at the end of their upwiping movement will be determined by the thickness of the upper materials.

Another feature of the toe-lasting mechanism comprises novel means for controlling the overwiping wipers so that they will wipe the upper inwardly to the same distance from the edge of the shoe bottom in operating on different shoes. As herein illustrated, a preliminary closing movement of the overwiping wipers into position to begin the overwiping operation is effected by the closing of the upwiping wipers about the sides of the toe, so that the overwiping wipers are positioned laterally of the toe of each shoe in accordance with the size and shape of the shoe. Thereafter there is imparted to the overwiping wipers a positive closing movement of fixed extent through novel mechanism including a take-up connection which automatically adjusts itself in accordance with the extent of the preliminary closing of the wipers. In the construction shown, moreover, the position of the overwiping wipers lengthwise of the shoe also is determined by engagement of the upwiping wipers with the end of the toe, and since the overwiping wipers receive a positive movement of fixed extent lengthwise of the shoe in operating on the shoe, insurance is thus afforded that they will wipe the upper inwardly to the same distance from the edge of the shoe bottom at the end of the toe as well as at the sides of the toe in operating on different shoes.

Various novel features are also to be recognized in the means provided for overlaying and fastening the upper at the sides of the forepart at the rear of the toe, the construction shown comprising a novel arrangement of wiper and tacker units which are relatively movable both laterally and heightwise of the shoe in accordance with the contour of the shoe and operate to wipe the upper inwardly substantially from the tip seam to the ball line of the shoe and to drive a plurality of tacks to hold the upper in overwiped position. Further features comprise novel means for effecting a relative displacement of the tack holders and other portions of the overlaying and fastening mechanism preparatory to delivery of the tacks thereto, and novel means for delivering the tacks including mechanism for inverting them so as to deliver them head downward.

The pulling-over portion of the illustrated machine also includes various novel features. One of these features comprises novel means adapted to be utilized, if conditions require it, after the pulling of the upper by the grippers, to cause the grippers to release the upper and return to starting position and then to pull the upper again. As herein illustrated, this result is accomplished through manual control of the clutches through which movements are imparted to the toe and side grippers independently of other portions of the machine. There is also provided a novel organization of grippers and operating means therefor, and novel features of gripper construction, including, as herein shown, mechanism operative independently of the means for imparting upper-pulling movement to each gripper for effecting relative closing movement of the gripper jaws by the turning of a screw-threaded member in the gripper. Novel means is also provided for drawing the upper inwardly over the edge of the shoe bottom in proper time relation to the operations of the side-overlaying and fastening mechanisms, the construction shown comprising spring-operated mechanism associated with each of a plurality of grippers and arranged to be tripped to impart to the grippers their overdrawing movements. Still other features of the pulling-over means comprise a novel construction of operating mechanism whereby the grippers are withdrawn farther from the shoe after releasing the upper, and novel means for moving the side grippers to shift the opposite side portions of the margin of the upper lengthwise of the last, for example to position the tip seam in proper relation to the last, for moving them to increase or relax the force of the pull on the upper, and for effecting in various ways relative adjustments of the grippers.

The above and other features of the invention, including also novel means for controlling the starting mechanism and various novel details of construction and combinations of parts, will now be more particularly described by reference to the accompanying drawings and pointed out in the claims.

In the drawings,

Fig. 5 is a view looking in the direction of the arrow A of Fig. 1, with parts broken away;

Fig. 6 is a view similar to Fig. 5, showing on an enlarged scale and in greater detail that portion of the mechanism which is shown in the lower portion of Fig. 5, with some of the parts in different positions;

Fig. 7 is a section on the line 7—7 of Figs. 2 and 6, showing a portion of the mechanism for controlling the closing and opening of the side grippers;

Fig. 8 is a section partly on the line 8—8 of Figs. 2 and 6 and partly in a central vertical plane;

Fig. 16 is a sectional view through one of the side grippers;

Fig. 17 shows one of the side grippers in elevation;

Fig. 18 is a sectional view through a portion of one of the toe grippers;

Figure 10:
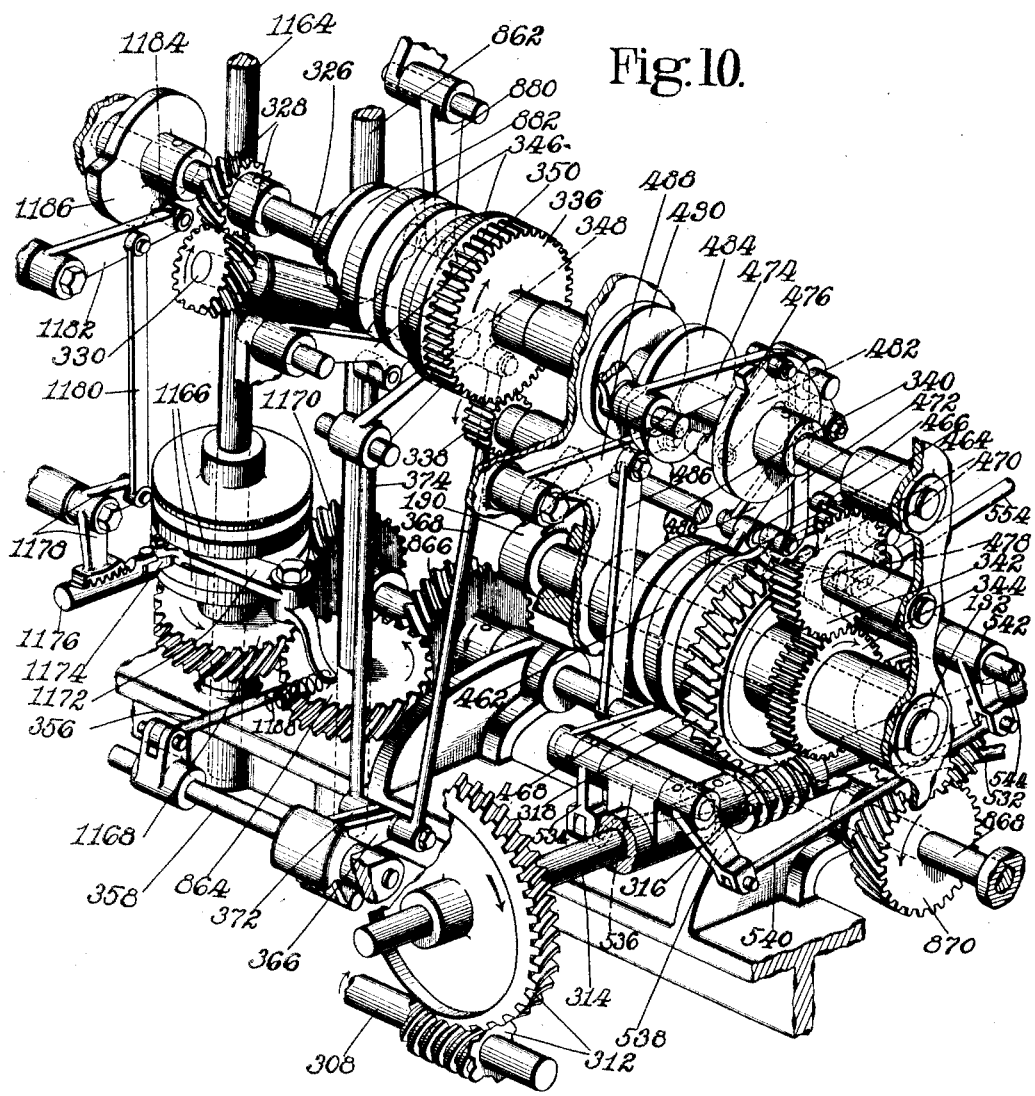
Fig. 10 is a perspective view of the operating and controlling mechanism shown in the lower left-hand portion of Fig. 1.
Figure 29:
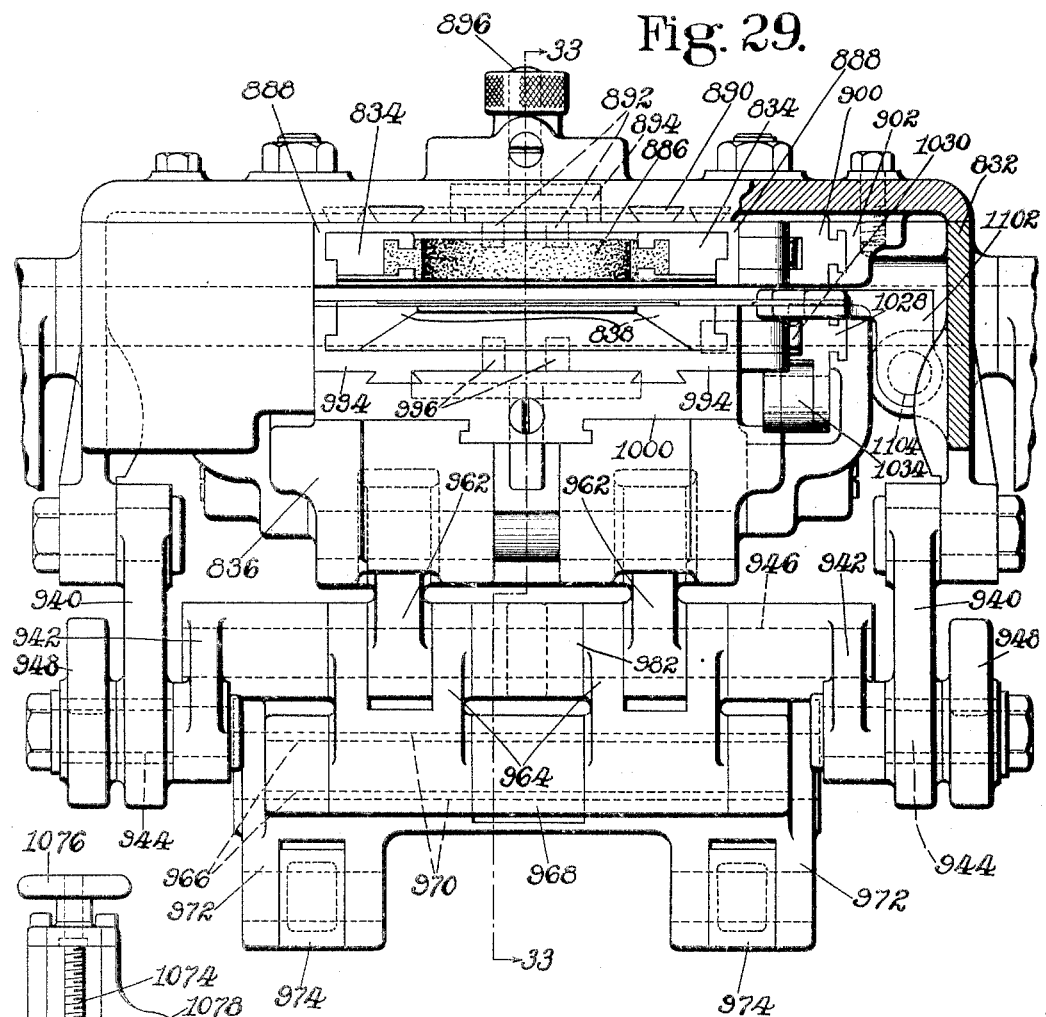
Figure 30:
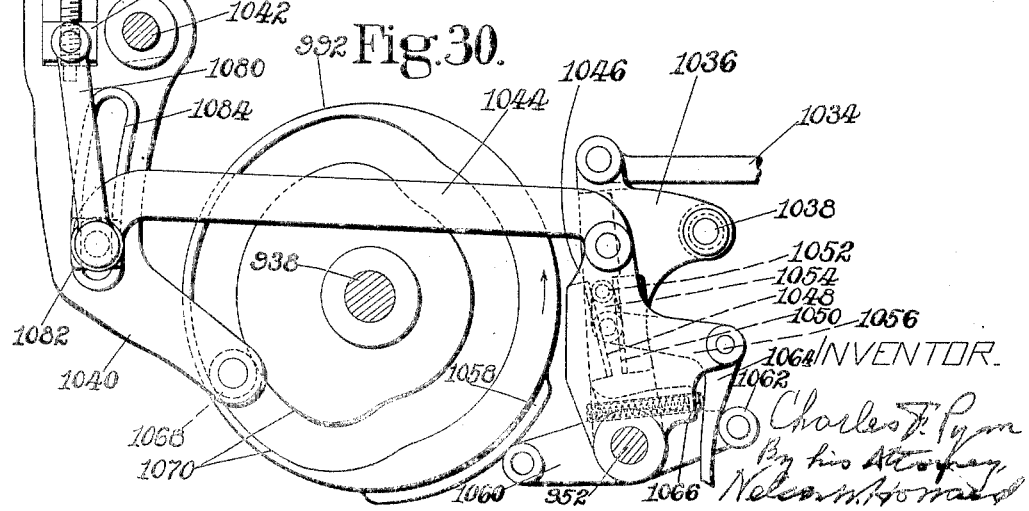
Figures 33, 34:
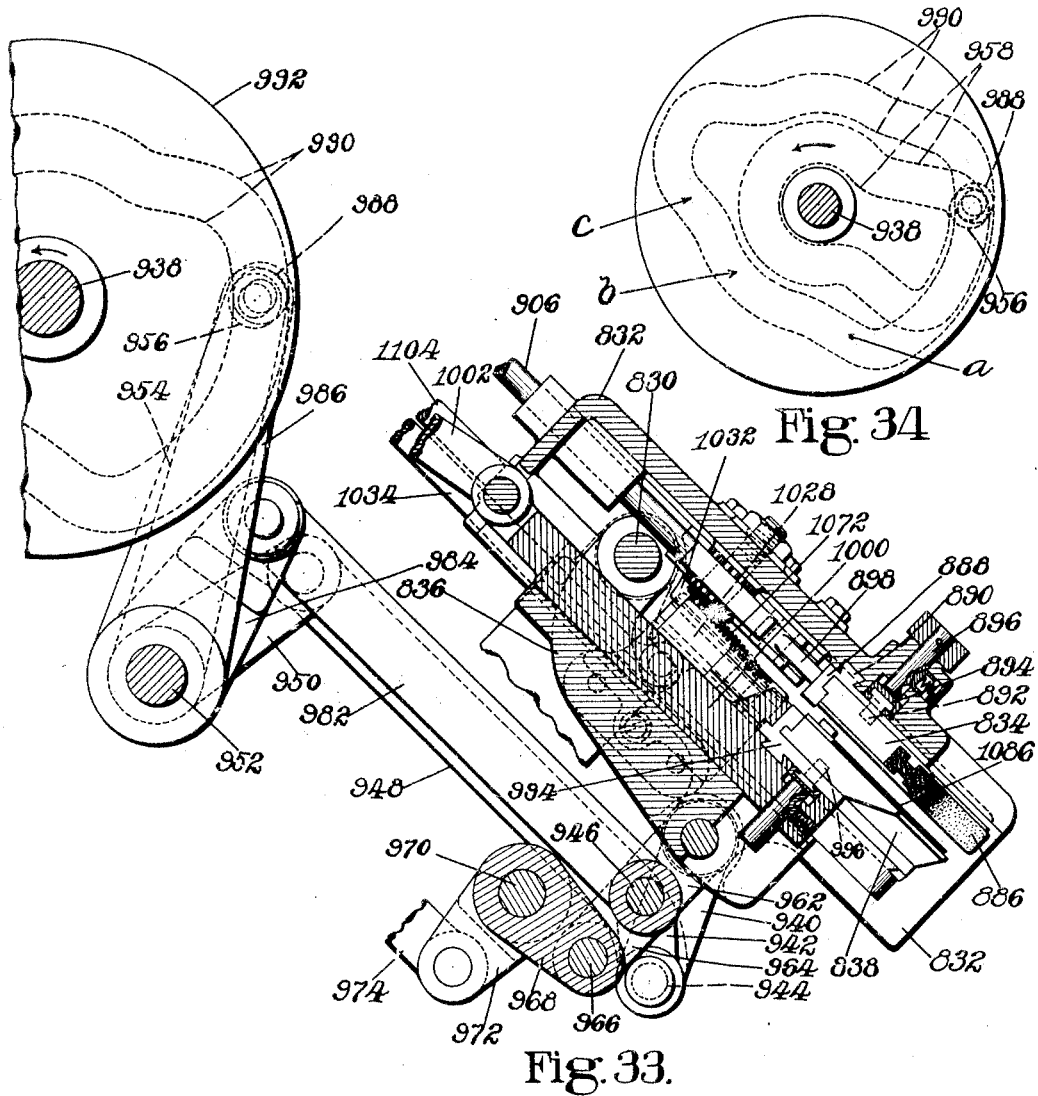
Figure 35:
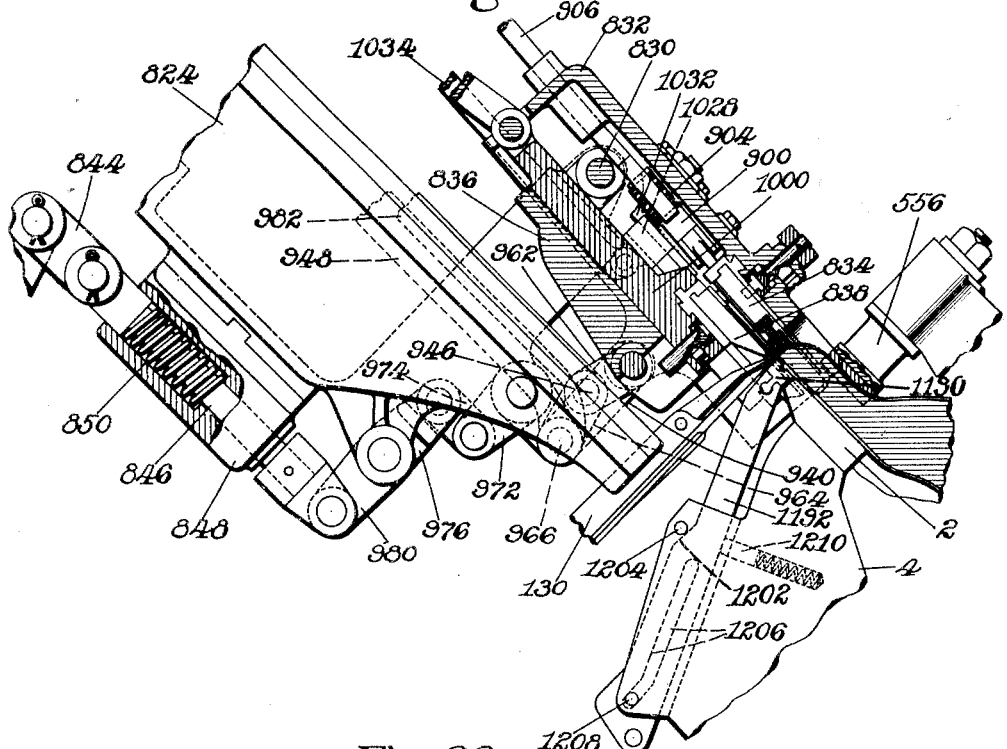
Figure 36:
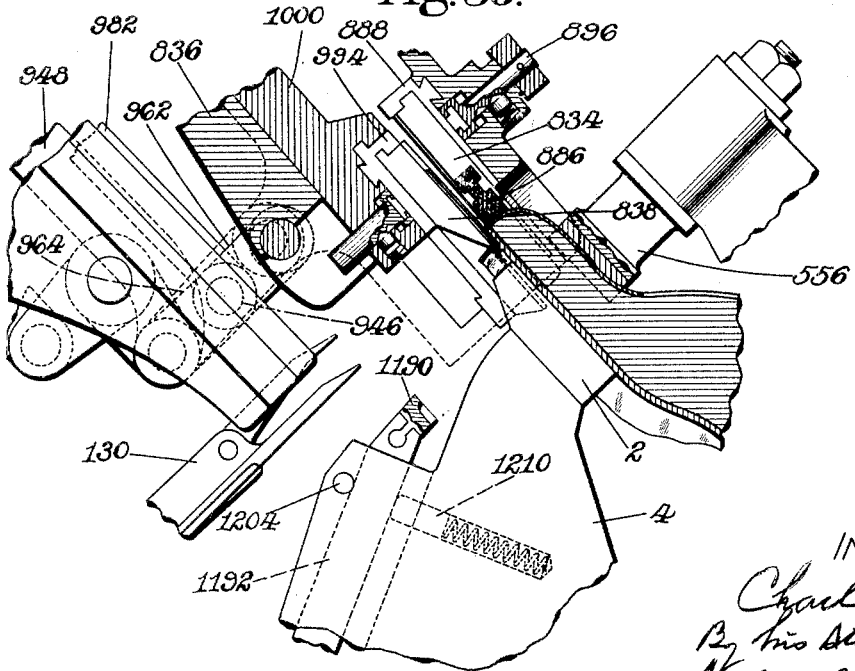

Figs. 19, 20 and 21 are sections on the lines 19—19, 20—20 and 21—21, respectively, of Fig. 16;

Fig. 22 is a sectional view of one of the mechanisms provided for overlaying and fastening the upper at the sides of the shoe, with the parts in upper-fastening position;

Fig. 22ª shows the parts at the left-hand side of Fig. 22 as they appear in tack-receiving position;

Fig. 23 shows the overlaying and fastening mechanism shown in Fig. 22, as viewed from the left-hand side of the latter, together with portions of the operating and tack-supplying mechanisms;

Fig. 23ª shows a portion of the means for separating and inverting the tacks;

Fig. 24 shows portions of the structure of Fig. 23 as viewed from the opposite side;

Fig. 25 is a view substantially in side elevation of the toe-lasting mechanism;

Fig. 26 shows more in detail, on an enlarged scale, portions of the wiper head and associated parts shown at the right-hand side of Fig. 25;

Fig. 27 is a section on the line 27—27 of Fig. 5, showing portions of the mechanism for applying and fastening the toe binder to the shoe;

Fig. 28 shows a portion of the structure of Fig. 27 with the parts differently positioned;

Fig. 29 is a view substantially in front elevation of the toe-lasting mechanism, with parts broken away;

Fig. 30 is a section on the line 30—30 of Fig. 5, showing a portion of the mechanism for closing the overwiping wipers;

Fig. 31 shows the wiper head and the upwiping wipers partly in plan and partly in section;

Fig. 32 is a plan view of the overwiping wipers and associated parts, with portions of the structure broken away;

Fig. 33 is a sectional view on the line 33—33 of Fig. 29;

Fig. 34 shows diagrammatically and more in detail two of the operating cams;

Figs. 35 and 36 are sectional views through the toe-lasting mechanism, illustrating different positions of the parts in the operation of the machine;

Fig. 37 is a section on the line 37—37 of Fig. 5, showing portions of the mechanism for advancing the overwiping wipers;

Fig. 38 is a detail view of a portion of the starting and stopping mechanism illustrated in Fig. 10;

Fig. 39 is a detail view of a portion of the structure shown in Fig. 38; and

Figure 40:
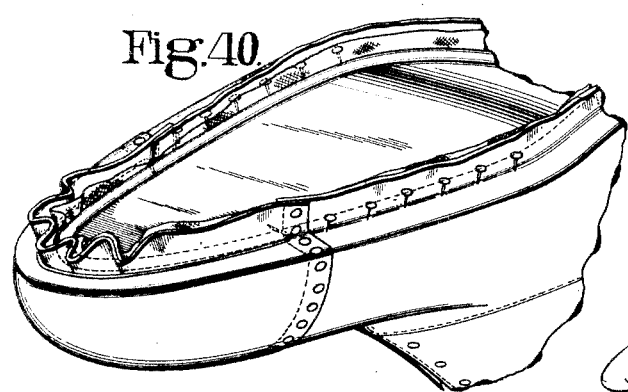

Fig. 40 shows in perspective a shoe that has been operated upon by the machine.

Figure 1:
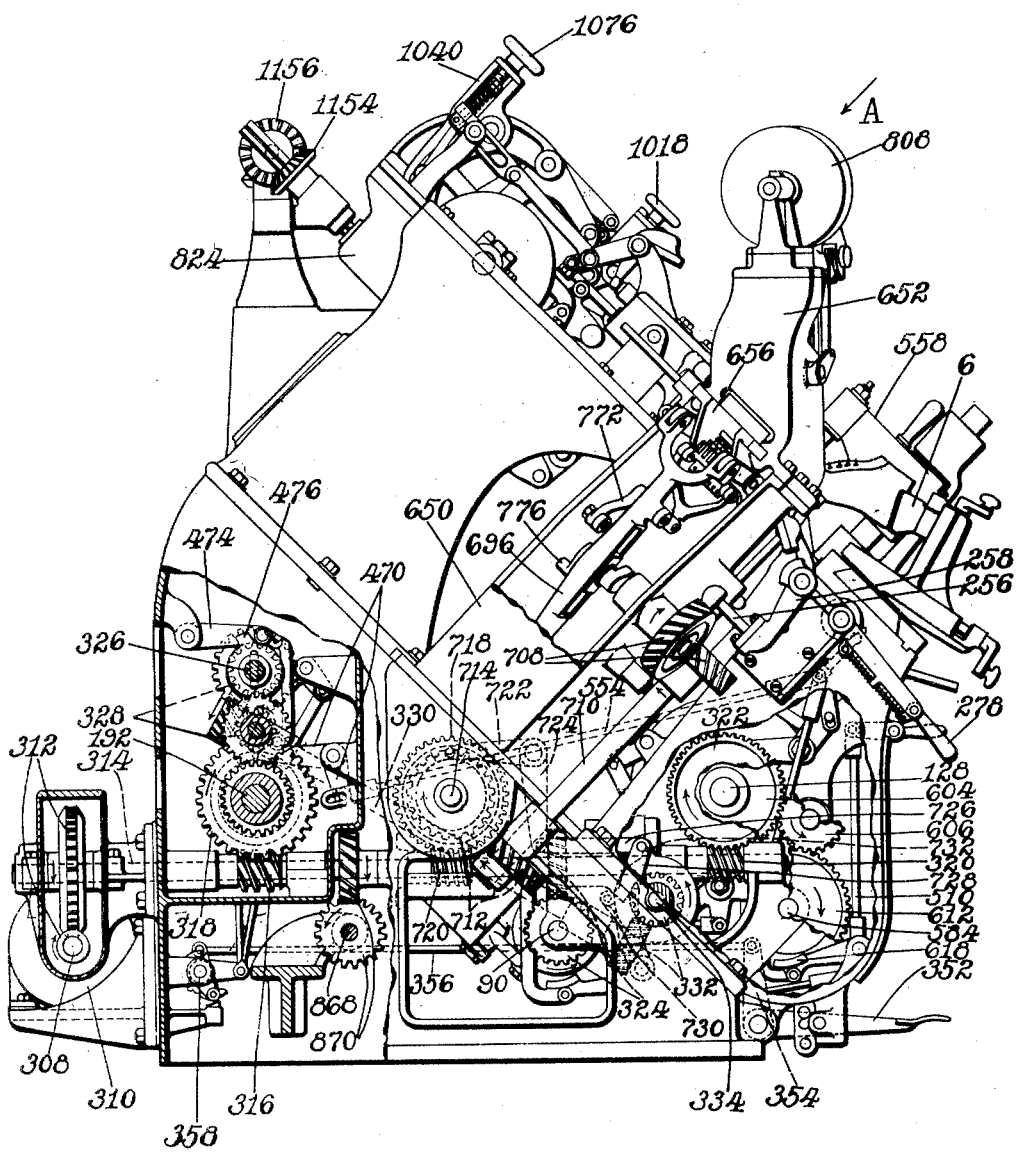
Fig. 1 is a view in side elevation of a machine in which the invention is embodied, with parts of the structure broken away.

The last and its shoe materials are positioned for the operation of the machine, as illustrated in Figs. 1 and 8, in such manner that the toe end of the last points upwardly and toward the rear of the machine, so that the operator may conveniently view the top of the forepart of the upper by looking downwardly and forwardly upon it. The forepart of the shoe is positioned upon a sole rest 2 (Fig. 8) mounted upon a fixed bracket 4. At its heel end the shoe is embraced by a substantially V-shaped heel rest 6 mounted on a slide 8 which is adjustable heightwise of the shoe in guideways formed in a member 10, the adjustment being effected by means of a screw 12 operated by a hand crank 14. The member 10 is adjustably movable lengthwise of the shoe in guideways formed in a holder 16, and is adjusted by means of a screw 18 and a hand crank 20. The holder 16 is mounted for rectilinear adjustment laterally of the shoe in guideways formed in a fixed portion of the frame, and is clamped in adjusted position by means of a lever 22 which acts on a screw connected to a clamping block 24. By this means the heel rest 6 is mounted for adjustment in various directions to conform properly to any size or style of shoe. It will be understood that the adjustment will be so effected that the heel rest will properly engage the heel end of a shoe positioned with the toe end face of its last in engagement with the inner jaw of the gripper (hereinafter described) which grips the upper at the end of the toe, this jaw acting as a gage to determine the proper lengthwise position of the shoe. The V-shaped heel rest member 6 will preferably be positioned at such an angle to the plane of the sole rest 2 as to prevent upward tipping of the heel end of the shoe in response to the pull of the upper-pulling means at the forepart of the shoe.

Figure 2:
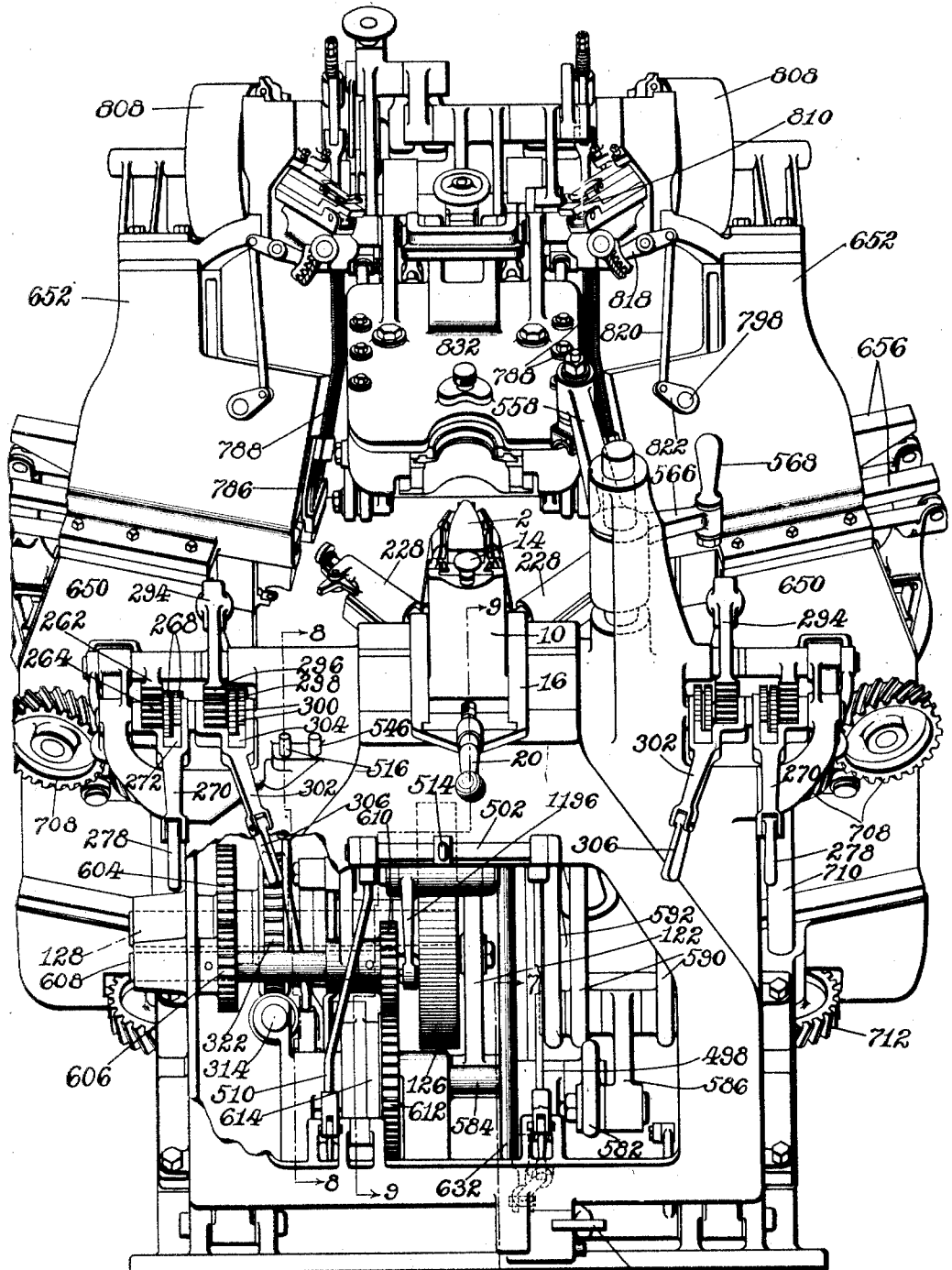
Fig. 2 shows the machine substantially in front elevation.
Figure 13:
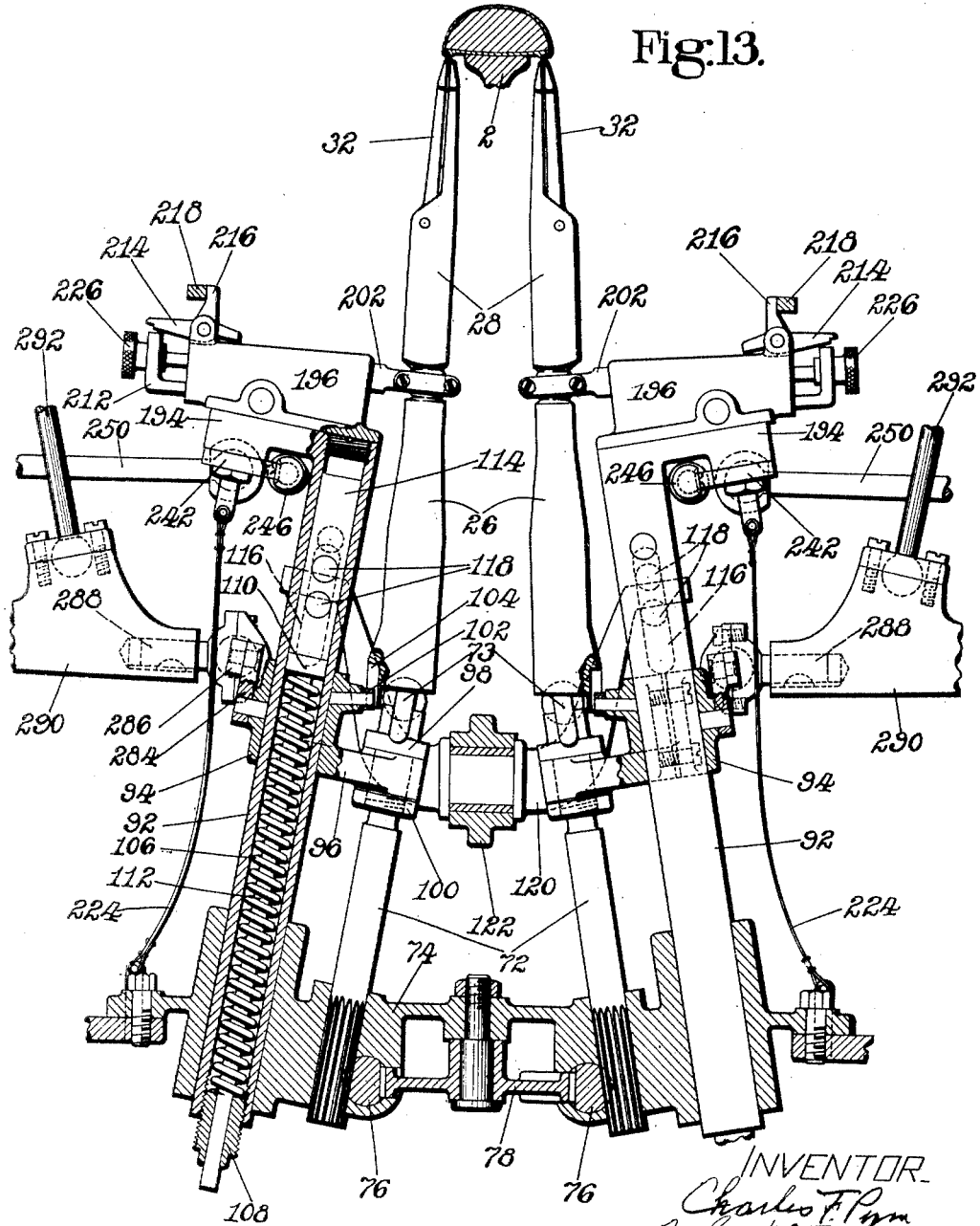
Fig. 13 is a view partly in elevation and partly in section showing two of the opposite side grippers with portions of their operating and controlling mechanism.

For pulling the upper there are provided a pair of grippers at each side of the forepart at the rear of the toe, and a group of three grippers for gripping the upper about the toe, as illustrated generally in Figs. 2 and 5. The general arrangement of the opposite side grippers is shown in Fig. 13, and constructional details are shown more fully in Figs. 16 and 17. Each gripper comprises a casing 26 upon the upper end of which is threaded a member 28 so formed as to serve as the inner jaw of the gripper, and upon this member there is pivoted at 30 a co-operating gripper jaw 32. The jaws are provided with recesses 34 in their opposed gripping faces for better hold on the stock. The threaded connection between the member 28 and the casing 26 permits the member 28 to be turned to adjust the gripper jaws in proper relation to the contour of the adjacent portion of the side of the last for different styles and sizes of shoes. To hold the jaws in adjusted position there is provided, in a recess in the lower end of the member 28, a block 36 having teeth thereon extending lengthwise of the gripper and arranged to engage similarly extending teeth 38 formed on the upper threaded end of the casing 26, as illustrated in Fig. 19. By means of a clamping screw 40 the block 36 is held permanently attached to the lower end of a spring plate 42, the upper end of which is mounted in grooves formed in the member 28. To release the member 28 and permit it to be turned relatively to the casing 26, the operator takes hold of the enlarged head of the screw 40 and pulls the lower end of the spring plate 42 outwardly far enough to disconnect the block 36 from the teeth 38. After the gripper jaws have been adjusted as desired, the operator releases the plate 42, which by its resiliency presses the block 36 again into engagement with the teeth 38.

Mounted within the member 28 is a closing slide 44 provided with a pin 46 for engaging the curved lower end of the jaw 32 to swing the jaw into open position, and having a wedge face 48 for engaging the curved end of the jaw on the opposite side from the pin to swing the jaw into closed position as the slide is moved lengthwise of the gripper toward the gripping faces of the jaws. The slide 44 at its lower end has a threaded connection with a plunger 50 which is slidingly mounted in the upper end of the casing 26 and has fast on its lower end an internally threaded sleeve 52. The sleeve 52 at its lower end is provided with ears 54 which run in grooves formed in the casing 26 to prevent the plunger 50 and the sleeve 52 from turning. Theaded within the sleeve 52 is a screw 56 rotatable about an axis extending lengthwise of the gripper and provided with a squared lower end portion 58 slidably mounted in a similarly shaped recess formed in a rotatable operating member 60. The member 60 has a shouldered portion which rests upon a ball bearing 62 held in the lower end of the casing 26 by means of a threaded bushing 64 through which the lower end of the member 60 extends. The upper end portion of the member 60 is provided with an annular recess to serve as a housing for a spring 66, the upper end of which bears against a flange 68 on the screw 56. Between the flange 68 and a shouldered portion of the casing 26 is a ball bearing 70.

It will be seen that when the operating member 60 and the screw 56 are turned in one direction, the sleeve member 52 and the plunger 50 will be forced upwardly to cause the closing slide 44 to impart closing or gripping movement to the jaw 32. When the resistance to the closing of the jaw becomes so great that the member 52 can be forced no farther upwardly, continued turning movement of the screw 56 will cause the latter to move downwardly in the threaded sleeve 52 against the resistance of the spring 66, which thereby becomes compressed. When turning movement of the operating member 60 ceases, the gripper jaw 32 will be held in closed position by the force of the spring 66 through its upward pressure against the flange 68 on the screw 56. To open the gripper and release the upper, the operating member 60 is turned in the opposite direction, as a result of which the member 56 is screwed upwardly in the sleeve member 52, thereby relieving the compression of the spring 66 until the flange 68 is seated against the ball bearings 70, and then by continued movement pulling the member 52 and the plunger 50 downwardly within the casing 26. In such closing and opening of the gripper the casing 26 is held from turning by means hereinafter described.

Figure 4:
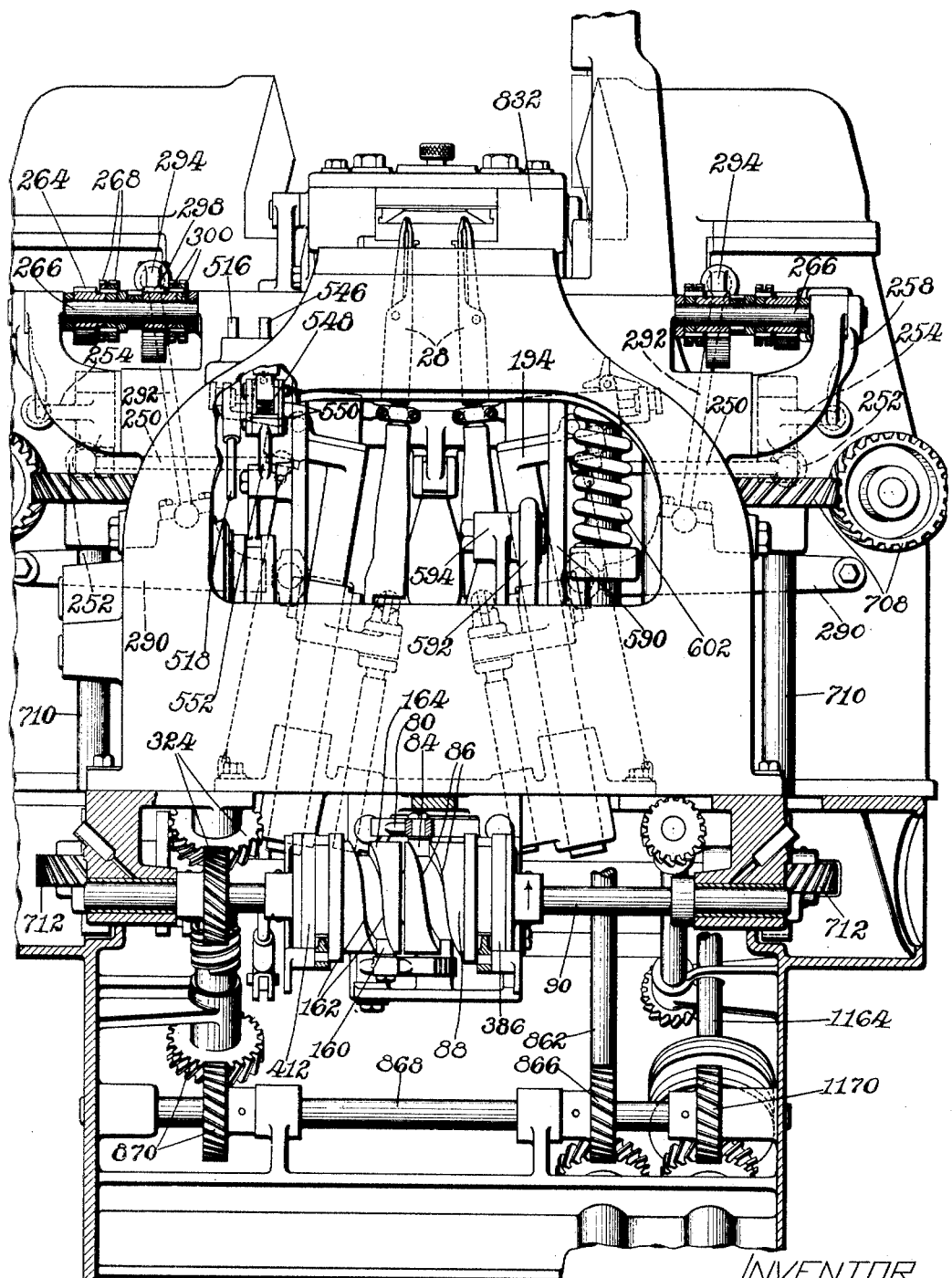
Fig. 4 is a view looking diagonally upward and rearward from the lower portion of the front of the machine, with parts of the operating mechanism at the lower front portion of the machine broken away, and with other parts in section.
Figure 11:
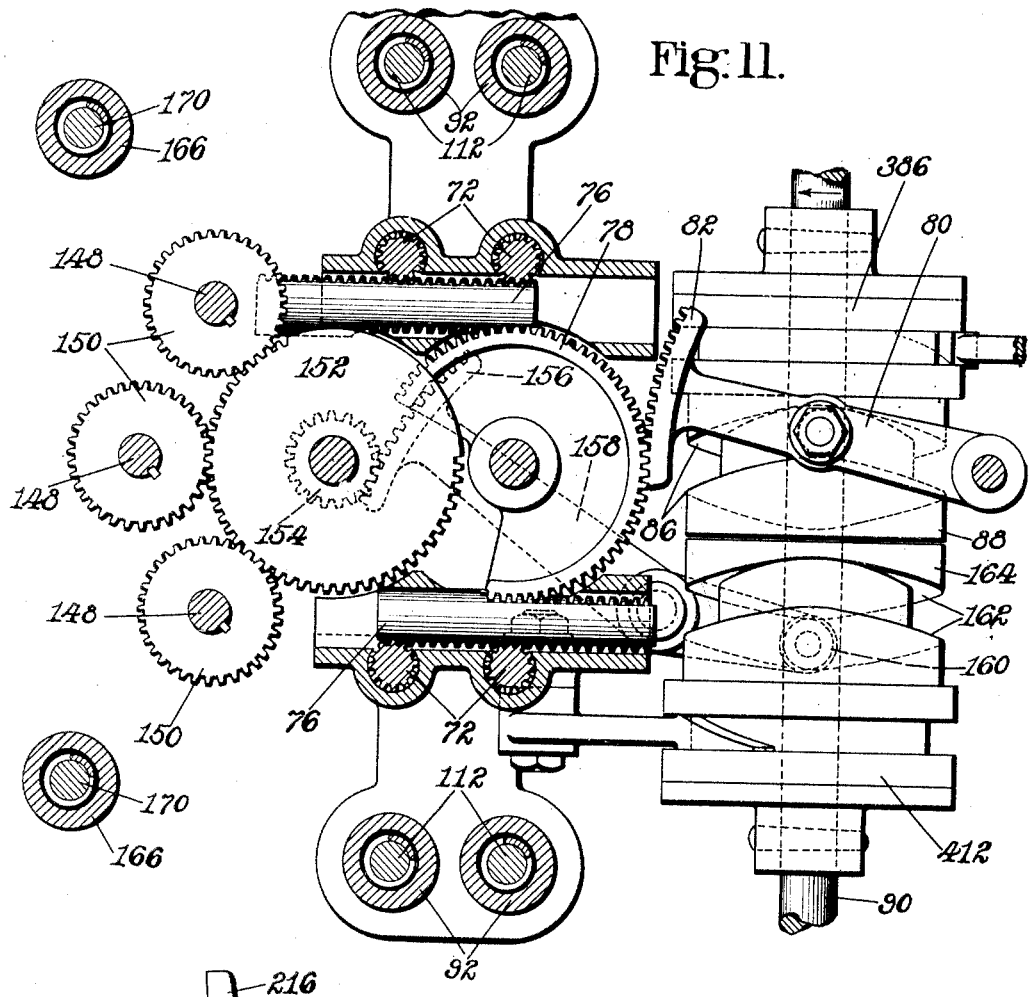
Fig. 11 is a sectional view showing portions of the mechanism provided for opening and closing the several grippers.

For turning the member 60 to close and open the gripper in the manner above described, each of the side grippers is provided with a shaft 72 (Figs. 11 and 13) connected by a universal joint 73 to the member 60 and rotatably and slidably mounted in a bearing formed in a fixed bracket 74. At its lower end each of the shafts 72 has elongated gear teeth formed thereon, and in operative engagement with these gear teeth are rack bars 76. It will be seen (Fig. 11) that there is a single rack bar 76 for operating the shafts 72 of each pair of side grippers. The two rack bars are operated simultaneously by a single gear sector 78 rotatably mounted on the bracket 74. For operating the gear sector 78 there is provided a lever 80 pivotally mounted at one end and having on its opposite end a curved rack 82 in engagement with the teeth of the sector 78. Between its ends the lever 80 is provided with a roll 84 (Fig. 4) engaged by a path cam 86 formed in a cam wheel 88 which is loosely mounted on a shaft 90 and controlled as hereinafter described.

For operating the side grippers to pull the upper, there is associated with each gripper a hollow plunger 92 which is slidingly mounted in a bearing in the bracket 74 in parallel relation to the gripper-closing shaft 72. The plunger 92 is connected at its upper end to the gripper casing 26 by mechanism which will be hereinafter described, and it is also connected between its opposite ends to the upper end portion of the shaft 72. For the latter purpose there is secured to the plunger 92 a sleeve 94 provided with an arm 96 which forms a bearing for the upper end portion of the shaft 72. The arm 96 on its upper face engages a flange 98 which is a part of the universal joint connecting the shaft 72 to the jaw-closing member 60 of the gripper, and on its lower face the arm engages a collar 100 which is fast on the shaft 72. By this means the plunger 92 and the shaft 72 are so connected that the shaft is moved lengthwise in its bearing in the bracket 74 in response to lengthwise movement of the plunger. The sleeve 94 is further provided with a roll 102 which lies in a recess 104 in the gripper casing 26 to prevent turning of the casing in the closing or opening of the gripper jaws.

Downward movement of the plunger 92 for imparting upper-pulling movement to the gripper is effected yieldingly through a spring 106 which is mounted between a bushing 108 threaded in the lower end of the plunger and the head 110 of a rod 112 which is slidingly mounted in the bushing 108. Above and resting upon the head 110 is an inner plunger 114 which acts through the head 110 and the spring 106 to impart operative downward movement to the plunger 92. The hollow plungers 92 associated with the pair of side grippers at each side of the shoe are provided with slots 116, and extending through these slots are a pair of pins 118 which are rigidly connected to the two corresponding inner plungers 114. For engaging the opposite pairs of pins 118 there is provided a yoke member 120 having arms which extend upwardly and laterally into positions between the pins. The yoke member 120 midway between its opposite ends is connected to the forked end of a lever 122 (Figs. 5 and 9) which is pivotally mounted at its opposite end and is provided with a roll 124 engaged by a path cam formed in one side of a cam wheel 126 fast on a shaft 128 operated as hereinafter described. It will be understood that when the yoke member 120 is moved downwardly by the lever 122, the several plungers 114 are all moved downwardly together and through the springs 106 impart downward movements also to the plungers 92 and to the grippers connected therewith. While all the side grippers are thus moved downwardly together, they are independent of one another as far as the extent or limit of the upper pulling movement is concerned, since the different springs 106 are independently yieldable in accordance with the amount of resistance encountered by the different respective grippers. When the yoke member 120 is moved upwardly the plungers 114 raise the plungers 92 and the connected grippers to starting position. It will be understood that by adjusting the bushings 108 in the lower ends of the plunger 92 the tensions of the different springs 106 may be altered to vary, as desired, the force of the pull effected by the different grippers. That pair of opposite side grippers which is nearest the toe end of the shoe is preferably arranged to engage the upper substantially at the ends of the tip line, on shoes that are provided with tips, while the other pair of side grippers may engage the upper at or near the ball of the last.

The construction of each of the toe grippers is substantially like that of the side grippers, such differences as there are being illustrated in Fig. 18. It will be seen that there is a member 130 which is shaped to serve as one of a pair of gripper jaws and is threaded on the upper end of a casing 132. Pivoted at 134 on the member 130 is a co-operating jaw 136 which, as illustrated, is preferably shorter than the corresponding jaw of each side gripper. The member 130 may be turned about the casing 132 to adjust the jaws to the contour of the last, and is held in adjusted position in the same manner as the corresponding member of each side gripper. Within the member 130 is mounted a closing slide 138, having a pin 140 for engaging the curved lower end of the jaw 136 to swing the jaw into open position, and a wedge face 142 for imparting closing movement to the jaw. The slide 138 is connected at its lower end to an internally threaded plunger 144 in the casing 132, this plunger being engaged by an operating screw 146 for closing and opening the gripper. The threads of the screw 146 are of somewhat greater pitch than the threads of the corresponding screw in each side gripper, to compensate for a difference in leverage as between the jaw 136 and the corresponding side gripper jaw.

The means for operating the jaw-closing screw 146 of each of the toe grippers is substantially like that hereinbefore described in connection with the side grippers. The operating means (Fig. 8) comprises a shaft 148 connected by a universal joint to the member within the casing 132 by which the screw 146 is operated, this shaft being splined at its lower end in the hub of a pinion 150 which is rotatable in a bearing formed in the bracket 74. The several pinions 150 (Fig. 11) are all engaged and operated by a gear sector 152 connected to which there is a pinion 154 operated by a curved rack 156 on the end of a lever 158. The lever 158 carries a roll 160 which is engaged by a path cam 162 formed in a cam wheel 164 loosely mounted on the shaft 90 adjacent to the cam wheel 88 for closing and opening the side grippers.

The three toe grippers are operated in unison to pull the upper by means which is similar to that described for operating the side grippers. Associated with each toe gripper is a hollow plunger 166 slidingly mounted in a bearing in the bracket 74 and connected at its upper end to the gripper by means hereinafter described. Secured to the plunger 166 between its ends is a bracket 168 which is formed to provide a bearing for the shaft 148 and is so connected to the shaft that the latter is moved lengthwise with the plunger. Within the casing 166 is a rod 170 having on its upper end a head 172 which bears downwardly against a spring 174, the latter being seated at its lower end against a bushing 176 which is threaded in the plunger 166. It will thus be seen that by downward movement of the rod 170 upper pulling movement is imparted yieldingly to the gripper.

Figure 3:
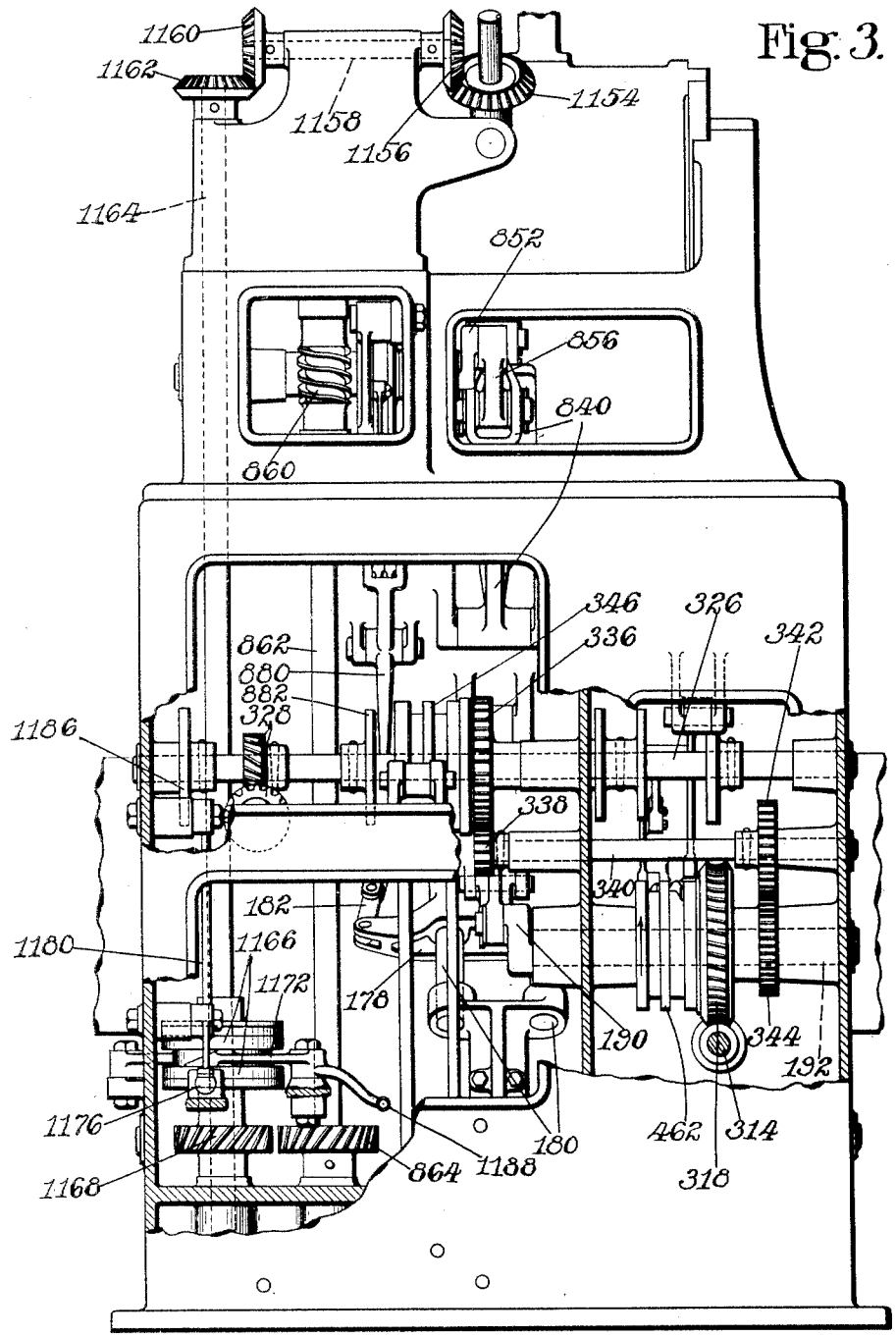
Fig. 3 is a rear elevation, with parts broken away.

For operating the rods 170 of the three toe grippers there is provided a cross head 178 which is slidingly mounted on a pair of fixed guiding rods 180 (Figs. 3 and 8), the cross head being connected by links 182 to the different rods 170. Operative movement is imparted to the cross head 178 by means of a forked lever 184 connected to the cross head by links 186. The lever 184 is connected by a link 188 to a crank 190 on a shaft 192 which is operated and controlled by means hereinafter described.

Reference has been made to the fact that each of the side grippers operating plungers 92 is connected at its upper end to the adjacent gripper casing 26. The connections between the plunger and the casing are not only for the purpose of assisting in imparting upper-pulling movement to the gripper in response to movement of the plunger, but also comprise means which is operative after the downward upper-pulling movement of the gripper to swing the latter inwardly and thus to draw the margin of the upper over the edge of the insole at the time when the side wiping and tacking mechanisms (hereinafter described) are moved inwardly toward the shoe. Each of the plungers 92 (Figs. 12 and 13) has at its upper end a lateral extension 194 provided with a flat upper face to serve as a seat for a holder 196, and the latter has integral therewith a hollow stud 198 mounted in a bearing in the extension 194 so that the holder may be swung about an axis parallel to the plunger 92. A nut 200 on the stud 198 retains the holder 196 on its seat while permitting it to be turned about the axis of the stud. Mounted in the holder 196 is a slide 202 connected by a ball joint to the upper end of the gripper casing 26. The slide 202 has threaded therein an overdraw rod 204 provided with a flange 206 engaged by a spring 208 which acts, when permitted, to impart to the gripper movement inwardly toward the shoe relatively to the casing 196. The rod 204 is slidably mounted in a bushing 210 which serves as a seat for the spring 208, and at its outer end this rod is connected to the upturned forked end of a rod 212 which is slidable in the casing 196 in parallel relation to the rod 204. Normally the upturned end of the rod 212 is engaged by a latch 214 on the casing 196, to hold the rod 204 retracted and thus to position the gripper in proper relation to the side of the last to receive the margin of the upper. At a predetermined time in the cycle of operations of the machine an upwardly extending arm 216 of the latch 214 is engaged by a lug 218 (Figs. 5 and 13) on the inwardly moving side wiping and tacking mechanism, to cause the latch to release the rod 204 and permit the spring 208 to force the gripper inwardly over the bottom of the shoe as far as permitted by the resistance of the tensioned upper, as illustrated in Fig. 13.

In order to return the rods 204 into position to be held by their latches 214, and thus to position the opposite side grippers at the proper distance apart to receive the upper when a shoe is presented to the machine, each of the holders 196 has mounted therein a pinion 220 in engagement with rack teeth on the rod 212, and also engaging this pinion is a rack bar 222 mounted in the hollow stud 198. The rack bar 222 is connected to a flexible steel strap 224 the lower end of which is connected to a fixed lug on the bracket 74. It will be understood that in the upper-pulling movement of the plunger 92 the strap 224 is rendered slack, so that it does not prevent the inward movement of the rod 204 when the latter is released by the latch 214. When the plunger 92 is moved upwardly in the return of the parts to starting position, the strap 224 exerts a pull on the rack bar 222 and thus causes the rod 204 to be retracted into position to be held by the latch 214.

It will be evident that the threaded connection between the slide 202 and the rod 204 permits the slide to be adjusted lengthwise by turning movement of the rod. For this purpose the rod 204 is provided at its outer end with a knurled head 226. Each of the side grippers may thus be readily adjusted laterally of the shoe independently of the others to position these grippers in proper relation to different styles and sizes of shoes.

By reference to Fig. 5 it will be evident that, of the three toe grippers, the two which operate on the upper at the corners of the toe are provided with mechanisms substantially identical with those above described as associated with the side grippers for connecting the corner toe grippers to the upper ends of their operating plungers 166 (see Fig. 8), for imparting to them overdrawing movement, and for adjusting them inwardly or outwardly for different styles and sizes of shoes. These mechanisms comprise holders 228, adjustable overdraw rods 230 connected to the grippers, and latches 232 for controlling the rods 230, substantially like the corresponding side gripper controlling parts shown in Figs. 12 and 13. The latches 232, however, are mounted on the sides of the holders 228 so that they may be conveniently operated by lugs 234 (Fig. 5) on the side wiping and tacking mechanisms at the same time that the corresponding latches 214 are operated. The corner toe grippers are thus released for inward overdrawing movement with the side grippers; and it will be understood that they are returned into position to be held by their latches 232 by rack and pinion mechanisms like those associated with the side grippers. Preferably the holders 228 will not be mounted for turning movement, as are the holders 196, but will be fast on the plungers 166. As shown in Fig. 8, the center toe gripper is connected to the upper end of its plunger 166 by mechanism different from that associated with the corner grippers, the gripper casing 132 being connected by a ball joint to a member 236 which is secured in a holder 238 on the plunger 166.

Figure 12:
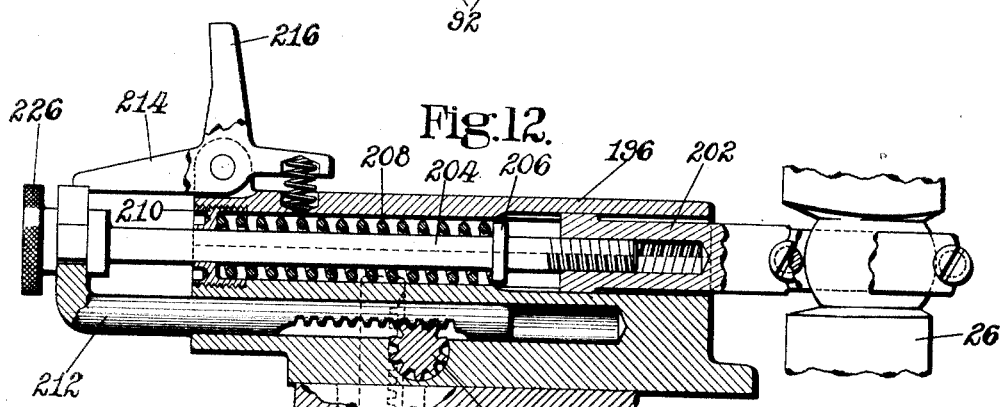
Fig. 12 shows in vertical section one of the several devices associated respectively with the different side grippers for effecting overdrawing movements of the grippers.
Figure 14:
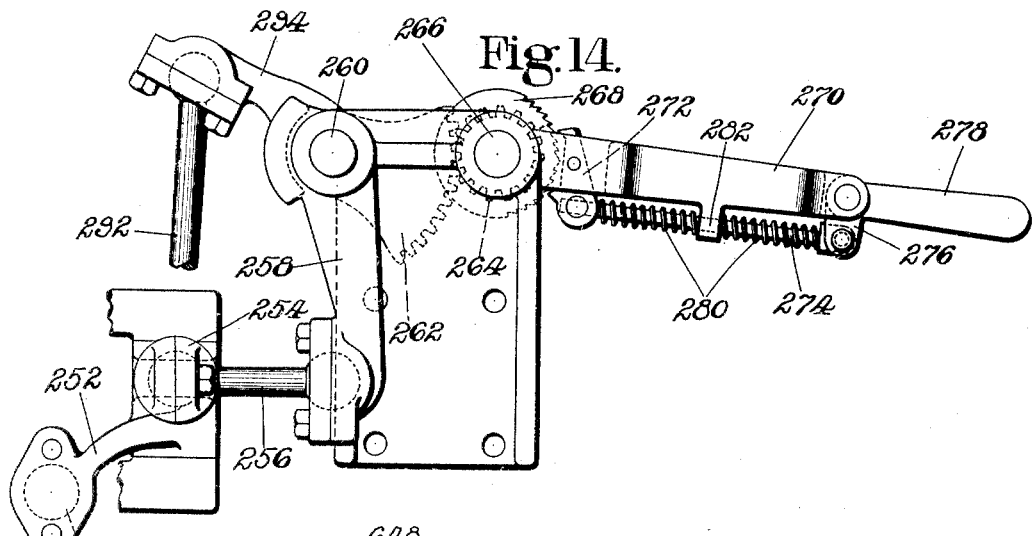
Fig. 14 shows in side elevation manual means for controlling the side grippers at one side of the machine.

After the upper has been pulled and while it is held under tension by the grippers the operator is enabled to straighten the tip, if necessary, by manipulation of the side grippers. For this purpose there is provided means whereby the pair of side grippers at each side of the shoe may be moved together, independently of the other pair, in either direction lengthwise of the shoe. Such movement is effected by swinging the holders 196 about the axes of their depending studs 198. The stud 198 of that holder 196 at each side which is farthest from the end of the toe has fast thereon a crank arm 242, while the stud of the holder in front thereof has fast thereon a bell-crank 244 (Figs. 5 and 12). Connecting the crank arm 242 to one arm of the bell-crank 244 is a link comprising two threaded members 246 connected by ball joints to the arm and the bell-crank and joined by a turnbuckle 248. The other arm of the bell-crank 244 is connected by a link 250 to an arm 252 (Fig. 14) of a bell-crank which is mounted on the frame, and the other arm 254 of this bell-crank is connected by a link 256 to a lever arm 258 which is fast on a rock shaft 260. Also fast on the shaft 260 is a gear sector 262 which is engaged by a pinion 264 on a shaft 266. Fast on the pinion 264 (Figs. 2 and 4) are a pair of ratchet wheels 268 the teeth of which face respectively in opposite directions. Mounted to turn about the shaft 266 is a hand lever 270 which carries a double-acting pawl 272 arranged to engage the teeth of either ratchet wheel selectively. The pawl is connected by a link 274 to an arm 276 formed on a handle 278 which is pivoted on the lever 270. A pair of springs 280 at opposite sides of a lug 282 on the lever 270 tend to hold the pawl 272 in a neutral position, out of engagement with both ratchet wheels, as will be evident from Fig. 14. When the operator moves the handle 278 in either direction, it first swings about its connection with the lever 270 until the pawl 272 is engaged with the appropriate ratchet wheel 268, and then the lever 270 acts through the ratchet wheel and the other connections described, to move the corresponding pair of side grippers lengthwise of the last in the direction determined by the direction of movement of the lever. In practice the operator will usually manipulate both the levers 270 simultaneously to move the opposite pairs of side grippers as required to position the tip line in proper relation to the last. When the handles 278 are released by the operator, the pawls 272 are automatically disconnected from their ratchet wheels. The levers 270 will engage their bearings with sufficient friction to cause them to remain in any position in which the operator may leave them, and if desired any suitable friction device may be used to supplement the friction of the bearings.

It will be evident that the connection between the crank arm 242 and the bell-crank 244, comprising the threaded members 246 and the turnbuckle 248, affords provisions for relative adjustment lengthwise of the last between the side gripper which engages the upper at the tip line and the gripper which operates farther rearwardly on the shoe. Either pair of side grippers may thus be relatively adjusted independently of the other pair, in accordance with different conditions encountered in operating on different styles and sizes of shoes and on right and left shoes.

The machine is further provided with means whereby the opposite side grippers, while holding the upper under tension, may be manipulated to increase or relax the tension at either or both of the opposite sides of the last or to adjust the upper laterally of the last. For this purpose the sleeve members 94 of each pair of side grippers, already referred to as connected to the plungers 92 and to the shafts 72 (Fig. 13), are connected by links 284 to an equalizing lever 286, and the latter midway between its ends is connected by a ball joint to a short rod 288 slidingly mounted in a lever 290 which is pivoted on the frame of the machine. The lever 290 is connected by a link 292 to a lever arm 294 (Figs. 2 and 14) mounted to rock about the shaft 260 and provided with a gear sector 296 in engagement with a pinion 298 loosely mounted on the shaft 266. Connected to the pinion 298 are a pair of ratchet wheels 300 having teeth that face in opposite directions respectively, and also mounted to turn about the shaft 266 is a hand lever 302 provided with a double-acting pawl 304 for selective engagement with the different ratchet whels. The pawl 304 is controlled by centralizing mechanism connected to a handle 306 pivoted on the lever 302, these parts being substantially identical with the corresponding parts of the tip-straightening mechanism shown in Fig. 14. When the pawl is in engagement with either of the ratchet wheels there is thus provided a positive connection between the hand lever 302 and the pair of side grippers for moving the latter in the line of the strain on the upper, either to increase or to relax the tension in accordance with which one of the ratchet wheels is thus engaged. In this operation the lever 286 acts substantially to equalize the forces applied to the two grippers. In practice, the operator will usually manipulate both the hand levers 302 simultaneously, and by relaxing the tension on one side and increasing that at the other side may adjust the upper as desired laterally of the last.

The means for operating the machine as a whole comprises a power shaft 308 (Fig. 1) which may be driven from any suitable source of power, for example from an electric motor 310. At right angles to the shaft 308 and connected thereto by worm gearing 312 is a driving shaft 314. The continuously operating shaft 314 has thereon a worm 316 which engages and drives a spiral gear 318 mounted to turn on the shaft 192 which carries the crank arm 190 for operating the toe grippers (Figs. 1 and 10). The shaft 314 is also provided with a worm 320 which drives a spiral gear 322 mounted to turn on the shaft 128 which carries the cam wheel 126 (Fig. 5) for operating the side grippers. By means of spiral gearing 324 (Figs. 1 and 4) the shaft 314 is further connected to drive continuously the shaft 90 on which are loosely mounted the cam wheels for closing and opening both the toe grippers and the side grippers.

For controlling or timing the operations of the various instrumentalities which act on the work, the machine is provided with a control cam shaft 326 (Figs. 1 and 10) connected by spiral gearing 328 to a transverse shaft 330 which by spiral gearing 332 (Fig. 1) is connected to operate a second control cam shaft 334 simultaneously with the shaft 326. The control cam shafts 326 and 334 are operated intermittently, under control of a main clutch and a treadle, as will be described. For operating the shaft 326 there is provided a gear wheel 336 which is loose on the shaft and is driven by a pinion 338 fast on a shaft 340, the latter having fast thereon a pinion 342 driven by a pinion 344 which is integral with and turned continuously by the spiral gear wheel 318. The gear wheel 336 is connected at times to the shaft 326 by a clutch 346 which is the main treadle-controlled clutch. This and other clutches hereinafter referred to may be wedge-controlled pin clutches the construction of which is not shown in detail since clutches of that type are well known.

To control the clutch 346 there are provided two pivotally mounted wedge members or arms 348 and 350 (Fig. 10) the active portions of which are spaced from each other about the axis of the clutch. The member 348 is for stopping the shaft 326 with the parts of the machine in starting position, and the member 350 for stopping the shaft at an intermediate point in the cycle after the upper has been pulled and while it is held under tension by the grippers. Both wedge members are controlled by a starting treadle 352 (Fig. 1) connected by an arm 354 and a link 356 to a rock shaft 358. Mounted on a yoke 359 fast on the rock shaft 358 are two pawls 360 and 362 (Fig. 39). The pawl 360 is arranged to enter a notch 364 formed in the hub portion of an arm 366 which is mounted to turn about the shaft 358 and is connected by a link 368 (Figs. 10 and 38) to the wedge member 348. Similarly the pawl 362 is arranged to enter a notch 370 formed in the hub portion of an arm 372 mounted to turn about the shaft 358 and connected by a link 374 to the wedge member 350. As shown in Fig. 39, initially the pawl 360 lies in the notch 364 of the arm 366, while the pawl 362 is at some distance from the notch 370. When, therefore, the treadle 352 is depressed, the wedge member 348 is immediately withdrawn from operative position and renders the clutch 346 effective to connect the gear wheel 336 to the shaft 326. It will be understood that the position of the wedge member 350 is not affected by movement of the treadle until after the pawl 362 has entered the notch 370; and the machine is further provided with means for preventing the treadle 352 from being moved, in the first instance, far enough to act on the wedge member 350. This means comprises a slidable bar 376 (Fig. 15) which is in position initially to act as a stop to limit movement of the treadle 352. As the result, therefore, of the first depression of the treadle the machine runs through a portion of its cycle and is then brought to a stop by the action of the wedge member 350.

When the treadle 352 has been depressed to the limit determined by the bar 376, another bar 378 is impelled by a spring 380 into position over the treadle to prevent the latter from returning to its initial position, it being understood that suitable springs (not shown) will be provided for returning the treadle and also for returning the wedge members 348 and 350. The bar 378 thus prevents the wedge member 348 from being returned into position to drag on the clutch if the operator releases the treadle in the first stage of the cycle, as well as to avoid unnecessary lost motion in the subsequent further depression of the treadle; while the bar 376 prevents the machine from being started again accidently until the operator is ready for the cycle of operations to be resumed. Withdrawal of the bar 376 to permit the second starting of the machine is effected by a manual operation more particularly hereinafter described. Further depression of the treadle then results in movement of the wedge member 350, in response to the action of the pawl 362 on the arm 372, to connect the operating gear wheel 336 again to the control shaft 326. Movement is at the same time imparted to the pawl 360, which is still in the notch 364, but early in this movement a tail 382 on the pawl is acted upon by a stationary pin 384 which serves to disconnect the pawl from the arm 366 and thus permit the wedge member 348 to be returned by its spring into position to bring the machine to a stop at the end of the complete cycle.

The side gripper closing and opening cam wheel 88 (Fig. 4) is operated by the continuously running shaft 90 through a clutch 386. For controlling this clutch there are provided two opposite wedge members 388 and 390 (Fig. 7). The member 388 is formed on an arm 392 pivoted at 394 on the frame of the machine, and the member 390 is formed on an arm 396 pivoted at 398. The two arms are connected together by a yoke 400, so that when either wedge member is in operative position the other is out of operative position. The wedge member 388 is for stopping the cam wheel 88 with the side grippers in open position, and the member 390 for stopping it with the grippers in closed position. The wedge members are controlled by a cam 402 on the control cam shaft 334, which acts on an arm 404 pivoted to swing about the same axis 398 as the arm 396. For a purpose hereinafter described the arm 404 is not rigidly connected to the arm 396, but acts on the latter through a spring plunger 406 which is mounted in the arm 404 and bears against a lug 408 on the arm 396, this lug being normally held by the spring plunger against a stop 410 on the arm 404. In the cam-effected movement of the arm 404 the plunger 406 is not intended to yield, and, therefore, the wedge member 388 is lifted to start the cam wheel 88 in operation, while the wedge member 390 is at the same time moved into a position to stop the cam wheel at the end of a half revolution thereof. This action occurs in the first stage of the cycle, to effect the closing of the side grippers in time relation to the means for operating them to pull the upper, and in the normal operation of the machine the cam 88 then remains at rest until after the machine has been started for the second time in response to depression of the starting treadle. In the second stage of the cycle the cam 402 arrives in position to cause reverse movement of the wedge members 388 and 390, whereupon the cam wheel 88 is started again and completes its revolution, thereby opening the grippers.

The toe gripper closing and opening cam wheel 164 (Fig. 4) is operated by the shaft 90 through a clutch 412 which is controlled by mechanism similar to that described for controlling the cam wheel 88. This mechanism is shown in detail in Figs. 8 and 9, and comprises two opposite wedge members 414 and 416. The wedge member 414 is formed on an arm 418 pivoted on the same axis 394 as the arm 392 previously described, and the wedge member 416 is formed on an arm 420 pivoted at 398, the two arms 418 and 420 being connected by a yoke 422. It will be understood that the wedge member 414 is for stopping the cam wheel 164 with the toe grippers in open position, and that the member 416 is for stopping it with the grippers in closed position. The two wedge members are controlled by a cam 424 (Fig. 9) on the control shaft 334, this cam being arranged to act on an arm 426 which is pivoted at 398 independently of the arm 420. The arm 426 is connected to the arm 420 by yieldable means comprising a spring plunger 428 mounted in the arm 426 and arranged to bear on a lug 430 which is fast on the arm 420, this lug being engaged by a stop 432 fast on the arm 426. The spring plunger 428, as in the above-described side gripper controlling mechanism, is not intended to yield in the normal operation, and consequently the arms 420 and 426 are moved as a unit to render the toe gripper closing and opening mechanism effective to close these grippers in the first stage of the cycle and to open them in second stage.

The shaft 128, which carries the cam wheel 126 for imparting downward pulling movement to the side grippers, is operated by the continuously running gear wheel 322 through a clutch 434 (Figs. 5 and 8). This clutch is controlled by three wedge members 436, 438 and 440, since the grippers are to receive first their upper-pulling movement, later a further movement in the same direction to carry them farther away from the shoe after they have released the upper, and finally a return movement to starting position. The wedge member 436 is for stopping the shaft 128 with the grippers in starting position, the member 438 for stopping it at the end of the upper-pulling movement, and the member 440 for stopping it with the grippers at the end of their further movement after releasing the upper. The wedge member 436 is formed on a pivoted arm 442 and is connected by a yoke member 444 to one arm of a bell crank 446 which is pivoted at 398 and carries a roll arranged to be engaged by a cam 448 on the control shaft 334. The wedge member 438 is formed on one arm of a bell crank 450, the other arm of which is provided with a roll arranged to be engaged by a cam 452 on the shaft 334. The wedge member 440 is formed on a pivoted arm 454 which is connected by a link 456 to a lever 458 pivoted at 398 and provided with a roll arranged to be engaged by a cam 460 on the shaft 334. It will be understood that the wedge member 436 is operated in the first stage of the cycle, in time relation to the closing of the grippers, to cause them to pull the upper, and that the wedge members 438 and 440 are operated at different respective times in the second stage of the cycle to cause the grippers first to withdraw farther from the shoe after releasing the upper and later to return to starting position. The wedge members 438 and 440 are moved toward operative position by suitable springs which are omitted from the drawings in order to avoid confusion. It will be understood that normally all three wedge members are in operative position, so that each is ready to stop the movement of the shaft 128 when the co-operating element of the clutch 434 arrives in position to be engaged thereby, and that as each wedge member is withdrawn in turn, the shaft 128 is rotated only until the clutch element arrives in position to be engaged by the next succeeding wedge member.

The shaft 192 which carries the crank arm 190 for imparting upper-pulling movement to the toe grippers is operated by the continuously running gear wheel 318 through a clutch 462 (Fig. 10), and this clutch is controlled by cams on the control shaft 326. Similarly to the means above described for controlling the side gripper operating clutch, the clutch 462 is controlled by three wedge members 464, 466 and 468 which are spaced about the axis of the clutch and are arranged respectively to stop the shaft 192 with the toe grippers in starting position, at the end of their upper-pulling movement, and at the end of further movement whereby they are withdrawn from the shoe after releasing the upper. The wedge member 464 is formed on one arm of a bell crank 470 and is connected by a link 472 to a pivoted arm 474 provided with a roll engaged by a cam 476 on the shaft 326. The wedge member 466 is formed on a pivoted arm 478 and is connected by a link 480 to one arm of a bell crank 482 the other arm of which is provided with a roll engaged by a cam 484 on the shaft 326. The wedge member 468 is connected by a link 486 to a pivoted arm 488 provided with a roll engaged by a cam 490 on the shaft 326. The different wedge members are controlled by suitable springs which are omitted from the drawings to avoid confusion. It will be understood that the wedge member 464 is operated in the first stage of the cycle to cause the toe grippers to pull the upper, and that the wedge members 466 and 468 are operated at different respective times in the second stage of the cycle to cause the toe grippers first to withdraw farther from the shoe after releasing the upper and later to return to starting position.

After the machine has come to a stop at the end of the first stage of the cycle, with the upper pulled and held under tension by the different grippers, it may be that because of improper gripping and pulling of the upper by one or more of the grippers it is necessary or advisable to release the upper from all of the grippers and begin the pulling operation over again. The machine is provided with conveniently operable means whereby, under such conditions, the toe and side grippers may be made to release the upper and to return to starting position independently of the operation of other parts of the machine. This is accomplished by manual control of the different clutches through which closing and pulling movements are imparted to the grippers in the manner described. When the operator observes that conditions require that the upper be released and pulled again, it is first necessary that the grippers be made to open and release the upper. It will be understood that at the end of the first stage of the cycle the clutches 386 and 412 (Figs. 7 and 8), for closing the side and toe grippers respectively, have made a half revolution from starting position and are under control of the respective wedge members 390 and 416. In order to cause the grippers to open and to maintain them in open condition to receive the upper a second time, it is necessary to withdraw the wedge members 390 and 416 from operative position and simultaneously to bring the wedge members 388 and 414 into operative position. This is effected by moving the arms 396 and 420 relatively to the cam-controlled arms 404 and 426, against the resistance of the spring plungers 406 and 428. Mounted in fixed relation to the wedge-carrying arm 396 is an arm 492 (Fig. 7) connected by a link 494 to a bell crank 496 which is connected in turn by a link 498 to an arm 500 (Fig. 9) fast on a rock shaft 502. Mounted in fixed relation to the wedge-carrying arm 420 (Fig. 9) is an arm 504 connected by a link 506 to a bell-crank 508 (Fig. 8) which is connected by a link 510 to an arm 512 on the rock shaft 502. This rock shaft is provided between its ends with a hand lever 514 which is within convenient reach of the operator as he stands in front of the machine. It will be evident that by depressing the hand lever 514 the clutches 386 and 412 are actuated to effect the opening of the grippers, and that the grippers will then be maintained in open condition, just as at the beginning of the cycle of the machine, as long as the hand lever 514 is held depressed. Any suitable retaining mechanism (not shown) may be provided, if desired, for preventing return upward movement of the hand lever until such movement is required.

After the toe and side grippers have been made to open and release the upper in the manner above described, the mechanisms for operating the grippers to pull the upper are made to complete their cycle independently and thus to return the grippers to starting position. It will be recalled that the pulling movement of the side grippers is effected through a clutch 434 (Fig. 8) and the pulling movement of the toe grippers through a clutch 462 (Fig. 10). At the end of the first stage of the cycle the clutch 434 is under control of the wedge member 438 and the clutch 462 is under control of the wedge member 466. It is necessary, therefore, to withdraw these two wedge members from operative position, and in order that the grippers shall be returned to starting position it is necessary also to withdraw the wedge members 440 and 468 which would normally act to stop the grippers after further movement thereof away from the shoe prior to their return to starting position. The withdrawal of these several wedge members is effected by the operation of a single push button 516 (Fig. 8). This push button is connected by a link 518 to one arm of a rotatable spider 520 which is provided with an arm 522 for engaging a lug 524 on one arm of the bell crank 450 which carries the wedge member 438. The spider 520 is also connected by a link 526 to a bell-crank 528 one arm of which is arranged to engage a lug 530 on the arm 454 which carries the wedge member 440. It will thus be seen that both the wedge members 438 and 440 will be withdrawn from operative position, against the resistance of their controlling springs (not shown), in response to depression of the push button.

The spider 520 is also connected by a link 532 (Figs. 8 and 10) to an arm 534 which is fast on a rock shaft 536 on which the wedge member 468 is mounted, and the hub of the arm 534 is so connected to the wedge member, by suitable interengaging portions of said hub and member (not shown in detail), that the latter is withdrawn from operative position by movement of the arm in one direction, while the wedge member is permitted to move relatively to the arm when it is operated by its cam 490. Fast on the rock shaft 536 is also an arm 538 connected by a link 540 to an arm 542 which is mounted on a shaft 544 on which the wedge-carrying arm 478 is mounted. Between the arm 542 and the arm 478 there is also a suitable one-way connection, not shown in detail, so that the wedge member 466 is withdrawn from operative position simultaneously with the member 468 by the action of the manually operated means described, while the arm 478 is permitted to move relatively to the arm 542 in response to the action of its cam 484. It will thus be seen that the wedge members 466 and 468 for controlling the toe gripper operating means are withdrawn from operative position simultaneously with the corresponding wedge members for controlling the side gripper operating means. The push button 516 will be held depressed until the clutch elements controlled by the wedge members have passed beyond the wedge members 440 and 468, so that the different grippers will be returned to the starting positions determined by the wedge members 436 and 464 which are at that time in operative position ready to act on the clutch elements.

After the toe and side grippers have thus been returned to starting position, the operator arranges the margin of the upper materials again within the open gripper jaws, and thereafter releases the hand lever 514 to permit the spring plungers 406 and 428 to act respectively on the wedge-carrying arms 396 and 420 and thus restore the mechanism which controls the gripper closing clutches to the condition in which it normally is at the end of the first stage of the cycle. In response to this movement of the clutch-controlling mechanisms the respective clutches are actuated to cause the toe and side grippers again to grip the upper.

To cause the grippers again to pull the upper, it is necessary to withdraw manually from operative position the wedge members 436 and 464 and thus to render the clutches 434 and 462 effective to bring the grippers again to the position in which they normally are at the end of the first stage of the cycle. For this purpose there is provided a second push button 546 (Fig. 4) which is arranged to be depressed against the resistance of a spring 548. This push button is connected by links 550 (Fig. 8) to an arm 552 which is connected to the wedge-carrying arm 442, so that when the push button is depressed the wedge member 436 is lifted, there being a lost-motion connection between the links 550 and the arm 552 so that the push button is not affected by the normal operation of the arm 442. The push button 546 is also connected by a link 554 (Figs. 8 and 10), through a lost-motion connection, to the bell crank 470 which operates the wedge member 464. This wedge member is therefore lifted simultaneously with the member 436, so that both the toe gripper operating means and the side gripper operating means are rendered operative in response to the movement of the push button to impart upper pulling movements to the toe and side grippers.

For supporting the shoe against pressure on its bottom face in the overlaying and fastening operations performed in the second stage of the cycle, there is provided a shoe rest or holder 556 (Figs. 1 and 9) arranged to engage the shoe on the top of the forepart. The holder 556 is carried by an arm 558 and is provided with a stem 560 extending through the arm and having a nut 562 thereon for securing the holder in proper angular relation to the arm. The arm 558 is fast on a rod 564 mounted for lengthwise movement and for turning movement in bearings on the frame of the machine. Mounted to swing with the arm 558 is another arm 566 (Fig. 2) provided with a handle 568 whereby the operator is enabled conveniently to swing the shoe holder from idle position at the right of the shoe to a position over the top of the forepart of the shoe. Fast on the rod 564 is an arm 570 (Fig. 9) which, for a purpose hereinafter described, is connected by means of a link 572 and universal joints to an arm 574 which is fast on a rock shaft 576. Mounted on a portion of the frame of the machine at opposite sides of the arm 570 are pins 578 which limit movements of this arm in opposite directions and thus determine the proper idle position of the shoe holder and also the proper position of the holder when over the shoe. A spring 580 connected to the arm 574 is arranged to maintain the shoe holder normally in idle position at the right of the shoe, as illustrated in Fig. 2, and it is against the resistance of this spring that the operator swings the holder into the position over the shoe determined by one of the pins 578.

Movement is imparted to the rod 564 to carry the holder 556 into engagement with the shoe by means of a crank arm 582 (Figs. 2 and 5) fast on a shaft 584. A connecting rod 586 connects the crank arm 582 to a rod 588 (Fig. 9) at the knee joint of an inverted toggle comprising a pair of inner toggle links 590 and a pair of outer toggle links 592. The toggle links 592 are mounted at their upper ends on stationary bearings 594 and 596 (Fig. 5), and the links 590 are connected at their upper ends to a sleeve member 598 which is slidable on the rod 564. Between the member 598 and a collar 600 which is fast on the rod 564 is a spring 602. It will thus be seen that when the crank arm 582 is operated, downward movement is imparted by the toggle to the sleeve member 598 which acts through the spring 602 to move the rod 564 downwardly and apply the holder 556 to the shoe under spring pressure. The operative movement of the crank arm 582, as hereinafter explained, is effected by a half revolution of the shaft 584, and by this movement the toggle links 590 and 592 are carried into positions in which they are substantially parallel to one another, so that the sleeve member 598 is virtually locked against reverse movement in response to the action of the spring 602.

Figure 9:
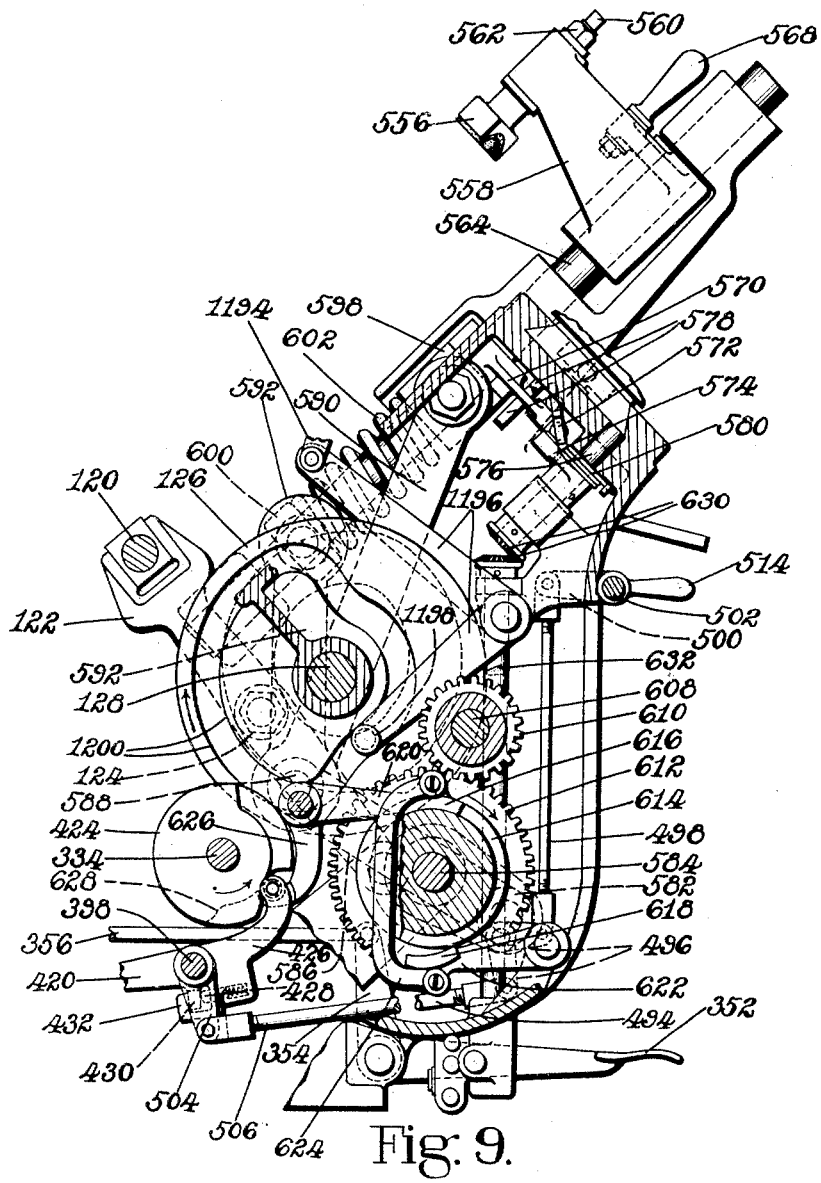
Fig. 9 is a section on the line 9—9 of Figs. 2 and 6.

For operating the shaft 584 there is provided a gear wheel 604 (Figs. 1 and 2) which is mounted to turn about the shaft 128 with the continuously running gear wheel 322 by a connection (not shown) with the hub of the latter, and the gear wheel 604 engages and drives a pinion 606 fast on a shaft 608. Also fast on the shaft 608 is a pinion 610 which drives a gear wheel 612 mounted to turn about the shaft 584. For connecting the gear wheel 612 to the shaft 584 there is provided a clutch 614. This clutch is controlled by a pair of wedge members 616 and 618 (Fig. 9) formed respectively on pivotally mounted arms 620 and 622 which are connected together by a yoke member 624. The arm 620 is connected to an arm 626 provided with a roll arranged to be engaged by a cam 628 on the control cam shaft 334. During the first stage of the cycle the wedge members are positioned as shown in Fig. 9, the shoe holder 556 remaining in its idle position. At the beginning of the second stage of the cycle the cam 628 acts to start the movement of the shaft 584, bringing the wedge member 618 into position to stop the shaft at the end of a half revolution. Near the end of the cycle the cam 628 causes the wedge members to resume their initial positions, so that the shaft 584 is again started in operation to withdraw the shoe holder from the shoe and is stopped with the holder in its idle position.

Figure 15:
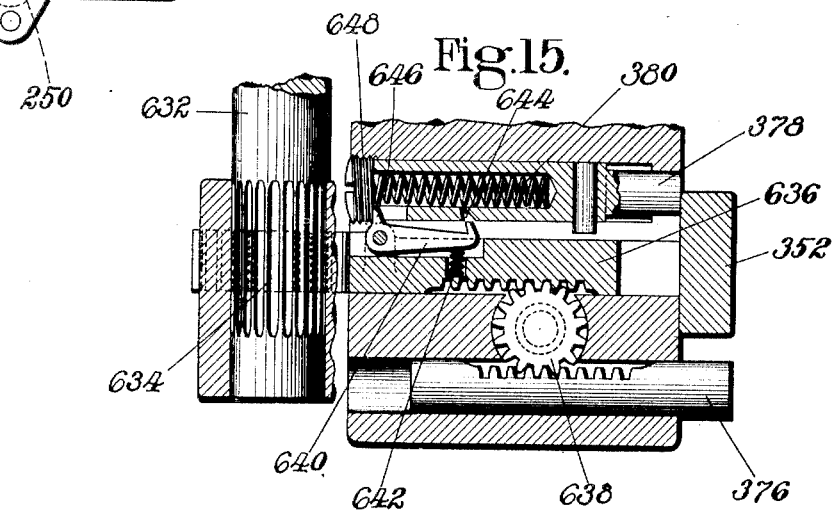
Fig. 15 is a vertical section through the starting treadle and controlling mechanism associated therewith.

Reference has already been made to the fact that movement of the starting treadle 352 in the first instance is limited by a bar 376 (Fig. 15), and that after the treadle has been moved to the limit thus determined, another bar 378 is moved by a spring 380 into position to prevent the treadle from returning to its starting position. For withdrawing the bar 376 from under the treadle, to permit the machine to be started a second time, there are provided connections operated by the manual movement of the shoe holder 556 into position over the shoe. These connections include the arm 570, the link 572, the arm 574 and the shaft 576 previously referred to, the shaft 576 being connected by bevel gearing 630 to a shaft 632 provided at its lower end with gear teeth 634 (Fig. 15) for engagement with rack teeth formed on a slide 636, this slide having rack teeth engaging a pinion 638 which engages rack teeth formed on the bar 376. It will be understood that when the shoe holder 556 is swung from its idle position into position over the shoe, the slide 636 is moved toward the right (Fig. 15) and the bar 376 is thus moved in the opposite direction from beneath the treadle. In order also to withdraw the bar 378 from over the treadle, the slide 636 carries a pawl 640 controlled by a spring 642 and arranged to enter a notch 644 formed in the bar 378. When the parts are positioned as shown in Fig. 15, the pawl 640 is held out of the notch 644 by reason of the engagement of a lug 646 on the pawl with a screw 648 which serves as an abutment for the spring 380, so that the bar 378 is free to be moved outwardly over the treadle when the treadle is depressed. When the slide 636 is thereafter moved to the right, the pawl 640 enters the notch 644, and when the shoe holder 556 is finally swung back to its idle position the bar 378 is withdrawn from over the treadle by the action of the slide 636 at the same time that the bar 376 is returned to its limiting position.

It will be understood that the bar 376, controlled as above described insures that the machine will not be accidentally started to initiate the second stage of the cycle until the operator has performed whatever operations are necessary or desirable prior to the overlaying and fastening of the upper materials, including such manipulation of the clutch-controlling mechanisms as to open and return the grippers and cause them to pull the upper again when conditions render this action desirable.

After the upper has been properly pulled by the grippers, the next operation, at the beginning of the second stage of the cycle of the machine, is to lay the margin of the upper at the sides of the forepart, at the rear of the toe end, inwardly over the insole and to fasten it to the insole. For this purpose the machine is provided at each side with overlaying and fastening mechanism comprising a group of wiper and tacker units which, in the construction shown, are so formed and arranged as to wipe the upper inwardly on a substantially continuous line from a point at or near the tip seam substantially to the ball-line of the shoe and have means for driving six tacks to hold the upper. These mechanisms accordingly perform the lasting of the shoe at the sides of the forepart, between the portion subsequently lasted by the toe-lasting means and the ball-line of the shoe, so that the shoe when it leaves the machine is completely lasted substantially as far rearwardly as the ball-line. The side overlaying and fastening mechanisms, which by reason of their function may also be termed slide-lasting mechanisms, are substantially identical in construction at the opposite sides of the machine, except for such changes as are necessitated by their different locations in the machine, and a description of one will accordingly suffice for both.

By reference to Figs. 1, 2 and 23, it will be seen that there is mounted on the frame of the machine at each side, a housing 650 upon the upper end of which is secured another housing 652. In the lower end of the housing 652 there are provided slideways for flanges 654 formed on a carrier 656 which is thus slidingly movable laterally of the shoe toward and from the side of the forepart. Supported in the carrier 656 are six wiper and tacker units including slides 658 arranged side by side between the opposite side portions of the carrier and resting upon a ledge 660 (Fig. 22) which extends across from one side of the carrier to the other. Mounted in a substantially cylindrical bearing 662 in each of the slides 658 is a wiper and tacker holder 664 which is thus movable with the slide 658 laterally of the shoe and may also swing relatively to the slide in directions heightwise of the shoe. Secured on the holder 664 is a wiper plate 666 the front end of which is curved to guide it inwardly over the edge of the shoe bottom and is also slotted to permit the driving of the tack and to permit the wiper to be retracted from the shoe after the tack has been partially driven; and secured on the wiper plate is an abutment 668 for engaging the side of the shoe to limit the movement of the wiper over the shoe and to determine the position of the tack, this abutment being adjustable by means of a slot-and-screw connection 670 for varying the distance of the tack from the edge of the shoe bottom. Upward swinging movement of the holder 664 is limited by engagement with a shoulder 672 on the slide 658, and the holder is normally held at the limit of its upward swinging movement by means of a bell crank 674 and a spring 676. The bell crank 674 is pivotally mounted on a downwardly extending projection of the holder 664 and is provided with a roll 678 arranged to run on a ledge 680 formed as a part of the carrier 656. The spring 676 encircles a rod 682 which is connected at one end to the bell crank 674 and extends at its opposite end through a projection 684 extending downwardly from the ledge 660 of the carrier 656. The projection 684 serves as an abutment for the spring 676, so that the spring acts on the bell crank 674 to force the wiper and tacker holder 664 upwardly while permitting it to be swung downwardly by the resistance of the shoe materials as the wiper is moved inwardly over the shoe bottom.

Each of the slides 658, together with its wiper and tacker holder 664, is so mounted as to be yieldingly movable laterally of the shoe independently of the other slides, so that each wiper and tacker unit may adjust itself independently to the contour of the side of the shoe. To this end, there is associated with each of the slides 658 a spring 686 one end of which is arranged to abut against a member 688 secured on the top of the carrier 656, and the other end against an upstanding projection of the slide 658. The spring 686 is held in position by means of a rod 690 the purpose of which is hereinafter further explained. It will thus be seen that the spring 686 tends to force the slide 658 toward the left (Fig. 22) and is yieldable in response to continued movement of the carrier 656 in that direction when movement of the wiper and tacker unit is stopped by engagement of the abutment 668 with the shoe. For limiting movement of the slide 658 under the action of the spring 686 when the parts are in retracted position, there is mounted in the member 688 a rod 692 which may be turned by engaging a squared portion on its right-hand end and is provided at its left-hand end with a lug 694 for locking engagement with the upstanding projection of the slide 658 against which the spring 686 acts. If it is desired to remove the wiper and tacker unit from the carrier 656, the lug 694 may be turned into position to release the slide 658.

For moving the carrier 656 toward and from the shoe there is provided a lever 696 fulcrumed at its lower end (Fig. 23) on a rod 698 and connected at its upper end to the carrier by links 700. The lever 696 is oscillated by a crank pin 702 which is carried by a shaft 704 and has thereon a block 706 slidably mounted in a guideway formed in the lever. The shaft 704 is connected by spiral gearing 708 to one end of a shaft 710 (Fig. 1) the other end of which is connected by spiral gearing 712 to a shaft 714 which extends across the machine from side to side. It will be understood that by different trains of gearing such as described the shaft 714 is connected at its opposite ends to the respective levers 696 at the opposite sides of the machine. For imparting operative movement to the shaft 714 at the required time in the cycle there is provided a clutch 716 (Fig. 5) to connect the shaft to a continuously running worm wheel 718 which is driven by a worm 720 mounted on the driving shaft 314 previously mentioned. The clutch 716 is controlled by a wedge member 722 which comprises one arm of a bell crank lever of which the other arm 724 is connected by a link 726 to the upper end of a lever 728. The lever 728 is fulcrumed at its lower end on the frame of the machine and carries between its ends a roll 730 arranged to be engaged by a cam 732 mounted on the control cam shaft 334. It will be understood that when the clutch 716 is actuated, shaft 714 makes one complete revolution and then comes to a stop, thereby moving the carriers 656 of the side wiping and tacking mechanisms toward the shoe and thereafter withdrawing them again to their idle positions. By reason of the character of the connections between the shaft 704 and the levers 696, and the yieldable mounting of the different wiper and tacker units on the carrier 656, the different units remain in operative position long enough for the tacks to be driven in the manner hereinafter explained.

Each of the wiper and tacker units has mounted on its holder 664, in addition to the wiper plate 666 hereinbefore described, tacking mechanism comprising a pair of tack-guiding fingers 734, a tack holder 736 and a tack driver 738. The fingers 734 are pivotally mounted on a pin 740 so as to swing apart to permit the passage of the tack, and are normally held together by means of any suitable spring (not shown). The tack holder 736 is provided with a driver passage into which the tack is delivered from above by means hereinafter described, and has a spring-controlled pin 742 which is normally projected into the driver passage to support the tack and is yieldably pushed aside by the upward movement of the driver. The driver 738 is carried by a slide 744 which is mounted in guideways in the holder 664 and provided with rack teeth engaged by teeth formed on one arm of an operating bell crank 746 pivoted on the holder 664. The bell crank 746 is provided with another series of teeth engaging teeth formed on an operating slide 748 which is movable in the holder 664 and is operated by a spring 750. At one end the slide 748 is provided with a projection 752 which extends through the curved bearing portion of the holder 664 and has therein a notch 754 to receive a spring-controlled pawl 756 on the slide 658. It will be understood that when the pawl 756 is in the notch 754 the slide 748 is held in a position in which the driver 738 is retracted below the tack holder 736.

To cause the driving of the tacks the several pawls 756 of each group of wiper and tacker units are withdrawn substantially simultaneously from the notches 754 of the respective tacker slide projections 752, thereby releasing the slides 748 to the action of their springs 750. For this purpose there is mounted beneath the tail of each pawl, in the corresponding slide 658, a pin 758 which is vertically movable within limits determined by a stop screw 760 projecting into a slot in the pin, and under the pin 758 is an operating member 762 having thereon upwardly extending projections 764 for engaging the lower ends of the respective pins. The member 762 is pivotally supported upon the upper end of a forked arm 766, and is further guided in its upward and downward movements by arms 768 which are pivotally connected to the carrier 656. The arm 766 at its lower end is connected to an arm 770 of a bell-crank lever mounted on the lever 696, the other arm 772 of the bell-crank being provided with a roll 774 which at the proper time in the cycle is engaged by a pin 776 carried by an arm which is fast on the crank pin 702. By its engagement with the roll 774 the pin 776 thus operates the bell crank 770, 772 to elevate the member 762 and thereby to withdraw the pawls 756 from engagement with the members 752, thus causing the driving of the tacks. The return of the tack-driving mechanism of each unit to its idle position, in which it is held by the pawl 756, is effected in response to engagement of the ends of the tacker slide projections 752 with a fixed abutment 778 when the overwiping and tacking mechanism is withdrawn from the shoe by the action of the lever 696. The abutment 778 is shown fragmentarily in Fig. 22, and it will be understood that it may be secured in any suitable manner to the side of the frame of the machine.

The tack holder 736 of each wiper and tacker unit comprises a slide mounted for movement in substantially horizontal directions on the holder 664 and normally held by means of a spring 780 in position for its tack-receiving opening to align with the driver, as illustrated in Fig. 22. For receiving the tacks the several tack holders of each group of units are projected to the left relatively to the holders 664 against the resistance of the springs 780 at the time when the wiper and tacker mechanism as a whole is in its retracted position away from the shoe, as illustrated in Fig. 22a. To accomplish this result the tack holder slide has an upstanding projection 782 arranged to be engaged by one end of the rod 690 previously mentioned, the other end of this rod being arranged to engage a fixed abutment 784 near the end of the retractive movement of the carrier 656. It will be understood that the rod 690 is freely slidable in bearings in the slide 658 and the member 688, and that upon its engagement with the abutment 784 it acts as a stop to prevent further retractive movement of the tack holder while the retractive movement of other parts of the wiper and tacker unit continues. The abutment 784, like the abutment 778, may be mounted in any suitable manner on the machine.

For delivering tacks to each group of tack holders when the latter are in their idle positions there is mounted for vertical movement on the inner side of the corresponding housing 652 a slide 786 (Figs. 2 and 23) having a substantially horizontal upper end portion connected to a group of flexible and extensible tack-delivering tubes 788. The lower end portion of the slide 786 is arranged on an incline corresponding to the inclination of the group of wiper and tacker units necessitated by the inclination of the shoe in the machine. The lower end portion of the slide is formed with a plurality of tack delivery openings 790 arranged to align with the tack-receiving openings in the tack holders 736 when the slide 786 is in its lowered position, these openings being connected by curved tubes 792 with passages formed in the upper end of the slide in alignment with the flexible tubes 788. The slide 786 is connected through a vertical slot in the housing 652 with a slide 794 inside of the housing (Fig. 5), and the slide 794 is connected to one end of a lever 796 which is fast on a rock shaft 798. The rock shaft 798 in the construction shown in conveniently operated by movement toward the toe end of the shoe of toe-lasting mechanism hereinafter fully described, this mechanism carrying at each side thereof a member 800 provided with a cam slot in which is mounted a roll 802 carried by an arm fast on a rock shaft 804 (Fig. 23) on the housing 652, this rock shaft being connected by gearing 806 to the shaft 798. It will be understood that normally the slide 786 is elevated to permit movement of the overlaying and fastening mechanism toward and from the shoe, and that after this mechanism has been withdrawn to idle position, in the subsequent operation of the toe-lasting mechanism the slide is lowered by the action of the cam member 800 on the roll 802 to bring the delivery openings 790 close to the tack holders. After the tacks have been delivered to the tack holders, the slide 786 is elevated in response to the retractive movement of the toe-lasting mechanism near the end of the cycle of the machine. The tacks are thus delivered to the tack holders near the end of one cycle of the machine for use in operating upon a shoe in the next cycle of the machine.

For supplying tacks to the flexible tubes 788 the machine herein shown is provided at each side with a rotatable tack hopper 808 and a separator 810 of well-known construction such as shown and described in some of its details in U. S. Letters Patent No. 1,002,422, granted on September 5, 1911 upon an application of R. F. McFeely, the oscillatory movements of the tack hopper and the resulting operative movements of the separator mechanism being effected by a yieldingly operated rack bar such as shown in another McFeely Patent No. 1,107,337, granted on August 18, 1914. A portion of the rack bar for operating one of the tack hoppers is shown at 812 in Fig. 5, its operative movements being conveniently effected by the same lever 796 that operates the slide 786, there being a rod and spring connection 814 between the lever and the rack bar for operating the latter yieldingly in the same manner as disclosed in the last-mentioned McFeely patent.

The tacks are, of course, delivered from the separator 810 point downward, and since they are to be driven upwardly into the shoe, the machine is provided with means for inverting them before they are delivered to the tubes 788. By reference to Fig. 23a it will be seen that there is mounted in a cylindrical bearing below the separator an oscillatory tack inverter 816 provided with a plurality of tack-receiving openings arranged to align with openings communicating with the separator in one position of the inverter and with openings leading to the flexible tubes 788 when the inverter has been turned slightly less than 180° from its tack-receiving position. In this manner the tacks are inverted and then dropped head downward into the flexible tubes. For turning the inverter 816 there is provided a lever 818 having on one end gear teeth connected to a series of teeth at one end of the inverter, and at its opposite end connected by a link 820 to an arm 822 on the rock shaft 798 (Fig. 2). It will thus be seen that when the shaft 798 is turned to lower the slide 786 into position to deliver tacks to the tack holders 736, the tack inverter 816 is turned into position to deliver tacks previously fed thereto when the slide 786 has arrived substantially at the end of its downward movement, the inverted tacks thus being delivered to the tack holders.

For lasting the toe of the shoe the machine is provided with lasting mechanism mounted on a support 824 which is movable lengthwise of the shoe in guideways 826 (Fig. 5) formed on the frame of the machine. Mounted in upstanding arms 828 (Figs. 25 and 31) on the support 824 is a cross-rod 830 upon which is fulcrumed a wiper head 832 having mounted therein wipers 834 (Figs. 31 and 33) for clamping the upper about the end and sides of the toe and for wiping it heightwise of the toe. Also fulcrumed upon the rod 830 for swinging movement relatively to the wiper head 832 is a wiper support 836 (Fig. 33) which carries wipers 838 (Fig. 32) for wiping the margin of the upper inwardly over the insole, and also carries mechanism hereinafter described for applying a binder about the toe. As more fully hereinafter described, swinging movement of the wiper head 832 about the axis of the rod 830 is effected to cause the wipers 834 to wipe the upper heightwise of the toe, while swinging movements of the wiper support 836 relatively to the head 832 are effected for the purpose of positioning the wipers 838 relatively to the plane of the shoe bottom before they begin the overwiping operation and also for applying pressure to the overwiped upper in a direction perpendicular to the plane of the insole.

The first operation of the toe-lasting mechanism, while the upper about the toe is held by the toe grippers, comprises a forward movement of the support 824 to carry the upwiping wipers 834 into engagement with the shoe at the end of the toe. This movement is effected by a lever 840 (Fig. 25) which is fulcrumed at 842 on the frame of the machine and is connected by a link 844 to a shouldered rod 846 slidably mounted in a bearing member 848 fast on the lower face of the support 824. The rod 846 acts through a spring 850 to impart the forward movement to the support, the spring being arranged to yield in response to movement of the rod relatively to the support after the wipers have engaged the upper at the end of the toe. The lengthwise position of each shoe in the machine, as hereinbefore stated, is determined by engagement of the toe end face of the last with the middle or front toe gripper, so that the toe end faces of different lasts always occupy the same position. The arrangement is preferably such that, if there were no upper materials upon the last, the wipers 834 would meet the end face of the last without yield of the spring 850, so that in operating upon a shoe the relative movement between the rod 846 and the support 824 after the wipers have engaged the end face of the upper corresponds to the thickness of the upper materials and will vary as the thickness of such materials varies in different shoes. This arrangement is utilized in a manner hereinafter explained to effect an initial setting of the wipers relatively to the plane of the shoe bottom in accordance with the thickness of the upper materials.

Movement of the lever 840 to advance and retract the support 824 is effected by a crank arm 852 (Figs. 3 and 25) which is mounted on a shaft 854 and is connected with the lever by a link 856. The crank arm 852 is operated through a pin clutch of which one element is connected to the crank arm and the other element to a spiral gear wheel 858 driven by a worm 860 on a vertical shaft 862. The shaft 862 is provided at its lower end (Figs. 3 and 10) with a spiral gear 864 driven by a similar gear 866 on a shaft 868 which by means of spiral gearing 870 (Fig. 1) is driven continuously from the power shaft 314. For controlling the clutch on the shaft 854 there are provided two wedge arms 872 and 874 having clutch-controlling wedges arranged in diametrically opposite relation, these arms being connected respectively by links 876 and 878 to a common center on one arm of a bell-crank lever 880, the other arm of which is provided with a roll engaged by a cam 882 on the control cam shaft 326 hereinbefore described. Normally the parts are positioned as shown in Fig. 25 with the clutch controlled by the wedge arm 872. At the proper point in the cycle for the wipers to be advanced to the end of the toe, the cam 882 permits the wedge arm 872 to be lifted and the arm 874 simultaneously to be swung into operative position by the action of a spring 884 connected to the lever 880, whereupon the clutch is rendered effective to swing the crank arm 852 to a diametrically opposite position and to stop it in that position. After the toe-lasting operation has been completed, in the manner hereinafter described, the cam 882 acts at the proper time in the cycle to bring the wedge arms 872 and 874 again to the positions in which they are shown in Fig. 25, thus causing the crank arm 852 to be swung through the remainder of its cycle and thereby withdrawing the toe-lasting mechanism from the shoe.

In time relation to their above-described advancing movement the upwiping wipers 834 receive swinging movements to close them about the toe. These wipers comprise a pair of plates on the front edges of which, in the construction shown, is a continuous facing or pad 886 of material, such as rubber or leather, for engaging the upper with suitable friction without injuring it, and the plates are mounted in grooves formed in wiper holders 888, as illustrated in Figs. 29 and 33. The wiper holders 888 are provided with dove-tailed projections 890 which are guided in grooves formed in the top plate of the wiper head 832, so that the holders with their wipers are movable about an axis located substantially centrally of the end of the toe. The wipers 834 are locked in position on the wiper holders by mechanism of the same general character as disclosed in United States Letters Patent No. 1,436,194, granted upon my application on November 21, 1922, comprising pins 892 which project through holes in the wiper holders into holes in the wipers, the heads of these pins being held and guided in an arc-shaped guideway formed in a member 894 which is retractible within an opening formed in the top plate of the wiper head to withdraw the pins from the wipers and thus to permit different wipers to be mounted on the wiper holders. The member 894 is controlled by a pin 896 which is accessible to the operator.

Swinging movements of the wiper holders 888 are effected through links 898 (Figs. 31 and 33) connected to slides 900 which are supported and guided by blocks 902 (Figs. 29 and 31) fast on the top plate of the wiper head. The slides 900 are each provided with rack teeth connected by a pinion 904 to rack teeth formed on a bar 906 mounted for sliding movement in the rear end of the wiper head. It will be seen that closing movement of the wipers is effected by movements of the bars 906 toward the left (Fig. 31). For this purpose each of the bars has associated therewith an arm 908 (Figs. 5 and 25) which is mounted for swinging movement about a pivot stud 910 on a bracket arm 912 on the wiper head, the two arms 908 being connected by a yoke 914 so that they swing in unison. Each of the arms 908 at its lower end is forked to embrace the corresponding bar 906 and engages at one side a collar 916 which is fast on the bar 906 and at the other side a collar 918 slidably mounted on the bar, this collar bearing against a spring 920 confined on the bar by nuts 922. It will thus be seen that closing movement is imparted yieldingly to each of the wipers 834 independently when the arms 908 are swung in one direction so that the extent of the closing movement is determined by the shoe, and that the wipers are retracted positively when the arms are swung in the opposite direction, the limit of their retractive movement being determined by the engagement of the collars 916 with the wiper head.

For operating the arms 908 there is connected to the yoke member 914 an arm 924 connected by a link 926 to one arm of a bell-crank lever 928 pivotally mounted on a cross-rod 930 on bracket arms 932 which are fast on the support 824. The other arm of the bell-crank 928 is provided with a roll 934 engaged by a path cam formed in one side of a cam wheel 936 mounted on a cam shaft 938 on the movable support 824. The means for operating and controlling the cam shaft 938 will be hereinafter described.

The swinging of the wiper head 832 about the axis of the rod 830 to cause the wipers 834 to wipe the upper heightwise of the toe is effected by means of a pair of inverted toggles comprising links 940 and 942 at each side of the wiper head (Figs. 29 and 33), each pair of links being connected together by a pivot stud 944 and the longer links 940 being connected at their upper ends to the wiper head. The shorter links 942 are connected to a cross-rod 946 which, although movable in certain respects as hereinafter explained, is to all intents and purposes a substantially fixed rod as far as the operation of the toggles 940, 942 is concerned. The pivot studs 944 at the knee joints of the toggles are connected by links 948 to arms 950 fast on a rock shaft 952 which is mounted in bearings in the support 824. The rock shaft 952 carries an arm 954 on which is a roll 956 engaged by a path cam 958 (Fig. 34) formed in one side of a cam wheel 960 (Fig. 5) on the shaft 938. Through these connections the cam acts to straighten the toggles 940, 942 and thereby to swing the wiper head downwardly to cause the wipers 834, which initially engage the shoe at a substantial distance above the plane of the shoe bottom, to wipe the upper toward the edge of the insole.

As hereinbefore described, the support 836 for the overwiping wipers 838 is mounted to swing about the axis of the rod 830 relatively to the wiper head 832. This support is connected by a pair of links 962 to the above-mentioned cross-rod 946, and the latter is connected by links 964 to a cross-rod 966 which is supported midway between its opposite ends on an arm 968 (Fig. 29) fast on a rock shaft 970 carried by the support 824. The pairs of links 962 and 964 are thus arranged to support the rod 946 and also to serve as toggles for purposes hereinafter described. Fast on the rock shaft 970 are arms 972 joined together as shown in Fig. 29 and connected by links 974 to arms 976 on a rock shaft 978 (Fig. 25). The rock shaft 978 is also provided with an arm 980 connected to the rod 846 hereinbefore described as a part of the means for moving the lasting mechanism forwardly toward the toe.

It has been explained that the rod 846, after moving the lasting mechanism forwardly until the upwiping wipers 834 engage the end face of the toe, moves relatively to the support 824 of the lasting mechanism a distance depending upon the thickness of the upper materials at the end of the toe. The extent of such movement is indicated, for example, in Fig. 35. By this movement of the rod 846 relatively to the support 824 swinging movement is imparted to the arms 980 and 976 which act through the links 974 to swing the arms 972 and 968 in the direction to impart downward movement to the cross-rod 966. The toggle links 962 and 964 are at this time in substantially parallel relation, and accordingly the downward movement of the cross-rod 966 results in a lowering of the wiper support 836, so that the wipers 838 are moved downwardly a distance proportional to the thickness of the upper materials of the particular shoe operated upon. By this movement, combined with a further movement of fixed extent hereinafter referred to, the proper position of these wipers for wiping the upper materials inwardly over the insole is automatically determined. It will be evident that in this operation the cross-rod 946, hereinbefore described as affording a support for the links 942 of the toggles which operate the wiper head 832 to wipe the upper heightwise of the toe, is also moved downwardly a short distance, resulting in a short downward movement of the wiper head and the upwiping wipers prior to their main downward movement effected by the toggles 940, 942, and likewise proportional to the thickness of the upper materials, so that the final position of the upwiping wipers relatively to the plane of the shoe bottom will also depend upon the thickness of the materials.

The toggles 962, 964 are provided particularly for the purpose of effecting an upward compressing movement of the overwiping wipers 838 after they have wiped the upper inwardly over the insole. It is, therefore, necessary that the links of these toggles be positioned in non-parallel relation preparatory to the compressing action of the wipers in response to the straightening of the toggles. For controlling these toggles the cross-rod 946 is connected centrally by a link 982 to one arm 984 of a bell-crank lever mounted to turn on the shaft 952, the other arm 986 of this bell-crank having thereon a roll 988 engaged by a path cam 990 formed in one side of a cam wheel 992 on the shaft 938. By the action of this cam at that portion of its path indicated at $a$ in Fig. 34 the toggles 962, 964 are broken before the overwiping movement of the wipers 838 begins, so that in addition to the variable downward positioning movement of these wipers in accordance with the thickness of the upper materials, hereinbefore described, they also receive a fixed downward movement in every cycle of the machine, the combination of these two movements resulting in the positioning of the wipers in proper relation to the plane of the shoe bottom. During the overwiping operation and the application of the toe binder to the shoe, the roll 988 is engaged by a concentric portion of the cam 990 indicated at $b$. Thereafter a portion of the cam indicated at $c$ acts to straighten the toggles 962, 964 and thereby to force the wipers 838 upwardly to increase their pressure on the overwiped upper. It will be understood that the movement of the cross-rod 946 in thus operating the toggles 962, 964 will not materially affect the position of the wiper head 832, nor will such movement of the cross-rod be interfered with by the links 942, since the toggles 940, 942 will be substantially straight with the studs 944 substantially in alinement with the rod 966 at the time when the toggles 962, 964 are operated. It will also be seen by reference to the shape of the cam 990 shown in Fig. 34 that in the return of the parts to starting position the pressure of the wipers 838 on the shoe is first relaxed to permit them to be withdrawn without objectionable rubbing action on the overwiped upper, and that the parts are finally left with the toggles 962, 964 again in straightened condition preparatory to operating upon another shoe.

The overwiping wipers 838 comprise a pair of wiper plates which are mounted detachably in grooves formed in wiper holders 994, and are locked in position by a device, including pins 996 (Figs. 32 and 33) substantially like that hereinbefore described for locking the wipers 834 in place. The wiper holders 994 have on their lower faces dovetailed projections mounted in guiding grooves 998 (Fig. 32) formed in a wiper carrier 1000 which is guided for rectilinear sliding movement lengthwise of the shoe on the wiper support 836, as illustrated in Figs. 29 and 33. The grooves 998 are curved about an axis located substantially at the center of the end of the toe and thus guide the wipers for closing movement about the toe.

Advancing movement of the wipers 838 to wipe the upper inwardly over the insole at the end of the toe is effected by forward movement of the sliding wiper carrier 1000. For this purpose the carrier is connected by a link 1002 (Fig. 37) to a lever 1004 pivotally mounted at 1006 on a bracket 1008 fast on the top plate of the wiper head 832. The lever 1004 is connected by a link 1010 to one arm of a bell crank lever 1012 on the cross-rod 930, the other arm of which is provided with a roll 1014 engaged by a path cam 1016 formed in the cam wheel 936. Through these connections advancing movement of fixed extent is imparted positively to the overwiping wipers. The extent of such overwiping movement of the wipers may be varied by means of a hand wheel 1018 on a screw-threaded rod 1020 which is mounted in an upstanding projection of the lever 1004, the rod 1020 being arranged to impart upward or downward movement to a sliding block 1022 which is connected by a link 1024 to a stud on one end of the link 1002, this stud being mounted in a curved slot 1026 in the lever 1004. It will thus be seen that the effective length of the lever 1004 may be varied for varying the extent of the advancing movement of the wipers. The slot 1026 is curved about the axis of the pivotal connection of the link 1002 to the slide 1000, so that the position of the slide is not affected by the adjustment of the link.

The swinging movement of the wipers 838 to close them about the toe comprises first a positioning movement effected by the same means which imparts closing movement to the upwiping wipers 834, and thereafter a further operative movement effected by other mechanism to cause them to wipe the upper inwardly at the sides of the toe. Both these movements of the wipers are effected through slides 1028 which are mounted in guideways in the wiper support 836 and are connected to the wiper holders 994 by links 1030. For imparting the positioning movement to the wipers 838 as the upwiping wipers are closed about the toe, the slides 1028 are engaged and operated by lugs 1032 (Figs. 33 and 35) which are carried by the slides 900 that operate to close the upwiping wipers. In this manner the wiping edges of the wipers 838 are moved inwardly to positions close to the sides of the toe ready to begin their overwiping operation after the upwiping of the upper has been effected. It will be evident that, since the extent of the closing movements of the upwiping wipers is determined by each shoe, the positions of the edges of the overwiping wipers relatively to the sides of the toe at the beginning of the overwiping operation are also determined by the shoe, so that these wipers will in each instance wipe the upper inwardly over the insole to the same distance by the subsequent action of positive means which imparts to them further closing movement of fixed extent as hereinafter described. It will be further understood that the positive advancing movement of the wipers 838 lengthwise of the shoe also begins from a point determined by the engagement of the upwiping wipers with the end of the toe, so that the extent of the overwipe at the end of the toe as well as at the sides of the toe is determined by each shoe and is thus uniform on all shoes of the same size and style.

For imparting operative closing movement over the shoe to the wipers 838 the slides 1028 are connected by links 1034 to lever arms 1036 which are mounted for swinging movement about the shaft 952, one of these arms being shown in Fig. 30, and both the arms being connected together by a cross-rod 1038 so that they swing in unison and thus impart equal closing movements to both wipers. For imparting operative movement to the arms 1036 there is provided a lever 1040 mounted to swing about a pivot stud 1042 on one of the bracket arms 932, and between this lever and one of the arms 1036 there is a take-up connection whereby the arms 1036 are permitted to swing relatively to the lever when the wipers 838 receive their above-mentioned preliminary closing movement and are positively operated by the lever from any position which they assume at the end of such preliminary closing movement. By reference to Fig. 30 it will be seen that the lever 1040 is connected by a link 1044 to an arm 1046 fulcrumed on the shaft 952, this arm having on one side thereof an abutment 1048 which is opposed to an abutment 1050 fast on the adjacent side of the arm 1036. These two abutments are arranged in divergent relation to each other and between them is positioned a roll 1052 which is mounted on a link 1054 carried by an arm 1056 pivoted on the arm 1046. It will thus be seen that when the arm 1036 is moved toward the right (Fig. 30) in the preliminary closing movement of the wipers, the abutment 1050 moves somewhat away from the abutment 1048, thus enlarging the wedge-shaped opening between the two abutments. The roll 1052 is further controlled by a peripheral cam 1058 on the cam wheel 992, this cam acting on a lever 1060 which is pivoted on the shaft 952 and carries a roll 1062 in engagement with a finger 1064 depending from the arm 1056, the finger being engaged on the opposite side from the roll by a spring plunger 1066 in the arm 1046. When the cam wheel 992 receives its operative movement the cam 1058 releases the lever 1060 and thus permits the spring plunger 1066 to swing the arm 1056 in the direction to carry the roll 1052 downwardly as far as permitted by the enlarged wedge-shaped opening between the two abutments 1048 and 1050, so that the roll will act as a positive connection through which movement is imparted to the arms 1036 when the lever 1040 begins its operative movement. This lever carries a roll 1068 engaged by a path cam 1070 formed in one side of the cam wheel 992. In the return of the parts to starting position the cam 1058 acts on the lever 1060 to cause the roll 1062 to swing the arm 1056 upwardly and thus raise the roll 1052 to its initial position to permit the return of the wipers 838 to their original open positions. This return movement of the wipers and of the arms 1036 connected thereto is effected by springs 1072 (Figs. 26 and 33) connected at their opposite ends respectively to the lugs 1032 on the slides 900 and to the slides 1028.

For varying the extent of the positively effected overwiping movement of the wipers 838 there is mounted in an upward extension of the lever 1040 a threaded rod 1074 controlled by a hand wheel 1076 and arranged to raise or lower a sliding block 1078 connected by a link 1080 to a slide 1082 which is movable in a curved slot 1084 in the lever 1040 and to which one end of the link 1044 is connected. It will be evident that by this means the link 1044 may be positioned at different distances from the fulcrum of the lever 1040 with a corresponding variation in the extent of the movement imparted to the wipers. It will be understood that this adjusting mechanism is to be used in conjunction with the mechanism shown in Fig. 37 for varying the extent of the overwiping movement of the wipers at the end of the toe.

Included also in the machine shown is mechanism for applying to the toe a toe binder of the kind disclosed in United States Letters Patent No. 1,406,280, granted upon my application on February 14, 1922, this type of binder having end portions each projecting at an angle to its body portion and adapted to be forced through the upper and into the rib of the insole to hold the binder in place. Such a binder is shown at $d$ in Fig. 32, the binder being supported upon the upper faces of the wiper plates 838 with its end portions lying under retaining plates 1086 which are secured to the wipers along their outer edges by screws 1088, these plates being spaced from the upper faces of the wipers 838 throughout the greater portion of their area a distance substantially equal to the diameter of the wire binder and terminating far enough from the edges of the wipers to avoid interference with the overwiping operation. In the space between these plates and the wipers are mounted binder-applying members or plates 1090 having inner edges that are curved to conform substantially to the contour presented by the upstanding margin of the upper materials in engagement with the rib of the insole about the toe at the end of the overwiping operation. The plates 1090 are thus mounted for movements along the upper faces of the wipers 838 and are guided and controlled by arc-shaped slides 1092 and 1094 which are movable in correspondingly curved guideways formed in the upper faces of the wipers in substantial accordance with the disclosure of Letters Patent No. 1,634,511, granted upon my application on July 5, 1927. As more fully disclosed in that patent, the binder-applying plates are so controlled that in the binder-applying operation they have both bodily forward movement lengthwise of the shoe and swinging movement laterally of the shoe, so that they force the binder forwardly at the extreme end of the toe to a position close to the edges of the wipers 838 while also bending it about the toe and forcing its projecting ends into the shoe materials. Springs 1096 connected to the slides 1092 are arranged to hold the plates 1090 normally in the retracted positions in which they are shown in Fig. 32. It will be understood that prior to operating upon a shoe a previously formed binder $d$ is positioned in front of the plates 1090 as illustrated in Fig. 32, the wipers 1038 being provided with spring-controlled pins 1098 for retaining the binder in position, these pins having rounded or beveled ends so that they are readily yieldable in response to engagement of the binder therewith when it is presented in position for use and also as it is forced into engagement with the shoe. The binder may be placed in the position illustrated in Fig. 32 by hand or by the use of any suitable presenting tool. It will be understood that the binder-applying plates 1090 are operated after the wipers 838 have wiped the upper inwardly over the insole, and preferably just as their pressure upon the overwiped upper materials is relaxed by their downward movement following their upward compressing movement.

For operating the binder-applying plates 1090 they are extended outwardly beyond the sides of the wipers and are provided with heads 1100 which are arranged to be engaged by members 1102 on the ends of sliding rods 1104 which are guided in bearings in the wiper head 832. The rods 1104 have fast on their outer ends blocks 1106 (Figs. 5 and 27) in the opposite sides of which are guideways to receive rolls 1108 mounted on the forked lower ends of lever arms 1110 which are mounted for swinging movements about the pivot studs 910 previously referred to. Secured to each of the lever arms 1110 is an arm 1112 connected to a link 1114 in which is formed a slot 1116 to receive a stud 1118 carried by the forked upper end of an operating lever 1120 which is fast on a rock shaft 1122 mounted on the support 824. Movement is imparted to the rock shaft 1122 by an arm 1124 which carries a roll 1126 engaged by a path cam 1128 in one side of a cam wheel 1130 on the shaft 938. Between each of the studs 1118 and the corresponding link 1114 there is provided a releasable connection, so that, when either of the binder-applying plates 1090 has forced the binder against the shoe and can move no farther, the operating mechanism including the levers 1120 may continue its movement. For this purpose there are pivotally mounted at 1132 on each link 1114 a pair of bars 1134 which are so formed on their inner sides that face each other as to provide a V-shaped slot when the bars are close together, as illustrated in Fig. 27, and having at the smaller end of the slot cooperating curved recesses 1136 which are arranged to embrace the stud 1118. A rod 1138 is pivoted on one of the bars 1134 and projects through an opening in the other bar, and mounted on this rod is a spring 1140 which is arranged normally to force the bars together, as shown in Fig. 27. It will be understood that when either of the binder-applying plates 1090 can be moved no farther, continued movement of the corresponding arm 1120 causes its stud 1118 to wedge the bars 1134 apart and thus to move forward relatively to the link 1114, as illustrated in Fig. 28. Retractive movement of the rods 1104 is limited by engagement of the members 1102 thereon with the ends of the bearings in which the rods are mounted, so that in the return of the parts to starting positions the studs 1118 are returned to the positions indicated in Fig. 27.

For operating the cam shaft 938 of the toe-lasting mechanism, there is fast on the shaft a spiral gear wheel 1142 which is driven by a worm 1144 on a shaft 1146 mounted in bearings in the movable support 824. The shaft 1146 is splined in a rotatable sleeve 1148 mounted in a bearing 1150 on the frame of the machine, the sleeve being held from lengthwise movement by a collar 1152 at one side of the bearing and by the hub of a beveled pinion 1154 fast on the sleeve at the opposite side of the bearing. The shaft 1146 is thus permitted to slide through the sleeve when the support 824 of the lasting mechanism is moved toward or from the shoe, while maintaining a continuous operative connection with the pinion 1154. This pinion is engaged and driven by a pinion 1156 on a shaft 1158, this shaft having on its opposite end a beveled pinion 1160 (Fig. 3) driven by a similar pinion 1162 on a vertical shaft 1164. The shaft 1164 is arranged to be connected by means of a clutch 1166 (Figs. 3 and 10) to a continuously driven spiral gear wheel 1168 operated by a similar gear wheel 1170 on the continuously driven shaft 868. The clutch 1166 is controlled by a wedge arm 1172 connected by a link 1174 to a rack bar 1176 which is engaged by a gear sector formed on one arm of a bell crank 1178 connected by a link 1180 to a pivotally mounted arm 1182 provided with a roll 1184 arranged to be engaged by a control cam 1186 on the control shaft 326. It will thus be seen that at the proper time in the cycle the clutch 1166 is actuated to start the operative movement of the cam shaft 938 of the toe-lasting mechanism, the wedge arm 1172 being released by the cam 1186 and returned by a spring 1188 to operative position in time to bring the cam shaft 938 to a stop at the end of one complete revolution thereof.

The machine is further provided with means for holding the margin or feather of the insole about the toe in a position close to the bottom of the last during the upper-pulling and upwiping operations. This means comprises a member 1190 (Figs. 35 and 36) shaped to conform substantially to the curvature of the toe end of the insole and detachably mounted on the upper end of a bar 1192 which is slidable in an opening formed in the bracket 4 and is connected at its lower end by a link 1194 (Figs. 8 and 9) to one arm of a bell crank 1196 the other arm of which is provided with a roll 1198 engaged by a path cam 1200 formed in one side of the cam wheel 126 previously referred to. The bar 1192 is guided in the opening in the bracket 4 for movement first in a direction substantially perpendicular to the bottom face of the insole in withdrawing the member 1190 from engagement with the insole, after which it is moved farther away from the insole in a direction inclined rearwardly from the toe end of the shoe. For this purpose the bar is provided with a sloping face 1202 engaged by a pin 1204 on the bracket 4, and with a slot 1206 through which extends a pin 1208 on the bracket, this slot having different angularly related portions as illustrated in Fig. 35. A spring plunger 1210 in the bracket 4 holds the bar 1192 in engagement with the pin 1204. It will be understood that the member 1190 is presented in position to engage the feather of the insole when the shoe is first positioned in the machine, and that it is withdrawn from the shoe immediately prior to the operative movement of the overwiping wipers 838.

In the operation of the machine, the operator presents a last with upper and insole assembled thereon in the position illustrated in Fig. 8, with the toe end face of the last in engagement with the middle toe gripper and with the feather of the insole at the toe end in engagement with the member 1190. He then arranges the margin of the upper materials in proper position within the open toe and side gripper jaws, and thereafter starts the machine by depressing the treadle 352 as far as permitted by the limiting bar 376, the treadle being locked against return movement by the bar 378. In response to the depression of the treadle the main clutch 346 is actuated to start the operation of the two control shafts 326 and 334. The control shaft 334 then automatically actuates the clutches 88 and 164 to cause the closing of the toe and side grippers, and the control shafts 326 and 334 actuate respectively the clutches 462 and 434 to cause the toe and side grippers to receive their upper-pulling movement. At the end of this movement of the grippers the main clutch 346 is automatically actuated to stop the machine.

While the machine is thus at rest with the grippers holding the upper under tension, the operator may, if conditions require it, cause the grippers to open and release the upper and return to starting position. The opening of the grippers is first effected, by actuating the clutches 88 and 164 through depression of the hand lever 514. Thereafter the return of the grippers to starting position is effected by actuating the clutches 434 and 462 through the depression of the push button 516. The operator then arranges the margin of the upper again in the several grippers, and by a return upward movement of the hand lever 514 causes the grippers again to grip the upper, and also by depression of the push button 546 causes them again to pull the upper. The grippers and their operating mechanisms, including their controlling clutches, are then in the same positions which they assume at the end of the first stage of the cycle following the depression of the starting treadle.

While the machine is at rest at the end of the first stage of the cycle, and it may be also after the upper has been released and pulled a second time in the manner above described, the operator is enabled to move the two opposite pairs of side grippers relatively to each other lengthwise of the shoe to straighten the tip line by manipulation of the hand levers 270 under control of the pivoted handles 278. He may also, if conditions require it, move the opposite side grippers in a direction to increase or to relax their tension on the upper, or in directions to shift the forepart of the upper laterally of the last, by manipulation of the hand levers 302 through their handles 306.

When conditions are right for the continuance of the cycle of operations of the machine, the operator swings the toe rest or support 556 into position over the top of the forepart of the shoe, and by this movement of the toe rest the bar 376 is withdrawn from under the starting treadle, so that the treadle may be further depressed from the position in which it is held by the bar 378. By such depression of the treadle the main clutch is then actuated again to cause the control shafts 326 and 334 to complete their cycle. The toe rest 556 is moved downwardly into supporting engagement with the shoe in response to the actuation of its clutch 614 by the control shaft 334. The side overlaying and tacking mechanisms, which have received tacks in a previous cycle of the machine, are then moved inwardly toward the shoe in response to the actuation of the clutch 716 by the control shaft 334. In response to the inward movement of these mechanisms the side grippers and the corner toe grippers are rendered operative to draw the margin of the upper inwardly over the edge of the insole through the action of their overdraw springs 208. In response to the continued inward movement of the side overlaying and tacking mechanisms the margin of the upper is wiped inwardly over the feather of the insole along the sides of the forepart, and is then fastened by the driving of tacks, as illustrated in Fig. 22. In the proper time relation to such inward movement of the overlaying and tacking mechanisms, after they have arrived in position to clamp the upper to the margin of the insole, the opposite side grippers are caused to open and release the upper and are moved farther downwardly away from the shoe by automatic actuation of the clutches which control their opening and pulling movements. The toe grippers, however, continue to hold the upper. Immediately after their operations on the shoe, the side overlaying and tacking mechanisms are returned to starting position and receive a fresh supply of tacks (Fig. 22a).

After the side overlaying and tacking mechanisms have performed their operations on the shoe, the toe-lasting mechanism is operated to last the toe. This mechanism is first advanced, as a whole, lengthwise of the shoe, in response to actuation by the control shaft 326 of the clutch which controls the crank arm 852, the pad 886 on the upwiping wipers 834 being thereby carried into engagement with the end face of the toe. Near the end of this forward movement of the toe-lasting mechanism the rod 846 moves relatively to the toe-lasting mechanism a distance depending upon the thickness of the upper materials at the end of the toe, and thereby serves to impart to the overwiping wipers 838, as well as to the upwiping wipers, a proportional amount of downward positioning movement.

Thereafter the clutch 1166 is actuated by the control shaft 326 to start the toe-lasting mechanism in operation. At the beginning of the cycle of operations of this mechanism the upwiping wipers 834 are closed about the toe while these wipers are positioned at some distance above the plane of the shoe bottom, and in this closing movement the overwiping wipers 838 are swung inwardly to positions determined by the engagement of the upwiping wipers with the shoe. Thereafter the toggles 940, 942 are straightened to swing the wiper head 832 downwardly and thereby to cause the upwiping wipers to wipe the upper about the toe toward the edge of the insole. Near the end of this upwiping movement of the wipers the toggles 962, 964 are broken to swing the support 836 for the overwiping wipers 838 farther downwardly a fixed distance, thereby bringing these wipers to the overwiping plane determined, as hereinbefore explained, in accordance with the thickness of the upper materials. The parts are then positioned as illustrated in Fig. 35.

While the upwiping wipers 834 continue to hold the upper clamped about the toe, the overwiping wipers 838 are advanced and closed positively a fixed distance from the positions relatively to the shoe previously determined by the upwiping wipers, to wipe the upper inwardly over the feather of the insole. In time relation to the overwiping movement of these wipers the toe grippers are released from the upper and are moved farther downwardly to position them out of the way of the toe-lasting mechanism, and the insole-positioning member 1190 is also withdrawn from the shoe. Substantially at the end of the overwiping movement the wipers 838 they are forced upwardly by the straightening of the toggles 962, 964 to apply increased pressure to the upper over the feather of the insole. The positions of the parts at this stage are illustrated in Fig. 36. The toggles 962, 964 are then broken again to relax the pressure of the wipers 838 on the upper, and as the pressure is relaxed the binder-applying members 1090 are advanced and closed to apply the toe binder in firm engagement with the upper against the rib of the insole and to force the angled ends of the binder through the upper and into the rib of the insole to anchor the binder in place. Thereafter the parts of the machine are returned to their starting positions.

Having described the invention, what I claim as new and desire to secure by Letters Patent of the United States is:—

1. A machine of the class described having, in combination, means for pulling an upper over a last, upwiping means and overwiping means both movable together lengthwise of the shoe into operative relation to the toe, mechanism for operating said upwiping means and overwiping means to wipe the upper heightwise of the toe and inwardly over the bottom of the last after the upper-pulling operation, and means for applying a binder about the toe after the overwiping operation to hold the upper in lasted position.

2. A machine of the class described having, in combination, means for pulling an upper over a last, upwiping means and overwiping means both movable together lengthwise of the shoe into operative relation to the toe, mechanism for operating said upwiping means and overwiping means to wipe the upper heightwise of the toe and inwardly over the bottom of the last after the upper-pulling operation, and mechanism automatically operative after the overwiping operation to apply a binder about the toe and to fasten the binder to the shoe.

3. A machine of the class described having, in combination, means for pulling an upper over a last, different means constructed and arranged respectively to wipe the upper heightwise of the toe and to wipe it inwardly over the bottom of the last after the upper-pulling operation, and means for applying about the toe a binder provided with angular end portions and for forcing the ends of the binder into the shoe to fasten it to the shoe.

4. A machine of the class described having, in combination, means for pulling an upper over a last, different means constructed and arranged respectively to wipe the upper heightwise of the toe and to wipe it inwardly over the bottom of the last after the upper-pulling operation, the overwiping means being movable heightwise of the toe relatively to the upwiping means to apply compacting pressure to the upper, and means for fastening the upper in lasted position after the overwiping operation.

5. A machine of the class described having, in combination, means for pulling an upper over a last, different means constructed and arranged respectively to wipe the upper heightwise of the toe and to wipe it inwardly over the bottom of the last after the upper-pulling operation, the overwiping means being movable heightwise of the toe relatively to the upwiping means to apply compacting pressure to the upper, and automatic means for applying a binder about the toe and for fastening the binder to the shoe.

6. A machine of the class described having, in combination, means for positioning a last and shoe bottom downward with its toe end pointing upwardly and rearwardly away from the operator's working position, means for pulling the upper over the last in that position, and means for thereafter wiping the upper about the toe into lasted position and applying and fastening a binder to the shoe about the toe to hold the upper while the shoe is in the pulling-over position.

7. A machine of the class described having, in combination, means for positioning a last and shoe bottom downward with its toe end pointing upwardly and rearwardly away from the operator's working position, means for pulling the upper over the last in that position, means for thereafter wiping the upper heightwise of the toe and inwardly over the bottom of the last, and means for applying a binder about the toe and fastening the binder to the shoe.

8. A machine of the class described having, in combination, means for positioning a last and shoe bottom downward with its toe end pointing upwardly and rearwardly away from the operator's working position, means for pulling the upper over the last in that position, toe-lasting mechanism movable thereafter toward the toe of the shoe into operative position and including different means constructed and arranged respectively to wipe the upper heightwise of the toe and to wipe it inwardly over the bottom of the last, and mechanism associated with the over-wiping means for applying a binder about the toe to hold the upper in lasted position.

9. A machine of the class described having, in combination, means for pulling an upper over a last at the toe and at the sides of the forepart, means for laying the margin of the upper inwardly over the bottom of the last into finally lasted position about the toe and along the sides of the forepart substantially as far rearwardly as the ball line after the upper-pulling operation, and means for applying fastenings to hold the upper in lasted position about the toe and rearwardly substantially to the ball line including a plurality of fastening-inserting devices arranged to operate at each side of the shoe at the rear of the toe and automatically adjustable independently of one another to the contour of the side of the shoe.

10. A machine of the class described having, in combination, means for pulling an upper over a last at the toe and at the sides of the forepart, means for laying the margin of the upper inwardly over the bottom of the last into finally lasted position first along the sides of the forepart substantially as far rearwardly as the ball line and thereafter about the toe after the upper-pulling operation, means for applying a binder about the toe and for fastening the binder to the shoe to hold the toe portion of the upper in lasted position, and means for driving individual fastenings along the sides of the forepart at the rear of the toe substantially to the ball line to hold the upper at the sides of the forepart in lasted position.

11. A machine of the class described having, in combination, means for pulling an upper over a last, means for lasting the toe of the shoe, and overlaying and fastening mechanisms for the opposite sides of the forepart of the shoe constructed to lay the upper inwardly over the bottom of the last by engaging it on a substantially continuous line substantially from the field of operation of the toe-lasting means to points at or near the ball-line of the shoe and to drive at each side a row of fastenings extending along substantially the entire length of the overlaid portion of the upper to hold it in finally lasted position, said mechanisms comprising for each side of the shoe a plurality of overlaying and fastening devices each automatically adjustable independently of the others to the contour of the side of the shoe.

12. A machine of the class described having, in combination, means for pulling an upper over a last, means for lasting the toe of the shoe, and means for lasting the opposite sides of the forepart of the shoe prior to the lasting of the toe, said last-named means comprising at each side of the shoe mechanism constructed to lay the upper inwardly over the bottom of the last by engaging it on a substantially continuous line from a point at or near the tip seam to a point at or near the ball-line and to drive at each side a row of fastenings extending substantially from the tip seam to the ball-line to hold the upper in finally lasted position.

13. A machine of the class described having, in combination, means for pulling an upper over a last, means for thereafter laying the margin of the upper inwardly over the bottom of the last, automatic means for bringing the machine to a stop between the upper-pulling operation and the overlaying operation, a starting member movable to start the machine initially and movable farther in the same direction to start the machine after it has been stopped at the end of the upper-pulling operation, and a stop for preventing said member from moving in the first instance far enough to effect the second starting of the machine.

14. A machine of the class described having, in combination, means for pulling an upper over a last, means for thereafter laying the margin of the upper inwardly over the bottom of the last, automatic means for bringing the machine to a stop between the upper-pulling operation and the over-laying operation, a starting member movable to start the machine initially and movable farther in the same direction to start the machine after it has been stopped at the end of the upper-pulling operation, a stop for preventing said member from moving in the first instance far enough to effect the second starting of the machine, and mechanism controlled by manual movement of one of the operating instrumentalities of the machine for withdrawing said stop from its limiting position.

15. A machine of the class described having in combination, means for pulling an upper over a last, means for thereafter laying the margin of the upper inwardly over the bottom of the last, automatic means for bringing the machine to a stop between the upper-pulling operation and the over-laying operation, a starting member movable to start the machine initially and movable farther in the same direction to start the machine after it has been stopped at the end of the upper-pulling operation, a stop for preventing said member from moving in the first instance far enough to effect the second starting of the machine, a shoe rest arranged to be moved manually into a position opposite to the top of the forepart of the shoe, and mechanism arranged to be operated by such movement of the shoe rest to withdraw said stop from operative position.

16. A machine of the class described having, in combination, means for pulling an upper over a last, means for thereafter laying the margin of the upper inwardly over the bottom of the last, automatic means for bringing the machine to a stop between the upper-pulling operation and the over-laying operation, a shoe rest arranged to be positioned manually in relation to the shoe, and means for preventing the second starting of the machine until said shoe rest has received its positioning movement.

17. A machine of the class described having, in combination, means for pulling an upper over a last, means for thereafter laying the margin of the upper inwardly over the bottom of the last, automatic means for bringing the machine to a stop between the upper-pulling operation and the over-laying operation, a treadle arranged to be depressed to a predetermined position to start the machine in the first instance and movable farther in the same direction to start the machine a second time, automatic means for locking the treadle in the position it assumes at the end of its first starting movement, a shoe rest arranged to be positioned manually in relation to the shoe, and mechanism operative as an incident to the positioning movement of the shoe rest to unlock the treadle.

18. A machine of the class described having, in combination, upper-pulling means, toe-lasting means, separate clutches through which operative movements are imparted respectively to said different means, and automatic means for actuating said clutches to start the different means in operation.

19. A machine of the class described having, in combination, upper-pulling means, toe-lasting means, separate clutches through which operative movements are imparted respectively to said different means, a manually-controlled clutch, and mechanism operated through said manually-controlled clutch for controlling said first-named clutches.

20. A machine of the class described having, in combination, upper-pulling means, toe-lasting means, each of said means having a separate starting and stopping mechanism associated therewith, a main starting and stopping mechanism arranged to be manually controlled, and automatic means for controlling said first-named starting and stopping mechanisms.

21. A machine of the class described having, in combination, upper-pulling means, toe-lasting means, each of said means having a separate starting and stopping mechanism associated therewith, and means for controlling said different starting and stopping mechanisms each independently of the other.

22. A machine of the class described having, in combination, upper-pulling means, side overlaying and fastening means, and an automatically controlled clutch through which operative movement is imparted to said side overlaying and fastening means.

23. A machine of the class described having, in combination, upper-pulling means, side overlaying and fastening means, separate clutches through which operative movements are imparted respectively to said different means, and automatic means for controlling said clutches to start the different means in operation.

24. A machine of the class described having, in combination, upper-pulling means, toe-lasting means, side overlaying and fastening means, and different clutches through which operative movements are imparted respectively to said different means.

25. A machine of the class described having, in combination, upper-pulling means, toe-lasting means, side overlaying and fastening means, separate clutches through which operative movements are imparted respectively to said different means, a main clutch arranged to be manually controlled, and mechanism operated through said main clutch for controlling said first-named clutches.

26. In a machine of the class described, a gripper for pulling an upper over a last, mechanisms operatively independent of each other for closing the gripper on the upper and for operating it to pull the upper respectively, each of said mechanisms including a clutch, and automatic means for actuating the different clutches in time relation to each other.

27. In a machine of the class described, grippers for pulling an upper respectively at the opposite sides of a last, and mechanisms operatively independent of each other and constructed and arranged to operate in automatically determined time relation to each other for closing said grippers on the upper and for operating them to pull the upper respectively.

28. In a machine of the class described, grippers for pulling an upper respectively at the opposite sides of a last, mechanism including a clutch for closing said grippers on the upper, and mechanism including a clutch arranged to be controlled independently of said first-named clutch for operating said grippers to pull the upper.

29. In a machine of the class described, a plurality of grippers for pulling an upper in different locations about the toe of a last, and mechanisms operatively independent of each other and constructed and arranged to operate in automatically determined time relation to each other for closing said grippers on the upper and for operating them to pull the upper respectively.

30. In a machine of the class described, grippers for pulling an upper respectively at the toe and at the opposite sides of a last, and operating mechanisms including separate clutches through which to impart operative movements to the toe and side grippers respectively.

31. In a machine of the class described, a toe gripper, opposite side grippers, mechanisms operatively independent of each other for closing the toe gripper and for operating it to pull the upper respectively, and other mechanisms operatively independent of each other for closing the side grippers and for operating them to pull the upper respectively.

32. In a machine of the class described, a toe gripper, opposite side grippers, mechanisms including separate automatically-controlled clutches for closing the toe gripper and for operating it to pull the upper respectively, and other mechanisms including automatically-controlled clutches for closing the side grippers and for operating them to pull the upper respectively.

33. In a machine of the class described, a plurality of grippers for pulling an upper respectively in different locations about a last, mechanisms including independently controlled clutches for closing said grippers and for operating them to pull the upper respectively, a main clutch arranged to be manually controlled, and means operated through said main clutch for controlling said first-named clutches.

34. In a machine of the class described, toe and side grippers for pulling an upper respectively at the toe and at the opposite sides of a last, independent controlling mechanisms including separate clutches for closing the toe and side grippers respectively, and automatic means for actuating the different clutches at different respective times to open the toe and side grippers.

35. In a machine of the class described, toe and side grippers for pulling an upper respectively at the toe and at the opposite sides of a last, independent controlling mechanisms including separate clutches for closing the toe and side grippers respectively, mechanisms for laying the upper inwardly over the bottom of the last and for fastening it first at the sides and then at the toe, and automatic means for actuating said clutches at different respective times first to open the side grippers and thereafter to open the toe grippers.

36. In a machine of the class described, a gripper for pulling an upper over a last, mechanism including a clutch for closing the gripper on the upper, and automatic means for actuating said clutch at different times in the cycle of the machine to close and to open the gripper.

37. In a machine of the class described, a gripper for pulling an upper over a last, mechanism including a clutch for operating said gripper to pull the upper, and automatic means for actuating said clutch at different times in the cycle of the machine to impart to the gripper movement to pull the upper and return movement to starting position.

38. In a machine of the class described, a gripper for pulling an upper over a last, mechanism including a clutch for operating said gripper to pull the upper, and automatic means for actuating said clutch a plurality of times in the cycle of the machine to cause the gripper first to pull the upper, to move farther away from the shoe in the direction of the pull after releasing the upper, and thereafter to return to starting position.

39. In a machine of the class described, a gripper for pulling an upper over a last, means for operating said gripper to pull the upper and then to hold it under tension, means for laying the upper inwardly over the bottom of the last, means for opening the gripper to release the upper for the overlaying operation, and automatic means for starting the gripper-operating means again in operation to withdraw the gripper farther from the shoe after it releases the upper.

40. In a machine of the class described, a gripper for pulling an upper over a last, mechanism including a clutch for operating said gripper to pull the upper, means for laying the upper inwardly over the bottom of the last, means for opening the gripper to release the upper for the overlaying operation, and mechanism for controlling said clutch to bring the gripper-operating means to a stop after the pull on the upper and to start said means to withdraw the gripper farther from the shoe after its release of the upper.

41. In a machine of the class described, means for gripping an upper on a last, power-operated mechanism including a rotatable element for effecting relative movement of said gripping means and the last to pull the upper, a main clutch, means for controlling said clutch to bring said rotatable element to a stop with the upper held under tension by the gripping means, and manually-operated means to cause said rotatable element to effect a relative return movement of the gripping means and the last to starting position independently of said main clutch.

42. In a machine of the class described, means for gripping an upper on a last, power-operated mechanism including a clutch for effecting relative movement of said gripping means and the last to pull the upper, a main clutch, mechanism operated through said main clutch for controlling said first-named clutch, means for controlling said main clutch to bring the machine to a stop at a point in the cycle when the upper is held under tension by the gripping means, and manually-operated means for controlling said first-named clutch independently of the main clutch to cause said power-operated mechanism to effect a relative return movement of the gripping means and the last to starting position.

43. In a machine of the class described, means for gripping an upper on a last, power-operated mechanism including clutch means for operating said gripping means in a predetermined cycle to grip and to pull the upper and thereafter to release the upper and return to starting position, a main clutch, mechanism operated through said main clutch for controlling said first-named clutch means, means for controlling said main clutch to bring the machine to a stop at a point in the cycle when the gripping means is holding the upper under tension, and manually-operated mechanism for controlling said first-named clutch means independently to enable the operator at said point in the cycle to cause the gripping means to complete its cycle and thereby to release the upper and return to starting position.

44. In a machine of the class described, means for gripping an upper on a last, power-operated mechanism including clutch means for operating said gripping means in a predetermined cycle to grip and to pull the upper and thereafter to release the upper and return to starting position, a main clutch, mechanism operated through said main clutch for controlling said first-named clutch means, means for controlling said main clutch to bring the machine to a stop at a point in the cycle when the gripping means is holding the upper under tension, and manually-operated mechanism for controlling said first-named clutch means independently to enable the operator at said point in the cycle to cause the gripping means to release the upper and return to starting position and thereafter to grip and pull the upper again.

45. In a machine of the class described, power-operated means operative in an automatically determined cycle to grip an upper and pull it over a last and thereafter to release the upper and return to starting position, power-operated means for laying the margin of the upper inwardly over the bottom of the last, controlling means for bringing the machine as a whole to a stop at a point in its cycle between the upper-pulling operation and the overlaying operation, and mechanism manually operable at said point in the cycle to cause the upper-gripping means to complete its cycle independently of the rest of the machine and thereby release the upper and return under power to starting position and then to begin another cycle to grip and pull the upper again.

46. In a machine of the class described, grippers for pulling an upper over a last, separately controlled power-operated mechanisms for closing and opening said grippers and for operating them to pull the upper respectively, automatic means for controlling said mechanisms, automatic means for bringing the machine to a stop at a point in the cycle when the upper is held under tension by the grippers, and manual means for further controlling said mechanisms to enable the operator at said point in the cycle to cause the grippers under power to release the upper and return to starting position and then to grip and pull the upper again.

47. In a machine of the class described, grippers for pulling an upper over a last, independently controlled mechanisms including separate clutches for closing and opening said grippers and for operating them to pull the upper respectively, a main clutch, mechanism operated through said main clutch for controlling said first-named clutches, means for controlling said main clutch to bring the machine to a stop at a point in the cycle when the grippers are holding the upper under tension, and manual means for controlling said first-named clutches independently at said point in the cycle to cause the grippers to release the upper and return to starting position and then to grip and pull the upper again.

48. In a machine of the class described, a gripper for pulling an upper over a last, said gripper comprising a pair of jaws relatively movable to grip the upper, and jaw-closing means comprising a screw-threaded member mounted for turning movement in the gripper to effect the relative closing movement of the jaws by the action of its thread.

49. In a machine of the class described, a gripper for pulling an upper over a last, said gripper comprising a pair of jaws relatively movable to grip the upper, and jaw-closing means in the gripper comprising a member movable about an axis extending lengthwise of the gripper to effect the relative closing movement of the jaws.

50. In a machine of the class described, a gripper for pulling an upper over a last, said gripper comprising a pair of jaws relatively movable to grip the upper, and jaw-closing means comprising interengaging screw-threaded members in the gripper one of which is rectilinearly movable in response to turning movement of the other to effect relative closing movement of the jaws.

51. In a machine of the class described, a gripper for pulling an upper over a last, said gripper comprising a pair of jaws relatively movable to grip the upper, a jaw-closing member movable lengthwise of the gripper to effect relative closing movement of the jaws, and a member in the gripper having screw-threaded connection with said closing member and rotatable about an axis extending lengthwise of the gripper to impart jaw-closing movement to said closing member.

52. In a machine of the class described, a gripper for pulling an upper over a last, said gripper comprising a pair of jaws relatively movable to grip the upper, interengaging screw-threaded members one of which is movable bodily in response to turning movement of the other to effect relative closing movement of the jaws, said other member being movable bodily in a direction opposite to the direction of the movement of the first member in response to resistance of the upper to the closing of the jaws, and a spring arranged to be subjected to stress by the bodily movement of said other member for holding the jaws yieldingly in gripping relation to the upper.

53. In a machine of the class described, a gripper for pulling an upper over a last, said gripper comprising a pair of jaws relatively movable to grip the upper, a plunger movable lengthwise of the gripper to effect relative closing movement of the jaws, a member having threaded engagement with said plunger for operating the plunger, said member being movable lengthwise in a direction opposite to the direction of the movement of the plunger in response to resistance of the upper to the closing of the jaws, and a spring arranged to be subjected to stress by the last-mentioned movement of said member and to act through said member and plunger to hold the jaws yieldingly in gripping relation to the upper.

54. In a machine of the class described, a gripper for pulling an upper over a last, said gripper comprising a pair of jaws relatively movable to grip the upper, jaw-closing means in the gripper comprising a member rotatable to effect relative closing movement of the jaws, and a rotatable shaft having a universal connection with said member for operating it.

55. In a machine of the class described, a gripper for pulling an upper over a last, said gripper comprising a pair of jaws relatively movable to grip the upper, jaw-closing means comprising a member rotatable about an axis extending lengthwise of the gripper to effect relative closing movement of the jaws, a rotatable shaft extending generally lengthwise of the gripper and having a universal connection with said member for operating it, and rack and pinion mechanism for operating said shaft.

56. In a machine of the class described, a gripper for pulling an upper over a last, said gripper comprising a pair of jaws relatively movable to grip the upper and movable together to pull the upper, jaw-closing means in the gripper comprising a member rotatable to effect relative closing movement of the jaws, and a rotatable shaft having a universal connection with said member for operating it, said shaft extending generally lengthwise of the gripper and being movable with the gripper jaws in the upper-pulling operation.

57. In a machine of the class described, a gripper for pulling an upper over a last, said gripper comprising a pair of jaws relatively movable to grip the upper, a gripper casing supporting said jaws, jaw-closing mechanism comprising a member movable in said casing about an axis extending generally lengthwise of the gripper to effect relative closing movement of the jaws, a rotatable shaft extending generally lengthwise of the gripper and having a universal connection with said member for operating it, and means separately connected to said gripper casing and shaft for imparting upper-pulling movement to the gripper.

58. In a machine of the class described, a gripper for pulling an upper over a last, and operating mechanism comprising a plunger extending generally lengthwise of the gripper at the side thereof and connected to the gripper for imparting thereto its upper-pulling movement.

59. In a machine of the class described, a gripper for pulling an upper over a last, and operating mechanism comprising a hollow plunger extending generally lengthwise of the gripper at the side thereof and connected to the gripper for imparting thereto upper-pulling movement, a spring in said plunger, and means for operating the plunger yieldingly through said spring.

60. In a machine of the class described, a gripper for pulling an upper over a last, said gripper comprising a pair of jaws relatively movable to grip the upper, means for effecting relative closing movement of said jaws comprising a rotatable shaft extending generally lengthwise of the gripper, said shaft being movable lengthwise with the gripper to pull the upper, a plunger arranged in substantially parallel relation to said shaft for operating the gripper to pull the upper, a connection between said plunger and shaft, and an additional connection between said plunger and the gripper.

61. In a machine of the class described, a gripper for pulling an upper over a last, said gripper comprising a pair of upper-gripping jaws, a gripper casing supporting said jaws, and jaw-closing mechanism in said casing, said jaws being mounted on the gripper casing for turning movement about an axis extending generally parallel to the direction of the pull of the gripper on the upper to adjust them relatively to the last.

62. In a machine of the class described, a gripper for pulling an upper over a last, said gripper comprising a pair of upper-gripping jaws, a gripper casing supporting said jaws, and jaw-closing mechanism in said casing, said jaws being mounted on the casing by a threaded connection permitting them to be turned about an axis extending generally parallel to the direction of the pull of the gripper on the upper to adjust them relatively to the last, and a spring-controlled member for holding the jaws in adjusted position.

63. In a machine of the class described, a gripper for pulling an upper over a last, said gripper comprising a pair of jaws relatively movable to grip the upper, a member mounted for turning movement to effect relative closing movement of the jaws, and a rotatable shaft having a universal connection with said member for operating it, the gripper being movable about an axis located in said universal connection in a direction to draw the upper inwardly over the bottom of the last.

64. In a machine of the class described, a gripper for pulling an upper over a last, said gripper being movable to draw the upper inwardly over the bottom of the last, and a spring at the outer side of the gripper arranged to be tripped to impart to the gripper such overdraw movement.

65. In a machine of the class described, a gripper for pulling an upper over a last, said gripper being movable to draw the upper inwardly over the bottom of the last, a spring arranged to be tripped to impart to the gripper such overdraw movement, overlaying and fastening mechanism movable inwardly toward the shoe, and means on said overlaying and fastening mechanism for tripping said spring.

66. In a machine of the class described, a gripper for pulling an upper over a last, a spring arranged to be tripped to impart to the gripper movement to draw the upper inwardly over the bottom of the last, and a device connecting said spring to the gripper comprising parts relatively adjustable to vary the position of the gripper transversely of the edge of the shoe bottom.

67. In a machine of the class described, a gripper for pulling an upper over a last, said gripper being movable to draw the upper inwardly over the bottom of the last, means for imparting to the gripper such overdraw movement comprising a member connected to the gripper, a rod having screw-threaded connection with said member and a spring arranged to act on said rod, and a latch for holding the rod in retracted position, said rod being operative by turning movement to vary the initial position of the gripper transversely of the edge of the shoe bottom.

68. In a machine of the class described, a gripper for pulling an upper over a last, gripper-operating means comprising a member positioned at the side of the gripper and movable heightwise of the last to impart to the gripper its upper-pulling movement, and mechanism carried by said member for imparting to the gripper movement to draw the upper inwardly over the bottom of the last.

69. In a machine of the class described, a gripper for pulling an upper over a last, gripper-operating means comprising a member positioned at the side of the gripper and movable heightwise of the last to impart to the gripper its upper-pulling movement, and a spring-operated device carried by said member and arranged to be tripped to impart to the gripper movement to draw the upper inwardly over the bottom of the last.

70. In a machine of the class described, a gripper for pulling an upper over a last, gripper-operating means comprising a member positioned at the side of the gripper and movable heightwise of the last to impart to the gripper its upper-pulling movement, spring means carried by said member and arranged to be tripped to impart to the gripper movement to draw the upper inwardly over the bottom of the last, and mechanism operative in response to return of said member to starting position to return said spring means to its initial position.

71. In a machine of the class described, a plurality of grippers for pulling an upper respectively in different locations about a last, and a plurality of hollow plungers at the sides of the respective grippers for imparting to the grippers their upper-pulling movements, each of said plungers having therein a spring independently yieldable in response to resistance of the upper to the pull of the gripper.

72. In a machine of the class described, a pair of grippers for pulling an upper at the same side of a last, a member common to both grippers for operating them, and a device at the side of each gripper for connecting it to said member, each of said devices including a spring independently yieldable in response to resistance of the upper to the pull of the gripper.

73. In a machine of the class described, a pair of grippers for pulling an upper at the same side of a last, a plunger at the side of each gripper for imparting to the gripper its upper-pulling movement, a member between said plungers for operating them, and a spring associated with each plunger and independently yieldable in response to resistance of the upper to the pull of the gripper.

74. In a machine of the class described, different pairs of grippers for pulling an upper respectively at the opposite sides of a last, different pairs of operating devices positioned at the sides of the respective grippers for operating them, a lever, and a yoke member connecting said lever to the different pairs of operating devices.

75. In a machine of the class described, grippers for pulling an upper respectively at the opposite sides of a last, means for operating said grippers to pull the upper, and manually-operated members mounted independently of the gripper-operating means and arranged to impart respectively to the opposite side grippers movement either in a direction to increase the force of the pull or in a direction to relax the force of the pull.

76. In a machine of the class described, grippers for pulling an upper respectively at the opposite sides of a last, means for operating said grippers to pull the upper, manually-operated members arranged respectively to impart to the opposite side grippers movement either in a direction to increase the force of the pull or in a direction to relax the force of the pull, said members being normally disconnected from the grippers, and mechanism associated with each of said members and arranged to act in response to movement of the member either in a direction to increase the force of the pull or in a direction to relax the force of the pull first to connect said member to the gripper and then to operate the gripper.

77. In a machine of the class described, grippers for pulling an upper respectively at the opposite sides of a last, means for operating said grippers to pull the upper, hand levers associated respectively with the opposite side grippers and each movable in one direction to cause its gripper to increase the force of the pull or in the opposite direction to cause the gripper to relax the force of the pull, each hand lever having a handle movably mounted thereon, and a double-acting pawl and ratchet device controlled by said handle for first connecting the hand lever to the gripper and for then imparting movement to the gripper.

78. In a machine of the class described, different pairs of grippers for pulling an upper respectively at the opposite sides of a last, means for operating said grippers to pull the upper, manually-operated members mounted independently of said gripper-operating means for imparting respectively to the opposite pairs of side grippers movement either in a direction to increase the force of the pull or in a direction to relax the force of the pull, and connections between each of said members and its associated pair of grippers including an equalizing device to permit relative movement between the different grippers in increasing or relaxing the force of the pull.

79. In a machine of the class described, grippers for pulling an upper respectively at the opposite sides of a last, different manually-operated members for imparting respectively to the opposite side grippers movement either forwardly or rearwardly lengthwise of the last to adjust the upper, said members being normally disconnected from the grippers and mechanism associated with each of said members and operative in response to movement of the member first to connect it to the gripper and then to impart movement to the gripper.

80. In a machine of the class described, grippers for pulling an upper respectively at the opposite sides of a last, different manually-operated members associated respectively with the opposite side grippers and each movable in opposite directions to move the corresponding side gripper in opposite directions lengthwise of the last, said members being normally disconnected from the grippers, and mechanism associated with each of said members and operative in response to movement of the member in either direction first to connect the member to the gripper and then to impart movement to the gripper.

81. In a machine of the class described, grippers for pulling an upper respectively at the opposite sides of a last, different hand levers associated respectively with the opposite side grippers and each movable in opposite directions to move the corresponding gripper in opposite directions lengthwise of the last, said hand levers being normally disconnected from the grippers, and a double-acting pawl and ratchet device associated with each hand lever for connecting it to the gripper to move the gripper in either direction.

82. In a machine of the class described, grippers for pulling an upper respectively at the opposite sides of a last, devices positioned at the sides of the different respective grippers for operating the grippers to pull the upper heightwise of the last, and manually-operated means arranged to act through said operating devices to impart to the grippers movements lengthwise of the last.

83. In a machine of the class described, grippers for pulling an upper respectively at the opposite sides of a last, devices positioned at the sides of the respective grippers for operating the grippers to pull the upper, said operating devices including members connected to the grippers and movable about axes extending lengthwise of the grippers to move the grippers lengthwise of the last, and means connected to said members for thus moving them about their axes.

84. In a machine of the class described, grippers for pulling an upper respectively at the opposite sides of a last, devices for imparting to said grippers movement to draw the upper inwardly over the bottom of the last, and manually-operated means arranged to act through said devices to move the grippers lengthwise of the last.

85. In a machine of the class described, grippers for pulling an upper respectively at the opposite sides of a last, means positioned at the sides of said grippers for operating them to pull the upper and including devices for imparting to the grippers movement to draw the upper inwardly over the bottom of the last, said devices being movable about axes extending lengthwise of the grippers to move the grippers lengthwise of the last, and manually-operated means for thus moving said devices about their axes.

86. In a machine of the class described, different pairs of grippers for pulling an upper respectively at the opposite sides of a last, each of the grippers being mounted independently for movement lengthwise of the last, and different manually-operated members, one for each pair of grippers, for moving both grippers of each pair together lengthwise of the last.

87. In a machine of the class described, different pairs of grippers for pulling an upper respectively at the opposite sides of a last, each gripper being mounted independently for movement lengthwise of the last, operating means for each gripper including a member connected to the gripper and movable about an axis extending lengthwise of the gripper to move the gripper lengthwise of the last, and means arranged to act through the different members connected to each pair of grippers to move both grippers of the pair together lengthwise of the last.

88. In a machine of the class described, different pairs of grippers for pulling an upper respectively at the opposite sides of a last, each gripper being mounted independently for movement lengthwise of the last, and means connecting the grippers of each pair together to move lengthwise of the last in unison, said connecting means being adjustable to vary the distance between the grippers lengthwise of the last.

89. In a machine of the class described, different pairs of grippers for pulling an upper respectively at the opposite sides of a last, devices positioned at the sides of said grippers for operating them to pull the upper, said devices including members connected to the grippers and movable about axes extending lengthwise of the grippers to move the grippers lengthwise of the last, and means for thus moving said members about their axes including a connection between the grippers of each pair for varying the distance lengthwise of the last between said grippers.

90. In a machine of the class described, grippers for pulling an upper at the opposite sides of a last, a plurality of grippers for pulling the upper also about the toe of the last including grippers for engaging the upper substantially at the corners of the toe, means for laying the upper inwardly over the bottom of the last and fastening it at the sides of the forepart at the rear of the toe while maintaining it still unfastened at the toe, and means for imparting to the opposite side grippers and to the corner toe grippers substantially simultaneously movements in directions to draw the upper inwardly over the bottom of the last preparatory to the overlaying and fastening operation at the sides.

91. In a machine of the class described, grippers for pulling an upper at the opposite sides of a last, a plurality of grippers for pulling the upper also about the toe of the last including grippers for engaging the upper substantially at the corners of the toe, overlaying and fastening mechanisms movable to lay the upper over the bottom of the last and to fasten it at the sides of the forepart at the rear of the toe, and means controlled by said overlaying and fastening mechanisms for imparting to the side grippers and to the corner toe grippers movements in directions to draw the upper inwardly over the bottom of the last.

92. In a machine of the class described, grippers for pulling an upper at the opposite sides of a last, a plurality of grippers for pulling the upper also about the toe of the last including grippers for engaging the upper substantially at the corners of the toe, means for laying the upper inwardly over the bottom of the last and fastening it at the sides of the forepart at the rear of the toe, means for imparting to the side grippers and to the corner toe grippers movements in directions to draw the upper inwardly over the bottom of the last substantially at the time of the overlaying operation, and means for releasing the side grippers from the upper prior to the fastening operation while the toe grippers continue to hold the upper.

93. In a machine of the class described, grippers for pulling an upper at the opposite sides of a last, a plurality of grippers for pulling the upper also about the toe of the last including grippers for engaging the upper substantially at the corners of the toe, each of said side grippers and corner toe grippers having associated therewith spring means arranged to be tripped to impart to said grippers movements in directions to draw the upper inwardly over the bottom of the last.

94. In a machine of the class described, the combination with last and shoe-positioning means, of toe-lasting mechanism comprising upwiping means and overwiping means movable together lengthwise of the shoe into operative position, power-operated means for thus moving said toe-lasting mechanism into operative position in the operation of the machine on each shoe, power-driven mechanism for effecting relative movement of the last and said upwiping means and overwiping means to wipe the upper heightwise of the toe and inwardly over the bottom of the last, and mechanism associated with said upwiping means and overwiping means for applying a binder about the toe to hold the upper in lasted position.

95. In a machine of the class described, the combination with last and shoe-positioning means, of toe-lasting mechanism comprising devices constructed and arranged respectively to wipe the upper heightwise of the toe and to wipe it inwardly over the bottom of the last, power-operated means for operating said devices in automatically determined time relation to each other, and mechanism associated with said devices for applying about the toe a binder provided with angular end portions and for forcing the ends of the binder into the shoe to fasten it to the shoe.

96. In a machine of the class described, the combination with last and shoe-positioning means, of toe-lasting mechanism comprising upwiping means and overwiping means for wiping the upper respectively heightwise of the toe and inwardly over the bottom of the last, power-operated mechanism for moving said overwiping means heightwise of the toe relatively to the upwiping means in automatically determined time relation to the overwiping operation to apply compacting pressure to the upper, and means for fastening the upper in lasted position after the overwiping operation.

97. In a machine of the class described, the combination with last and shoe-positioning means, of toe-lasting mechanism comprising different sets of wipers each constructed to engage the upper on a substantially continuous line about the toe and arranged respectively to wipe the upper heightwise of the toe and to wipe it inwardly over the bottom of the last, and means associated with said wipers for applying a binder about the toe to hold the upper in lasted position.

98. In a machine of the class described, the combination with last and shoe-positioning means, of toe-lasting mechanism comprising different sets of wipers each constructed to engage the upper on a substantially continuous line about the toe and arranged respectively to wipe the upper heightwise of the toe and to wipe it inwardly over the bottom of the last, the overwiping wipers being movable heightwise of the toe relatively to the upwiping wipers to apply compacting pressure to the upper, and means associated with said wipers for applying a binder about the toe and for fastening the binder to the shoe.

99. In a machine of the class described, the combination with last and shoe-positioning means, of toe-lasting mechanism comprising upwiping means and overwiping means movable together lengthwise of the shoe to bring the upwiping means into position to operate on the shoe, and power-operated means for thus moving said toe-lasting mechanism into operative position in the operation of the machine on each shoe, said upwiping means and overwiping means being relatively movable heightwise of the shoe in operating upon the shoe.

100. In a machine of the class described, the combination with last and shoe-positioning means, of toe-lasting mechanism comprising upwiping means and overwiping means movable together lengthwise of the shoe to bring the upwiping means into position to operate on the shoe, the upwiping means being mounted for movement heightwise of the shoe to wipe the upper toward the edge of the shoe bottom and the overwiping means being mounted for movement to wipe the upper inwardly over the shoe bottom and also for movement relatively to the upwiping means heightwise of the toe to apply compacting pressure to the overwiped upper.

101. In a machine of the class described, the combination with last and shoe-positioning means, of toe-lasting mechanism comprising a support movable lengthwise of the shoe, upwiping means, overwiping means and binder-applying means carried by said support, and power-operated mechanism for moving said support toward the shoe in the operation of the machine on each shoe to bring the upwiping means into position to operate on the shoe.

102. In a machine of the class described, the combination with last and shoe-positioning means, of toe-lasting mechanism comprising a support movable lengthwise of the shoe, and upwiping means, overwiping means and binder-applying means carried by said support, the overwiping means and the binder-applying means being movable as a unit heightwise of the shoe relatively to the upwiping means in operating on the shoe.

103. In a machine of the class described, the combination with last and shoe-positioning means, of toe-lasting mechanism comprising a support movable lengthwise of the shoe in the operation of the machine on each shoe, upwiping means carried by said support, overwiping wipers also carried by said support and mounted for advancing and closing movements and also for movement heightwise of the shoe relatively to the upwiping means, and power-operated means for imparting the different movements to said wipers in automatically determined time relation to each other.

104. In a machine of the class described, the combination with last and shoe-positioning means, of toe-lasting mechanism comprising a support movable lengthwise of the shoe in the operation of the machine on each shoe, a member mounted on said support for swinging movement heightwise of the shoe and having thereon means for wiping the upper heightwise of the toe, and another member mounted on said support for swinging movement heightwise of the shoe relatively to said first-named member and having thereon a slide movable lengthwise of the shoe and provided with wipers for wiping the upper inwardly over the bottom of the shoe.

105. In a machine of the class described, the combination with last and shoe-positioning means, of toe-lasting mechanism comprising upwiping means and overwiping means movable together lengthwise of the shoe in the operation of the machine on each shoe, said upwiping means and overwiping means being relatively movable heightwise of the shoe in operating on the shoe, and operating mechanism including a cam shaft for effecting relative operative movements of said different wiping means, said operating mechanism being movable lengthwise of the shoe with said wiping means.

106. In a machine of the class described, the combination with last and shoe-positioning means, of toe-lasting mechanism comprising a support movable lengthwise of the shoe in the operation of the machine on each shoe, a pair of toe-lasting wipers carried by said support and mounted to swing each about an axis extending heightwise of the shoe to wipe the upper about the toe over the bottom of the last, and mechanism including a cam shaft also carried by said support for operating said wipers.

107. In a machine of the class described, the combination with last and shoe-positioning means, of toe-lasting mechanism comprising a support movable lengthwise of the shoe in the operation of the machine on each shoe, upwiping wipers and overwiping wipers both carried by said support and relatively movable heightwise of the shoe, and operating mechanism also carried by said support and including a rotatable shaft for closing the different wipers about the toe and for effecting their relative movement heightwise of the toe.

108. In a machine of the class described, the combination with last and shoe-positioning means, of toe-lasting mechanism comprising a support movable lengthwise of the shoe in the operation of the machine on each shoe, toe-wiping means and binder-applying means carried by said support, and operating mechanism also carried by said support and including a rotatable shaft and connections therefrom for operating both the wiping means and the binder-applying means.

109. In a machine of the class described, the combination with last and shoe-positioning means, of toe-lasting mechanism comprising a support movable lengthwise of the shoe in the operation of the machine on each shoe, upwiping wipers and overwiping wipers carried by said support, and operating mechanism also carried by said support and including a rotatable shaft with connections therefrom for closing the upwiping wipers and overwiping wipers about the toe.

110. In a machine of the class described, the combination with last and shoe-positioning means, of toe-lasting mechanism comprising a support movable lengthwise of the shoe in the operation of the machine on each shoe, toe-lasting wipers carried by said support, operating mechanism also carried by said support and including a cam shaft for operating said wipers, and mechanisms each including a separately controlled clutch for advancing said support and for operating said cam shaft respectively.

111. In a machine of the class described, the combination with last and shoe-positioning means, of toe-lasting mechanism comprising upwiping means and overwiping means each mounted for movement heightwise of the shoe in operating on the shoe, and toggle mechanisms connected respectively to the different wiping means for moving them heightwise of the shoe.

112. In a machine of the class described, the combination with last and shoe-positioning means, of means for laying the margin of the upper inwardly over the bottom of the shoe, and mechanism for determining automatically in accordance with the thickness of the upper materials the position of the overlaying means relatively to the bottom face of the shoe prior to the overlaying operation.

113. In a machine of the class described, the combination with last and shoe-positioning means, of means for laying the margin of the upper inwardly over the bottom of the shoe, and mechanism controlled by engagement with the upper for effecting variably in accordance with the thickness of the upper materials relative positioning movement of the shoe and the overlaying means heightwise of the shoe prior to the overlaying operation.

114. In a machine of the class described, the combination with last and shoe-positioning means, of toe-lasting wipers for wiping the margin of the upper about the toe inwardly over the bottom of the shoe, and mechanism controlled by engagement with the upper at the toe for determining in accordance with the thickness of the upper materials the position of said wipers heightwise of the toe.

115. In a machine of the class described, the combination with last and shoe-positioning means, of toe-lasting wipers for wiping the margin of the upper about the toe inwardly over the bottom of the shoe, and mechanism controlled by engagement with the upper at the toe for effecting variably in accordance with the thickness of the upper materials relative positioning movement of the shoe and the wipers heightwise of the toe prior to the overwiping operation.

116. In a machine of the class described, the combination with last and shoe-positioning means, of toe-lasting wipers for wiping the margin of the upper about the toe inwardly over the bottom of the shoe, a wiper support movable forwardly lengthwise of the shoe to carry said wipers toward the shoe, means carried by said wiper support for engaging the upper at the end of the toe to limit the movement of said support, operating mechanism for imparting the forward movement to said support, said mechanism being movable relatively to the support a distance depending upon the thickness of the upper materials when movement of the support is stopped by the shoe, and connections for effecting by such movement of the operating mechanism relatively to the support a movement of the wipers heightwise of the shoe to position them relatively to the bottom face of the shoe.

117. In a machine of the class described, the combination with last and shoe-positioning means, of toe-lasting wipers for wiping the margin of the upper about the toe inwardly over the bottom of the shoe, upwiping means for engaging the upper at the toe, and mechanism controlled by said upwiping means in response to its engagement with the shoe for effecting a relative positioning movement of said wipers and the shoe heightwise of the shoe prior to the overwiping operation.

118. In a machine of the class described, the combination with last and shoe-positioning means, of toe-lasting mechanism comprising a support movable lengthwise of the shoe, upwiping means and overwiping means carried by said support, operating means for moving said support forwardly to a position determined by engagement of the upwiping means with the shoe upper, said operating means being movable relatively to the support a distance depending upon the thickness of the upper materials when movement of the support is stopped by the shoe, and connections between said operating means and the overwiping means for effecting by such relative movement a positioning movement of the overwiping means heightwise of the toe.

119. In a machine of the class described, the combination with last and shoe-positioning means, of means for wiping the upper heightwise of the shoe, and mechanism for determining automatically in accordance with the thickness of the upper materials the position of said wiping means relatively to the bottom face of the shoe at the end of the upwiping operation.

120. In a machine of the class described, the combination with last and shoe-positioning means, of means for wiping the upper heightwise of the shoe, and mechanism controlled by said upwiping means through engagement of said means with the upper of the shoe for effecting in accordance with the thickness of the upper materials a relative positioning movement of said means and the shoe heightwise of the shoe.

121. In a machine of the class described, the combination with last and shoe-positioning means, of toe-lasting mechanism comprising upwiping means and overwiping means, and mechanism for determining automatically in accordance with the thickness of the upper materials the position of both said upwiping means and said overwiping means heightwise of the toe.

122. In a machine of the class described, the combination with last and shoe-positioning means, of toe-lasting mechanism comprising upwiping means and overwiping means, and mechanism controlled by said upwiping means in response to its engagement with the shoe for effecting variably in accordance with the thickness of the upper materials a positioning movement of both said upwiping means and said overwiping means heightwise of the toe.

123. In a machine of the class described, the combination with last and shoe-positioning means, of toe-lasting wipers for wiping the margin of the upper about the toe inwardly over the bottom of the shoe, means for effecting a relative positioning movement of fixed extent heightwise of the toe between said wipers and the shoe in operating on each shoe, and additional means for effecting automatically a variable relative positioning movement of the shoe and said wipers heightwise of the toe in accordance with the thickness of the upper materials.

124. In a machine of the class described, the combination with last and shoe-positioning means, of toe-lasting wipers mounted for closing movement to wipe the upper about the toe inwardly over the bottom of the last, means for clamping the upper about the toe, and mechanism controlled by said clamping means for closing said wipers to positions determined by engagement of the clamping means with the shoe prior to the overwiping movement of the wipers.

125. In a machine of the class described, the combination with last and shoe-positioning means, of upwiping wipers and overwiping wipers, mechanism for closing said upwiping wipers about the toe, and means operated by said closing mechanism for also closing the overwiping wipers to positions determined by the upwiping wipers prior to the overwiping operation.

126. In a machine of the class described, the combination with last and shoe-positioning means, of upwiping wipers and overwiping wipers, mechanisms for closing the different respective wipers about the toe, and means for rendering the closing mechanism for the upwiping wipers effective to impart a preliminary movement to the other closing mechanism for positioning the overwiping wipers in a relation to the shoe determined by the upwiping wipers.

127. In a machine of the class described, the combination with last and shoe-positioning means, of overwiping wipers mounted for closing movement to wipe the upper about the toe inwardly over the bottom of the last, automatic means for effecting a variable preliminary closing movement of said wipers to position them as determined by the shape or size of the shoe, and additional means for thereafter imparting to said wipers an operative closing movement of fixed extent irrespective of the shape or size of the shoe.

128. In a machine of the class described, the combination with last and shoe-positioning means, of upwiping wipers and overwiping wipers both mounted for closing movement about the toe, means for effecting a variable preliminary closing movement of the overwiping wipers by the closing of the upwiping wipers to position the overwiping wipers as determined by the shoe, and mechanism for thereafter imparting to the overwiping wipers an operative closing movement of fixed extent irrespective of the shape of the shoe.

129. In a machine of the class described, the combination with last and shoe-positioning means, of wipers mounted for advancing and closing movements to wipe the upper about the toe inwardly over the bottom of the last, means controlled by the shoe for imparting to said wipers preliminary advancing and closing movements to positions determined by the shoe, and mechanism for thereafter imparting to said wipers advancing and closing movements of fixed extent irrespective of the shape or size of the shoe.

130. In a machine of the class described, the combination with last and shoe-positioning means, of upwiping wipers and overwiping wipers both mounted for advancing and closing movements about the toe of the shoe, means for determining by engagement of the upwiping wipers with the shoe the position of the overwiping wipers both lengthwise of the shoe and laterally of the shoe prior to the overwiping operation, and automatic means for imparting to the overwiping wipers from the position thus determined overwiping movements of fixed extent lengthwise and laterally of the shoe.

131. In a machine of the class described, the combination with last and shoe-positioning means, of toe-lasting mechanism comprising wipers mounted for closing movement to wipe the upper about the toe inwardly over the bottom of the last, said wipers being arranged to receive a preliminary closing movement to position them relatively to the sides of the toe prior to their overwiping movement, wiper-closing mechanism for said wipers a portion of which is movable relatively to another portion thereof in the preliminary closing movement of the wipers, and a take-up connection between the different portions of said wiper-closing mechanism to maintain an operative relation between them in any position to which said first-named portion of the mechanism is moved in the preliminary closing of the wipers.

132. In a machine of the class described, the combination with last and shoe-positioning means, of toe-lasting mechanism comprising wipers mounted for closing movement to wipe the upper about the toe inwardly over the bottom of the last, wiper-closing mechanism for imparting operative closing movement to said wipers, means arranged to operate through a portion only of said wiper-closing mechanism while the remainder of said mechanism is at rest to effect a preliminary closing of the wipers toward the edge of the shoe bottom prior to their operative overwiping movement, and a take-up connection between said portion of the mechanism and the remainder of said mechanism to maintain an operative relation between the different portions of the mechanism in any position to which the wipers are moved in positioning them relatively to the shoe.

133. In a machine of the class described, the combination with last and shoe-positioning means, of toe-lasting mechanism comprising upwiping means arranged to be closed about the toe of the shoe and overwiping wipers mounted for closing movement to wipe the upper about the toe inwardly over the bottom of the last, said upwiping means having mechanism associated therewith for effecting a preliminary closing movement of the overwiping wipers to positions determined by the engagement of the upwiping means with the shoe, operating mechanism for the overwiping wipers a portion only of which is movable with said wipers in their preliminary closing movement, and a take-up connection between the different portions of said wiper-operating mechanism to maintain an operative relation between them in any position assumed by the wipers at the end of their preliminary closing movement.

134. In a machine of the class described, the combination with last and shoe-positioning means, of toe-lasting mechanism comprising wipers mounted for closing movement to wipe the upper about the toe inwardly over the bottom of the last, said wipers being arranged to receive preliminary closing movement to position them relatively to the edge of the shoe bottom in accordance with the contour of the toe prior to their operative closing movement over the bottom of the last, operating mechanism for imparting to said wipers their operative closing movement comprising a wiper-connected portion movable in the preliminary closing movement of the wipers and a cam-operated portion unaffected by said preliminary closing movement, and an automatically adjustable device for rendering said cam-operated portion effective to impart positively to the wiper-connected portion a movement of fixed extent irrespective of the position assumed by the wipers in their preliminary closing movement.

135. In a machine of the class described, the combination with means for pulling an upper over a last, of mechanisms for laying the upper inwardly over the bottom of the last and fastening it at the opposite sides of the shoe, each of said mechanisms being movable laterally of the shoe, a lever connected to each mechanism for operating it, power means including a clutch for operating the levers, and automatic means for controlling said clutch to start the operation of the overlaying and fastening mechanisms.

136. In a machine of the class described, the combination with means for pulling an upper over a last, of overlaying and fastening mechanism at each side of the shoe slidingly movable in a rectilinear path laterally of the shoe into and out of operative position and including means for laying the upper inwardly over the bottom of the last and for fastening it in overlaid position.

137. In a machine of the class described, the combination with means for pulling an upper over a last, of overlaying and fastening mechanism operatively movable laterally of the shoe, said mechanism comprising a carrier having thereon a plurality of overlaying and fastening devices yieldable relatively to each other and to the carrier laterally of the shoe in response to engagement with the shoe, each of said devices including a member for laying the upper inwardly over the bottom of the last and also means for driving a fastening to fasten the upper.

138. In a machine of the class described, the combination with means for pulling an upper over a last, of overlaying and fastening mechanism operatively movable laterally of the shoe, said mechanism comprising a carrier having a plurality of overlaying and fastening devices mounted thereon for relative sliding movements laterally of the shoe and each including means for laying the upper inwardly over the bottom of the last and also means for driving a fastening to fasten the upper, and spring means for controlling said devices to permit them to yield laterally of the shoe independently of each other in response to resistance of the shoe.

139. In a machine of the class described, the combination with means for pulling an upper over a last, of overlaying and fastening mechanism operatively movable laterally of the shoe, said mechanism comprising a carrier having thereon a plurality of overlaying and fastening devices each comprising a member for laying the upper inwardly over the bottom of the last and means for driving a fastening to fasten the upper, said devices being yieldable independently of each other both laterally of the shoe and heightwise of the shoe in response to pressure of the shoe thereon.

140. In a machine of the class described, the combination with means for pulling an upper over a last, of overlaying and fastening mechanism operatively movable laterally of the shoe, said mechanism comprising a carrier having thereon a plurality of overlaying and fastening devices yieldable independently of each other both laterally of the shoe and heightwise of the shoe in response to pressure of the shoe thereon and each including a spring-operated driver arranged to be released to drive a fastening for holding the upper, and means for releasing the several drivers substantially simultaneously in any positions assumed by the several devices.

141. In a machine of the class described, the combination with means for pulling an upper over a last, of overlaying and fastening mechanism operatively movable laterally of the shoe, said mechanism comprising a carrier having mounted thereon a group of wiper and tacker units comprising slides arranged side by side for relative movements laterally of the shoe and each slide having mounted thereon for swinging movement heightwise of the shoe a holder provided with a wiper and with means for driving a tack.

142. In a machine of the class described, the combination with means for pulling an upper over a last, of overlaying and fastening mechanism comprising a carrier operatively movable laterally of the shoe, and an overlaying and fastening device slidingly mounted on said carrier to yield laterally of the shoe in response to engagement with the shoe, said device comprising overlaying and fastener-driving mechanism yieldable also heightwise of the shoe in response to engagement with the shoe.

143. In a machine of the class described, the combination with means for pulling an upper over a last, of overlaying and fastening mechanism comprising a carrier operatively movable laterally of the shoe, a slide on said carrier movable relatively thereto in directions laterally of the shoe, a holder mounted on said slide for swinging movement heightwise of the shoe, means on said holder for laying the upper inwardly over the bottom of the last and for driving a fastening to fasten the upper, and yieldable means for controlling said slide and holder.

144. In a machine of the class described, the combination with means for pulling an upper over a last, of overlaying and fastening mechanism movable toward and from the shoe, said mechanism including a tack-holder and means for driving a tack from said holder into the shoe, means supported independently of the overlaying and fastening mechanism for delivering a tack to the tack-holder when said mechanism is in a position retracted from the shoe, and means for effecting a relative rectilinear displacement of the tack-holder and other elements of said mechanism to position the tack-holder in proper relation to the tack-delivering means.

145. In a machine of the class described, the combination with means for pulling an upper over a last, of overlaying and fastening mechanism movable toward and from the shoe, said mechanism including a tack-holder and means for driving a tack from said holder into the shoe, means supported independently of the overlaying and fastening mechanism for delivering a tack to the tack-holder when said mechanism is in a position retracted from the shoe, and means operative in response to movement of said mechanism away from the shoe to effect relative displacement of the tack-holder and other elements of said mechanism to position the tack-holder in proper relation to the tack-delivery means.

146. In a machine of the class described, the combination with means for pulling an upper over a last, of overlaying and fastening mechanism movable toward and from the shoe, said mechanism including a tack-holder and a driver and also a wiper positioned over the tack-holder, means for delivering a tack to the tack-holder when the overlaying and fastening mechanism is in a position retracted from the shoe, and means including an abutment operative in response to movement of said mechanism away from the shoe to stop the movement of the tack-holder when it arrives in proper relation to the tack-delivering means before other elements of said mechanism including the wiper arrive at the limit of their movement away from the shoe.

147. In a machine of the class described, the combination with means for pulling an upper over a last, of upper-fastening mechanism comprising a tack-holder and a driver, a member having a passage therein for delivering a tack to said tack-holder, and means for moving said member toward the tack-holder prior to the delivery of the tack.

148. In a machine of the class described, the combination with means for pulling an upper over a last, of overlaying and fastening mechanism movable toward and from the shoe, said mechanism including a group of tack-holders and drivers, means for effecting a relative displacement of the tack-holders and other portions of said mechanism preparatory to the delivery of tacks to the tack-holders, and tack-delivering means movable toward the tack-holders after such relative displacement to deliver the tacks.

149. In a machine of the class described, the combination with means for pulling an upper over a last, of means for lasting the toe of the shoe, overlaying and fastening mechanisms movable toward and from the sides of the shoe, said mechanisms including tack-holders and means for driving tacks from said holders, and means controlled by the toe-lasting mechanism for delivering tacks to said tack-holders.

150. In a machine of the class described, the combination with means for pulling an upper over a last, of means for lasting the toe of the shoe, overlaying and fastening mechanisms movable toward and from the sides of the shoe, said mechanisms including tack-holders and means for driving tacks from said holders, members having passages therein for delivering tacks to the tack-holders, and means operative in response to movement of the toe-lasting mechanism to move said members into position to deliver the tacks.

151. In a machine of the class described, the combination with means for shaping an upper over a last positioned bottom downward, of means for driving tacks upwardly to fasten the upper on the bottom of the last, and mechanism controlled by movement of said upper-shaping means for supplying tacks to said tack-driving means comprising a device arranged to receive tacks and movable to tip them and deliver them head downward.

152. In a machine of the class described, the combination with means for shaping an upper over a last positioned bottom downward, of means for driving tacks upwardly to fasten the upper on the bottom of the last, and mechanism controlled by movement of said upper-shaping means for supplying tacks to said tack-driving means comprising a rotatable inverter constructed and arranged to receive tacks point downward and by turning movement to invert them and deliver them head downward.

153. In a machine of the class described, means for pulling an upper over a last, means for laying the upper inwardly over the bottom of the last and fastening it, a shoe rest for engaging the shoe at the top of the forepart to support it for the overlaying and fastening operation, and power-operated mechanism including a clutch controlled independently of other parts of the machine for moving said shoe rest into operative position.

154. In a machine of the class described, means for pulling an upper over a last, means for laying the upper inwardly over the bottom of the last and fastening it, a shoe rest for engaging the shoe at the top of the forepart to support it for the overlaying and fastening operation, and mechanism including a toggle arranged to be straightened to move said shoe rest into operative position and to hold it in that position.

155. A machine of the class described having, in combination, means for pulling an upper over a last, different toe-embracing wipers movable together lengthwise of the shoe into position for operating on the shoe and constructed and arranged respectively to wipe the upper about the toe heightwise of the last and to wipe it inwardly into lasted relation to the rib of an insole on the last, and means for fastening the upper in lasted relation to the rib of the insole.

156. A machine of the class described having, in combination, means for pulling an upper over a last, different toe-embracing wipers movable together lengthwise of the shoe into position for operating on the shoe and constructed and arranged respectively to wipe the upper about the toe heightwise of the last and to wipe it inwardly into lasted relation to the rib of an insole on the last, and automatic means for applying a binder about the toe and for fastening the binder to the shoe to hold the upper in lasted relation to the rib of the insole.

157. A machine of the class described having, in combination, means for pulling an upper over a last, and means for wiping the upper about the toe into lasted position and for applying and fastening a binder to the shoe to hold the upper, said means comprising different toe-embracing wipers mounted to close inwardly about the toe and constructed and arranged respectively to wipe the upper heightwise of the last and to wipe it inwardly into lasted relation to the rib of an insole on the last.

158. In a machine of the class described, the combination with last and shoe positioning means, of toe-lasting mechanism comprising different toe-embracing wipers combined for movement as a unit into a predetermined relation to the shoe and constructed and arranged respectively to wipe the upper about the toe heightwise of the last and to wipe it inwardly into lasted relation to the rib of an insole on the last, power-operated means for thus moving said wipers and for operating them in automatically determined time relation to each other, and automatic means for fastening the upper in lasted relation to the rib of the insole.

159. In a machine of the class described, the combination with last and shoe positioning means, of toe-lasting mechanism comprising different toe-embracing wipers combined for movement as a unit into a predetermined relation to the shoe and constructed and arranged respectively to wipe the upper about the toe heightwise of the last and to wipe it inwardly into lasted relation to the rib of an insole on the last, power-operated means for thus moving said wipers and for operating them in automatically determined time relation to each other, and means for applying a binder about the toe and for fastening the binder to the shoe to hold the upper in lasted relation to the rib of the insole.

160. In a machine of the class described, the combination with last and shoe positioning means, of automatic means for wiping the upper about the toe into lasted position and for applying and fastening a binder to the shoe to hold the upper, said means comprising different pairs of toe-embracing wipers each mounted for swinging movements about an axis extending heightwise of the shoe and constructed and arranged respectively to wipe the upper heightwise of the last and to wipe it inwardly into lasted relation to the rib of an insole on the last.

161. In a machine of the class described, a gripper for pulling an upper over a last, said gripper comprising a pair of jaws relatively movable to grip the upper, a gripper casing movable with said jaws to pull the upper, and jaw-closing means in said casing comprising a member rotatable about an axis extending in substantially parallel relation to the direction of the pull of the gripper on the upper to effect relative closing movement of the gripper jaws.

162. In a machine of the class described, a gripper for pulling an upper over a last, said gripper comprising a pair of jaws relatively movable to grip the upper, a gripper casing movable with said jaws to pull the upper, and jaw-closing means in said casing comprising interengaging screw-threaded members relatively rotatable to effect relative closing movement of the gripper jaws.

163. In a machine of the class described, a gripper for pulling an upper over a last, said gripper comprising a pair of jaws relatively movable to grip the upper, a gripper casing movable with said jaws to pull the upper, and jaw-closing means in said casing comprising interengaging screw-threaded members one of which is movable in response to turning movement of the other to effect relative closing movement of the gripper jaws.

164. In a machine of the class described, a gripper for pulling an upper over a last, said gripper comprising a pair of jaws relatively movable to grip the upper, a gripper casing movable with said jaws to pull the upper, and jaw-closing means in said casing comprising a member mounted for rectilinear movement to effect relative closing movement of the gripper jaws and another member movable about an axis extending in substantially parallel relation to the direction of the pull of the gripper on the upper to operate said first member.

165. In a machine of the class described, a gripper for pulling an upper over a last, said gripper comprising a pair of jaws one of which is movable toward the other to grip the upper, a member arranged to have a wedging action on said movable jaw to close it upon the upper, and another member mounted for turning movement in the gripper about an axis extending heightwise of the last to operate said first member.

166. In a machine of the class described, a gripper for pulling an upper over a last, said gripper comprising a pair of jaws relatively movable to grip the upper, a member mounted for turning movement about an axis extending in substantially parallel relation to the direction of the pull of the gripper on the upper to effect relative closing movement of the gripper jaws, and a spring arranged to be subjected to stress by further turning movement of said member after the gripping of the upper to apply gripping pressure yieldingly to the upper.

167. In a machine of the class described, a gripper for pulling an upper over a last, said gripper comprising a pair of jaws relatively movable to grip the upper, interengaging screw-threaded members relatively movable in response to turning movement of one of them to effect relative closing movement of the gripper jaws, and a spring arranged to be subjected to stress in response to further relative movement of said members after the gripping of the upper to apply gripping pressure yieldingly to the upper.

168. In a machine of the class described, a plurality of grippers for pulling an upper respectively in different locations about a last, each of said grippers comprising a pair of jaws relatively movable to grip the upper and also comprising a member mounted for turning movement about an axis extending in substantially parallel relation to the direction of the pull of the gripper on the upper to effect relative closing movement of the gripper jaws.

169. In a machine of the class described, a plurality of grippers for pulling an upper respectively in different locations about a last, each of said grippers comprising a pair of jaws relatively movable to grip the upper and also comprising interengaging screw-threaded members relatively movable in response to turning movement of one of them to effect relative closing movement of the gripper jaws.

170. In a machine of the class described, a plurality of grippers for pulling an upper respectively at the toe end and at the opposite sides of a last, each of said grippers comprising a pair of jaws relatively movable to grip the upper and also comprising a member rotatable to effect relative closing movement of the gripper jaws, a plurality of shafts arranged to extend heightwise of the last and connected respectively to the different rotatable members for operating them, and means for rotating the several shafts in automatically determined time relation to one another.

171. In a machine of the class described, a plurality of grippers for pulling an upper respectively at the opposite sides of a last, a plurality of grippers for pulling the upper about the toe end of the last, each of the several grippers comprising a pair of jaws relatively movable to grip the upper and also comprising a member rotatable to effect relative closing movement of the jaws, a plurality of shafts arranged to extend heightwise of the last and connected respectively to the different rotatable members for operating them, means comprising longitudinally movable rack bars for operating the shafts associated with the side grippers, and gearing for operating the shafts associated with the toe grippers.

172. In a machine of the class described, upper-pulling means comprising a plurality of grippers for pulling an upper at the same side of a last, each of said grippers comprising a pair of jaws relatively movable to grip the upper and also comprising a member rotatable to effect relative closing movement of the gripper jaws, a plurality of shafts arranged to extend heightwise of the last and connected respectively to the different rotatable members for operating them, each of said shafts having gear teeth thereon, and a rack bar connected to said gear teeth for turning said shafts.

173. In a machine of the class described, a gripper for pulling an upper over a last, said gripper comprising a pair of jaws relatively movable to grip the upper, and jaw-closing means comprising a shaft extending in substantially parallel relation to the direction of the pull of the gripper on the upper and rotatable to effect relative closing movement of the gripper jaws, said shaft being movable lengthwise with the gripper jaws in the pulling of the upper.

174. In a machine of the class described, a gripper for pulling an upper over a last, said gripper comprising a pair of jaws relatively movable to grip the upper, and jaw-closing means comprising a shaft arranged to extend heightwise of the last and rotatable to effect relative closing movement of the gripper jaws, said shaft being movable lengthwise with the gripper jaws in the pulling of the upper and having gear teeth thereon for turning it, and operating means arranged to connect with said gear teeth in all positions of lengthwise movement of the shaft.

175. In a machine of the class described, a gripper for pulling an upper over a last, said gripper comprising a pair of jaws relatively movable to grip the upper, a member in the gripper mounted for turning movement to effect relative closing movement of the jaws, a rotatable shaft for operating said member, and a universal connection between said member and shaft to permit movements of the gripper in directions transverse to the direction of the pull on the upper.

176. In a machine of the class described, grippers for pulling an upper respectively at the opposite sides of a last, and devices positioned at the outer sides of said grippers and connected with the grippers for controlling them, said devices being mounted for swinging movements to impart to the grippers movements lengthwise of the last.

177. In a machine of the class described, grippers for pulling an upper respectively at the opposite sides of a last, and devices positioned at the outer sides of said grippers and connected with the grippers for controlling them, said devices being manually movable independently of each other about axes extending heightwise of the last to impart to the grippers movements lengthwise of the last.

In testimony whereof I have signed my name to this specification.

CHARLES F. PYM.